(12) United States Patent
Ellison

(10) Patent No.: US 11,158,060 B2
(45) Date of Patent: Oct. 26, 2021

(54) SYSTEM AND METHOD FOR CREATING AN IMAGE AND/OR AUTOMATICALLY INTERPRETING IMAGES

(71) Applicant: CONFLU3NCE LTD, Jerusalem (IL)

(72) Inventor: Tami Robyn Ellison, Jerusalem (IL)

(73) Assignee: CONFLU3NCE LTD, Jerusalem (IL)

( * ) Notice: Subject to any disclaimer, the term of this patent is extended or adjusted under 35 U.S.C. 154(b) by 151 days.

(21) Appl. No.: 16/427,305

(22) Filed: May 30, 2019

(65) Prior Publication Data

US 2019/0347801 A1 Nov. 14, 2019

Related U.S. Application Data

(63) Continuation-in-part of application No. 16/262,884, filed on Jan. 30, 2019, and a continuation-in-part of
(Continued)

(51) Int. Cl.
*G06T 7/174* (2017.01)
*G06T 7/136* (2017.01)
(Continued)

(52) U.S. Cl.
CPC ............. *G06T 7/136* (2017.01); *G06T 5/50* (2013.01); *G06T 7/174* (2017.01); *G06T 7/90* (2017.01);
(Continued)

(58) Field of Classification Search
CPC . G06T 2207/20221; G06T 2207/30168; G06T 2207/30242; G06T 3/4038; G06T 5/50; G06T 7/0002; G06T 7/13; G06T 7/136; G06T 7/174; G06T 7/90; G06K 9/6277; G06K 9/6256; G06N 20/00
See application file for complete search history.

(56) References Cited

U.S. PATENT DOCUMENTS 5,594,841 A 1/1997 Schutz
5,901,245 A 5/1999 Warnick et al.
(Continued)

OTHER PUBLICATIONS

Cong, Runmin, et al. "Review of visual saliency detection with comprehensive information." IEEE Transactions on circuits and Systems for Video Technology vol. 29, No. 10 (2018): pp. 2941-2959, URL: https://arxiv.org/pdf/1803.03391.pdf.
(Continued)

*Primary Examiner* — Ian L Lemieux
(74) *Attorney, Agent, or Firm* — Sheppard Mullin Richter & Hampton LLP

(57) ABSTRACT

A method of identifying and analyzing contiguities in images is disclosed. The contiguities are indicative features and various qualities of an image, which may be used for identifying objects and/or relationships in images. Alternatively, the contiguities may be helpful in ensuring that an image has a desired figure-ground ambiguous switch between percepts, so as to create a desired effect when combined with other images to generate a composite image set. The contiguity may be a group of picture elements that are adjacent to one another that form a continuous image element that extends generally horizontally (e.g., diagonally, horizontally and/or vertically) across the image.

27 Claims, 25 Drawing Sheets

Related U.S. Application Data application No. 15/884,565, filed on Jan. 31, 2018, now Pat. No. 10,582,189, and a continuation-in-part of application No. 15/884,565, filed on Jan. 31, 2018, now Pat. No. 10,582,189.

(60) Provisional application No. 62/626,208, filed on Feb. 5, 2018, provisional application No. 62/721,665, filed on Aug. 23, 2018, provisional application No. 62/499,655, filed on Feb. 1, 2017.

(51) Int. Cl.
*G06T 7/90* (2017.01)
*G06T 5/50* (2006.01)
*G06T 7/13* (2017.01)

(52) U.S. Cl.
CPC ...... *G06T 7/13* (2017.01); *G06T 2207/20221* (2013.01); *G06T 2207/30242* (2013.01)

(56) References Cited

U.S. PATENT DOCUMENTS

| | | | |
|---|---|---|---|
| 5,987,164 A | 11/1999 | Szeliski et al. | |
| 6,102,846 A | 8/2000 | Patton | |
| 6,507,364 B1 | 1/2003 | Bishay et al. | |
| 6,631,207 B2 | 10/2003 | Hirota et al. | |
| 6,721,461 B1 | 4/2004 | Nichani | |
| 6,978,052 B2 | 12/2005 | Beged-Dov et al. | |
| 7,102,647 B2 | 9/2006 | Sloan et al. | |
| 7,400,768 B1 | 7/2008 | Mayzlin | |
| 7,532,771 B2 | 5/2009 | Taylor et al. | |
| 7,576,755 B2 | 8/2009 | Sun et al. | |
| 7,653,261 B2 | 1/2010 | Blake | |
| 7,686,769 B2 | 3/2010 | Caplygin | |
| 8,078,969 B2 | 12/2011 | Harrison | |
| 8,126,269 B2 | 2/2012 | Eggert et al. | |
| 8,135,174 B2 | 3/2012 | Wiedemann et al. | |
| 8,135,182 B2 | 3/2012 | Luo et al. | |
| 8,265,349 B2 * | 9/2012 | Wang | G06K 9/00248 382/118 |
| 8,363,939 B1 | 1/2013 | Khosla et al. | |
| 8,471,898 B2 | 6/2013 | Neuman | |
| 8,690,325 B1 | 4/2014 | Straus | |
| 8,692,930 B2 | 4/2014 | Rolston | |
| 8,737,769 B2 | 5/2014 | Finch et al. | |
| 9,081,799 B2 | 7/2015 | King et al. | |
| 9,275,486 B2 | 3/2016 | Minamihara et al. | |
| 9,754,163 B2 | 9/2017 | Segalovitz et al. | |
| 9,885,961 B1 * | 2/2018 | Amir | G03F 7/70633 |
| 10,188,337 B1 | 1/2019 | Charvat | |
| 10,327,637 B2 | 6/2019 | Gelbman et al. | |
| 10,582,189 B2 | 3/2020 | Ellison | |
| 2002/0163582 A1 * | 11/2002 | Gruber | G01C 11/02 348/218.1 |
| 2004/0071349 A1 | 4/2004 | Harrington et al. | |
| 2004/0146201 A1 | 7/2004 | Sathyanarayana | |
| 2005/0089213 A1 * | 4/2005 | Geng | G06K 9/00214 382/154 |
| 2005/0146521 A1 | 6/2005 | Kaye et al. | |
| 2007/0291177 A1 | 12/2007 | Lahoz et al. | |
| 2008/0204548 A1 | 8/2008 | Goulanian et al. | |
| 2008/0205789 A1 | 8/2008 | Ten Kate et al. | |
| 2009/0003712 A1 | 1/2009 | Mei et al. | |
| 2009/0066786 A1 | 3/2009 | Landa | |
| 2009/0297061 A1 | 12/2009 | Mareachen | |
| 2010/0020160 A1 | 1/2010 | Ashbey | |
| 2010/0080490 A1 | 4/2010 | Akiyama | |
| 2010/0177328 A1 | 7/2010 | Li | |
| 2010/0191156 A1 | 7/2010 | Sakamoto | |
| 2010/0194851 A1 * | 8/2010 | Pasupaleti | H04N 1/3876 348/36 |
| 2010/0322522 A1 | 12/2010 | Wang | |
| 2011/0074925 A1 | 3/2011 | Turner | |
| 2011/0285748 A1 | 11/2011 | Slatter et al. | |
| 2012/0027294 A1 | 2/2012 | Krolczyk et al. | |
| 2012/0044241 A1 | 2/2012 | Chen | |
| 2014/0133741 A1 * | 5/2014 | Wang | G06T 7/543 382/154 |
| 2014/0181682 A1 * | 6/2014 | Spracklen | G06F 3/1462 715/740 |
| 2014/0254884 A1 | 9/2014 | Elkington | |
| 2014/0294287 A1 | 10/2014 | Guo | |
| 2014/0307980 A1 | 10/2014 | Hilt | |
| 2015/0164402 A1 | 6/2015 | Smith | |
| 2015/0249815 A1 | 9/2015 | Sandrew | |
| 2015/0350730 A1 | 12/2015 | el Kaliouby | |
| 2015/0358613 A1 | 12/2015 | Sandrew | |
| 2016/0269589 A1 | 9/2016 | Sargent | |
| 2016/0278682 A1 | 9/2016 | Khaligh-Razavi | |
| 2017/0006234 A1 * | 1/2017 | Higuchi | G06T 3/4038 |
| 2017/0236258 A1 | 8/2017 | Hsu | |
| 2017/0251985 A1 | 9/2017 | Howard | |
| 2018/0103886 A1 | 4/2018 | Landau | |
| 2018/0220124 A1 * | 8/2018 | Ellison | H04N 13/261 |
| 2019/0114777 A1 | 4/2019 | Maity | |
| 2019/0150819 A1 | 5/2019 | Charvat | |
| 2019/0164293 A1 * | 5/2019 | Ellison | G06T 7/11 |
| 2019/0175090 A1 | 6/2019 | Reiner | |
| 2019/0254581 A1 | 8/2019 | Papathomas | |
| 2019/0347801 A1 * | 11/2019 | Ellison | G06T 7/136 |
| 2019/0378621 A1 * | 12/2019 | Ellison | G16H 50/30 |
| 2019/0385711 A1 | 12/2019 | Shriberg | |
| 2020/0151439 A1 | 5/2020 | Johnson | |
| 2020/0349687 A1 | 11/2020 | Weng | |
| 2020/0383621 A1 | 12/2020 | Cuestas Rodriguez | |
| 2020/0388178 A1 | 12/2020 | Barbuto | |
| 2020/0410257 A1 | 12/2020 | Machii | |
| 2021/0192351 A1 | 6/2021 | Zakariaie | |
| 2021/0224601 A1 | 7/2021 | Chen | |

OTHER PUBLICATIONS

Few, Stephen. "Data visualization for human perception." The Encyclopedia of Human-Computer Interaction, 2nd Ed. (2013). Interaction Design Foundation, URL: https://www.interaction-design.org/literature/book/the-encyclopedia-of-human-computer-interaction-2nd-ed/data-visualization-for-human-perception.

Grill-Spector, Kalanit. "What has fMRI taught US about object recognition." Object categorization: Computer and human vision perspectives (2009): pp. 102-128. <URL: https://www.researchgate.net/publication/239922833_What_Has_fMRI_Taught_Us_About_Object_Recognition>.

Guberman, Shelia. "Gestalt theory rearranged: back to Wertheimer." Frontiers in psychology 8 (Oct. 11, 2017) 1782, URL: https://www.frontiersin.org/articles/10.3389/fpsyg.2017.01782/full.

Kim, Been, et al. "Do neural networks show Gestalt phenomena? An exploration of the law of closure." arXiv preprint arXiv:1903.01069 (2019). Date printed on article Mar. 5, 2019, URL: https://arxiv.org/pdf/1903.01069.pdf.

Kornmeier, Juergen, and Michael Bach, "The Necker cube—an ambiguous figure disambiguated in early visual processing," Vision Research, vol. 45, No. 8 (Apr. 2005): pp. 955-960, URL: https://www.sciencedirect.com/science/article/pii/S0042698904005152.

Martinez-Conde, Susana, et al., "Eye movements and the perception of a clear and stable visual world." Journal of Vision vol. 8, No. 14 (Oct. 2008): i-i, , the abstract, URL: https://jov.arvojournals.org/article.aspx?articleid=2193393.

Ozkan, Kerem, and Myron L. Braunstein. "Background surface and horizon effects in the perception of relative size and distance." Visual cognition vol. 18, No. 2 (Feb. 2010): pp. 229-254, URL: https://www.ncbi.nlm.nih.gov/pmc/articles/PMC2929966/.

Oudeyer, Pierre-Yves. "Intelligent adaptive curiosity: a source of self-development." (2004): pp. 127-130, URL: http://cogprints.org/4144/1/oudeyer.pdf.

Thirumavalavan, Sasirooba, and Sasikala Jayaraman. "An improved teaching-learning based robust edge detection algorithm for noisy images." Journal of advanced research vol. 7, No. 6 (2016): pp.

(56) References Cited

OTHER PUBLICATIONS 979-989. Available online Apr. 30, 2016, <URL: https://www.sciencedirect.com/science/article/pii/S2090123216300224>.
Todorovic, Dejan. "Gestalt principles." Scholarpedia vol. 3, No. 12 (2008): 5345. URL: http://www.scholarpedia.org/article/Gestalt_principles.
Tsotsos, John K., Iuliia Kotseruba, and Calden Wloka. "Rapid visual categorization is not guided by early salience-based selection." PloS one, vol. 14, No. 10 (2019): e0224306. San Francisco, California. USA, Published Oct. 24, 2019, URL: https://journals.plos.org/plosone/article?id=10.1371/journal.pone.0224306.
Veale, Richard, Ziad M. Hafed, and Masatoshi Yoshida. "How is visual salience computed in the brain? Insights from behaviour, neurobiology and modelling." Philosophical Transactions of The Royal Society B: Biological Sciences 372.1714 (2017): 20160113. London, England. <URL: https://royalsocietypublishing.org/doi/pdf/10.1098/rstb.2016.0113>.
Wagemans, Johan, et al. "A century of Gestalt psychology in visual perception: I. Perceptual grouping and figure-ground organization." Psychological bulletin, vol. 138, No. 6 (Nov. 2012): 1172, pp. 1218-1252, American Psychological Association. Washington, DC, USA, URL: https://www.ncbi.nlm.nih.gov/pmc/articles/PMC3482144/.
Workman S., Zhai M., Jacobs N. 2016. Horizon Lines in the Wild. In: British Machine Vision Conference (BMVC). Cornell University. Ithaca, New York, USA. Date on copy of article Aug. 16, 2016, URL: https://arxiv.org/pdf/1604.02129.pdf.
Zhou, Bolei et al. "Places: A 10 Million Image Database for Scene Recognition." IEEE Transactions on Pattern Analysis and Machine Intelligence, vol. 40, No. 6 (Jun. 2018): 1452-1464 © 2017 Institute of Electrical and Electronics Engineers, New York, New York, USA, URL: http://places2.csail.mit.edu/.
Yao, Ting, et al. "Exploring visual relationship for image captioning." Proceedings of the European conference on computer vision (ECCV). 2018. Springer Science+Business Media/Springer Nature. Berlin, Germany, URL: https://openaccess.thecvf.com/content_ECCV_2018/papers/Ting_Yao_Exploring_Visual_Relationship_ECCV_2018_paper.pdf.
Noroozi, Mehdi, and Paolo Favaro. "Unsupervised learning of visual representations by solving jigsaw puzzles." European Conference on Computer Vision. Springer, Cham, 2016, the abstract, URL: https://arxiv.org/pdf/1603.09246.pdf.
Kuo, Ying-Miao, et al. "Generating ambiguous figure-ground images." IEEE transactions on visualization and computer graphics vol. 23, No. 5 (Sep. 2016): pp. 1534-1545, URL: http://graphics.csie.ncku.edu.tw/Figure_ground/FG_TVCG_R2.pdf.
Guo, Yanming, et al. "A review of semantic segmentation using deep neural networks." International journal of multimedia information retrieval vol. 7, No. 2 (2018): pp. 87-93., Published on line Nov. 24, 2017, Springer Nature, Berlin, Germany, URL: https://link.springer.com/article/10.1007/s13735-017-0141-z.
Gunawan, Teddy Surya, et al. "Artificial Neural Network Based Fast Edge Detection Algorithm for MRI Medical Images." Indonesian Journal of Electrical Engineering and Computer Science vol. 7, No. 1 (Jul. 2017): pp. 123-130. Bantul, Yogyakarta, Indonesia, URL: https://www.researchgate.net/profile/Teddy_Gunawan/publication/319312808_Artificial_neural_network_based_fast_edge_detection_algorithm_for_mri_medical_images/links/5a7e3da30f7e9be137c4d896/Artificial-neural-network-based-fast-edge-detection-algorithm-for-mri-medical-images.pdf.
Dai, Bo, Yuqi Zhang, and Dahua Lin. "Detecting visual relationships with deep relational networks." Proceedings of the IEEE conference on computer vision and Pattern recognition. 2017, URL: https://openaccess.thecvf.com/content_cvpr_2017/papers/Dai_Detecting_Visual_Relationships_CVPR_2017_paper.pdf.
Couto, Javier "Object Detection with Deep Learning: The Definitive Guide," Date printed on article Jul. 13, 2020,URL: https://tryolabs.com/blog/2017/08/30/object-detection-an-overview-in-the-age-of-deep-learning/.
Eagleman, David M. "Visual illusions and neurobiology." Nature Reviews, Neuroscience vol. 2 No. 12 (Dec. 2001): pp. 920-926, URL: http://physiology.elte.hu/gyakorlat/cikkek/Visual%20illusions%20and%20neurobiology.pdf.
Verbeek, Piet W., and Lucas J. Van Vliet. "Line and edge detection by symmetry filters." 11th IAPR International Conference on Pattern Recognition, The Hague, The Netherlands. 1992, URL: http://citeseerx.ist.psu.edu/viewdoc/download?doi=10.1.1.218.8063&rep=rep1&type=pdf.
Ren, Xiaofeng, Charless C. Fowlkes, and Jitendra Malik. "Figure/ground assignment in natural images." European Conference on Computer Vision. Springer, Berlin, Heidelberg, 2006, URL: https://link.springer.com/content/pdf/10.1007/11744047_47.pdf.
Hramov, Alexander E., et al. "Classifying the perceptual interpretations of a bistable image using EEG and artificial neural networks." Frontiers in neuroscience 11 (Dec. 4, 2017): 674, URL: https://www.frontiersin.org/articles/10.3389/fnins.2017.00674/full.
Sachin, Narkhede, et al. "Brain tumor detection based on bilateral symmetry information." arXiv preprint arXiv:1412.3009 (2014). Int. Journal of Engineering Research and Applications www.ijera.com ISSN : 2248-9622, vol. 4, Issue 6 (Version 3), Jun. 2014, pp. 98-103, URL: https://arxiv.org/ftp/arxiv/papers/1412/1412.3009.pdf.
Guberman, Shelia, Vadim V. Maximov, and Alex Pashintsev. "Gestalt and image understanding." Gestalt Theory vol. 34, No. 2 (2012): 143. URL: http://iitp.ru/upload/publications/6097/GubMaxPas2012.pdf.
"Sobel operator". Wikipedia, hosted by WikiMedia Foundation, Jun. 7, 2016, URL: https://en.wikipedia.org/wiki/Sobel_operator, which can be found at the Way Back Machine Archive at http://web.archive.org/web/20160607212450/https://en.wikipedia.org/wiki/Sobel_operator.
"Color depth". Wikipedia, hosted by WikiMedia Foundation, Dec. 27, 2017 URL: https://en.wikipedia.org/wiki/Color_depth, which can be found at the Way Back Machine Archive at https://web.archive.org/web/20161227211655/en.wikipedia.org/wiki/Color_depth.
"Image stitching". Wikipedia, hosted by WikiMedia Foundation, Nov. 9, 2016, URL: https://en.wikipedia.org/wiki/Image_stitching, which can be found at the Way Back Machine Archive at https://web.archive.org/web/20161109225805/https://en.wikipedia.org/wiki/Image_stitching.
"Tangible user interface". Wikipedia, hosted by WikiMedia Foundation, Nov. 23, 2016, URL: https://en.wikipedia.org/wiki/Tangible_user_interface, which can be found at the Way Back Machine Archive at https://web.archive.org/web/20161123210418if_/https://en.wikipedia.org/wiki/Tangible_user_interface.
"Saliency map". Wikipedia, hosted by WikiMedia Foundation, May 31, 2019, URL: https://en.wikipedia.org/wiki/Saliency_map, ,which can be found at the Way Back Machine Archive at https://web.archive.org/web/20190531093317/https://en.wikipedia.org/wiki/Saliency_map.
"Color-blocking". Wikipedia, hosted by WikiMedia Foundation, Nov. 21, 2016, URL: https://en.wikipedia.org/wiki/Color-blocking, which can be found at the Way Back Machine Archive at https://web.archive.org/web/20161121091117/en.wikipedia.org/wiki/Color-blocking.
Padmapriya, B. "Volumetric measurement of urinary bladder and classification of polycystic ovarian syndrome using ultrasound images". Chapter 3, Edge-based image segmentation followed by quad split technique. Anna University. Aug. 2015. Citation <URL: http://hdl.handle.net/10603/141792, Appears in Departments: Faculty of Information and Communication Engineering, Thesis URL: https://shodhganga.inflibnet.ac.in/bitstream/10603/141792/11/11_chapter%203.pdf.
Conflu3nce, ltd. Jerusalem, Israel, Sep. 9, 2016, Website URL: http://www.conflu3nce.com, which can be found at the Way Back Machine Archive at https://web.archive.org/web/20160909045642/http://www.conflu3nce.com:80/.
Neiman, Rachel. "Photage Autumn Impressions" Israel 21C. Nov. 7, 2014. San Francisco, CA USA, URL: https://www.israel21c.org/

(56) References Cited

OTHER PUBLICATIONS photage-autumn-impressions/, secondary referenced article URL: https://www.pinterest.com/pin/279223245622920855/?nic_v2=1a2WNfQVI.

Visual Illusion Extraordinaire—Patent Pending Juxtaposition Technique Transforms Complex Images Into 3D Art (without Special Glasses) Jun. 4, 2013, URL: https://www.newswire.com/visual-illusion-extraordinaire/224926.

Long, Yang, et al. "From zero-shot learning to conventional supervised classification: Unseen visual data synthesis." Proceedings of the IEEE Conference on Computer Vision and Pattern Recognition. 2017. pp. 1627-1636, URL: https://openaccess.thecvf.com/content_cvpr_2017/papers/Long_From_Zero-Shot_Learning_CVPR_2017_paper.pdf.

Wang, Jason, and Luis Perez. "The effectiveness of data augmentation in image classification using deep learning." Convolutional Neural Networks Vis. Recognit 11 (2017). (date printed on article Dec. 13, 2017), URL: https://arxiv.org/pdf/1712.04621.pdf.

Elk on hill image, "popular 500px nature photos in 2016," Где я хочу быть (Where I want to be) ‖ Автор фото: : Furstset (Photo credit: Furstet), 2016, URL: https://zefirka.net/2016/03/22/20-populyarnyx-fotografij-prirody-na-500px-v-2016-godu/.

"Walden Pond," TOM GRILL, Dec. 13, 2015, p. 1, URL: http://www.tomgrill.com/projects/walden-pond/, which can be found at the Way Back Machine Archive at http://web.archive.org/web/20151213000513/http://www.tomgrill.com/projects/walden-pond.

tineye.com, "Color extraction and reverse image search tools," Jan. 18, 2017, Toronto, Ontario, Canada, URL: tineye.com, which can be found at the WayBack Machine Archive at http://web.archive.org/web/20170118191553/http://labs.tineye.com/color/.

Conflu3nce, ltd., Jerusalem, Israel, Apr. 21, 2019, website and video content, Website content: http://www.conflu3nce.com, which can be found at the WayBack Machine archive at http://web.archive.org/web/20190421160008/http://conflu3nce.com/index.htm.

* cited by examiner

| AF₄ Rules Table: Contiguity Continuity Range (-1.0 to +1.0) Vertical Disruptor and Irregular Edge ||
|---|---|
| *If* | *Then* |
| an image has at least one contiguity which is continuous across the entire width of the image (75-100% +/-3%) | Assign a value of 1.0 |
| the contiguity is continuous across 50-75% +/-3% of the image | Assign a value of 0 |
| the contiguity is <50% or if contiguity # is 0 | Assign a value of -1.0 |
| there is/are Vertical Distractors extending >5% but less than 30% up from any otherwise linear and continuous contiguity, but which has additional complex contiguities | Assign a value of 0.5 |
| VD extends greater than 30% but less than 50%; | Assign a value of -0.5 |
| VD extends greater than 50% but less than 100% | Assign a value of -0.75 |
| VD is equal to or greater than 100% | Assign a value of -1.0 |
| there are 2-3 Vertical Distractor but which are spatially separated, or which individually extend less than 20% from an otherwise linear contiguities | Assign a value of 0.5 |
| there are multiple Vertical Distractors present in the image (e.g. trees) | Assign a value of -1.0 |
| there are multiple irregular edges on one or more contigs or if a single contiguity without an adjacent color block >30% of the image | Assign a value of -0.25 |
| there is a single contiguity with a poorly defined edge but which is adjacent to at least one continuous color block or a color block >30% | Assign a value of -0.15 |

FIG. 11A

| AF$_5$ Rules Table. Color Block Depth$_{100}$ and CBD$_{ST}$ | | | | |
|---|---|---|---|---|
| Value | Quadrant 1 | Quadrant 2 | Quadrant 3 | Quadrant 4 |
| 1.00 | A | A | A | A(B) |
| 0.75 | A | A | B | B |
| 0.625 | A | A/B | C | C |
| 0.5 | A | A | B | C |
| 0.5 | A | B | A | B |
| 0.25 | A | B | C | A |
| 0.1 | A | B | C | D |

FIG. 11B

| AF$_6$ Spatial Color-Contiguity Table (compares AF$_1$ to AF$_2$) | |
|---|---|
| Value | Condition Rules |
| 0 | If AF$_1$ = AF$_2$ |
| 1 | If AF$_1$ is greater than AF$_2$ |
| 2 | If AF$_1$ is less than AF$_2$, unless the contiguity number is equal to 0 |
| -1 | If AF$_1$ = 0 |

FIG. 11C

| Ambiguity Factor | Range | Description/Formula |
|---|---|---|
| Contig Number (AF$_1$) | 0-6 | Sobel or Differential Edge counts using color and thresholded images. Compare b/w area counts |
| Color Block (AF$_2$) | 1.0-6.0 | Sequential color extraction using reduced 2-6 color images, quadrant-based identification of dominant colors (total, Q1-A4, top, bottom, right, left) |
| Linearity (AF$_3$) | -1.0 to +1.0 | $C_{linearity} = C_A + C_D$ where $C_A$ is the angularity across the contiguity and $C_D$ is a break in the contiguity |
| Continuity (AF$_4$) | -1.0 to +1.0 | $C_{cont} = C_{VD} + C_{IE}$ (rules table FIG. 11A) |
| Color Block Depth (100) (AF$_5$) | 0.25 to 1.0 | define color block distribution (rules table FIG. 11B) |
| Spatial Color-Contig (AF$_6$) | -2.0 to +2.0 | compare contiguity number to color block number (rules table FIG. 11C) |
| Ambi Value (Ambiguity Value) | | 0.75 to 2.25 |

FIG. 11D

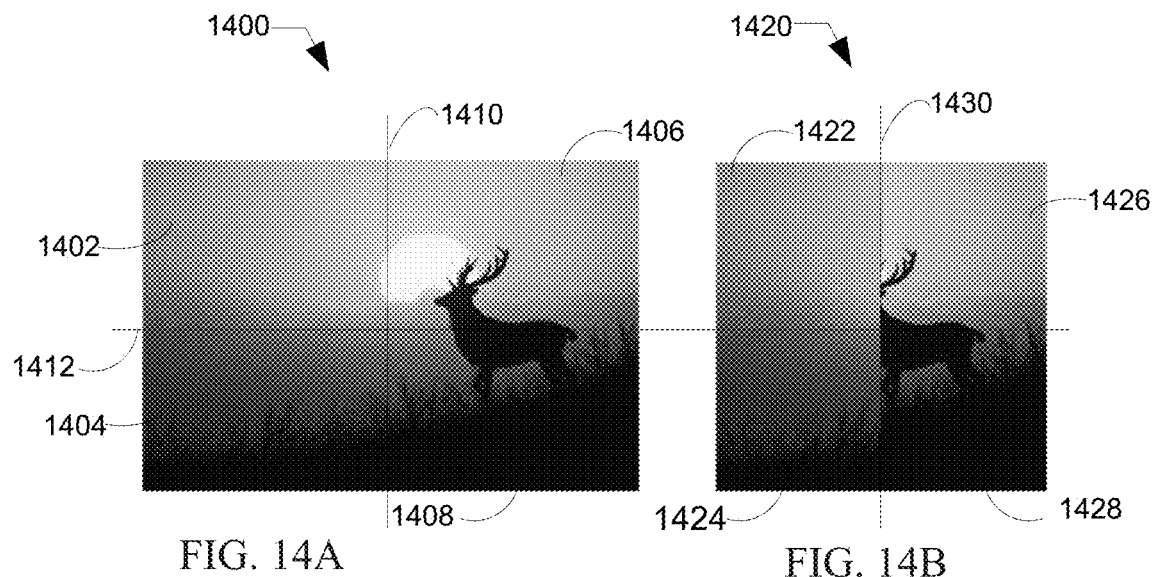
FIG. 14A
FIG. 14B
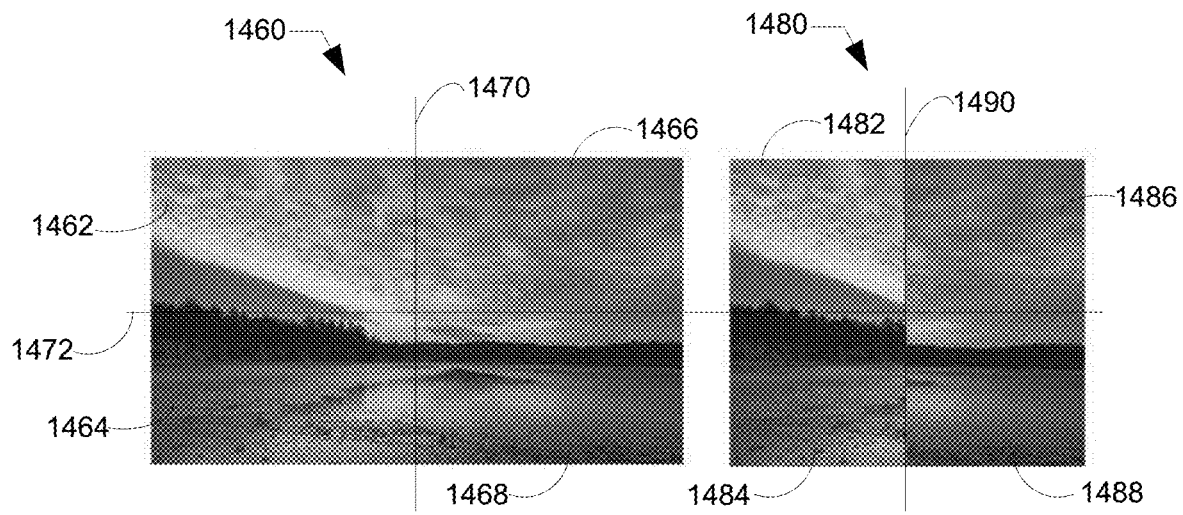
FIG. 14C
FIG. 14D

2220

2300

SYSTEM AND METHOD FOR CREATING AN IMAGE AND/OR AUTOMATICALLY INTERPRETING IMAGES

PRIORITY CLAIM AND CROSS-REFERENCE TO RELATED APPLICATIONS

This application is a continuation-in-part of U.S. Patent application Ser. No. 16/262,884, "SYSTEM AND METHOD FOR CREATING AN IMAGE AND/OR AUTOMATICALLY INTERPRETING IMAGES," filed on Jan. 30, 2019, by TAMI ROBYN ELLISON, which claims priority benefit of U.S. Provisional Patent Application No. 62/626,208, entitled "SYSTEM AND METHOD FOR IDENTIFYING CONTIGUITY CHARACTERISTICS IN AN IMAGE," filed on Feb. 5, 2018, by Tami Ellison, and also claims priority benefit of U.S. Provisional Patent Application No. 62/721,665, entitled "MULTI-PURPOSE INTERACTIVE COGNITIVE PLATFORM," filed on Aug. 23, 2018, by Tami Ellison; U.S. Nonprovisional application Ser. No. 16/262,884, "SYSTEM AND METHOD FOR CREATING AN IMAGE AND/OR AUTOMATICALLY INTERPRETING IMAGES," filed on Jan. 30, 2019, by TAMI ROBYN ELLISON is a continuation-in-part of U.S. patent application Ser. Number 15/884,565, entitled "SYSTEM AND METHOD FOR GENERATING COMPOSITE IMAGES," filed on Jan. 31, 2018, by Tami Ellison, which claims priority benefit of U.S. Provisional Patent Application No. 62/499,655, entitled "PHOTAGE 2.5D-METHOD AND SYSTEM FOR CREATING DYNAMIC VISUAL ILLUSIONS USING COMPLEX, JUXTAPOSED AMBIGUOUS IMAGES," filed on Feb. 1, 2017, by Tami Robyn Ellison;

this application is also a continuation-in-part of U.S. patent application Ser. No. 15/884,565, entitled "SYSTEM AND METHOD FOR GENERATING COMPOSITE IMAGES," filed on Jan. 31, 2018, by Tami Ellison, which is incorporated herein by reference, which claims priority benefit of U.S. Provisional Patent Application Number 62/499,655, entitled "PHOTAGE 2.5D-METHOD AND SYSTEM FOR CREATING DYNAMIC VISUAL ILLUSIONS USING COMPLEX, JUXTAPOSED AMBIGUOUS IMAGES," filed on Feb. 1, 2017, by Tami Robyn Ellison;

this application claims priority benefit of U.S. Provisional Patent Application No. 62/721,665, entitled "MULTI-PURPOSE INTERACTIVE COGNITIVE PLATFORM," filed on Aug. 23, 2018, by Tami Ellison.

The contents of all of the above listed applications are incorporated herein by reference, in their entirety, and all the applications listed in the Priority Claim and Cross-Reference to Related Applications are incorporated herein by reference, in their entirety.

FIELD

This specification relates image processing and/or analysis.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in-and-of-themselves may also be inventions.

Computer image recognition methods, such as with Microsoft Caption AI, recognize some predominant objects in a picture, but sometimes the identification of the object is inaccurate, or the identification misses other elements, details and relationships between elements.

BRIEF DESCRIPTION OF THE FIGURES

In the following drawings like reference numbers are used to refer to like elements. Although the following figures depict various examples of the invention, the invention is not limited to the examples depicted in the figures.

FIG. 5B shows an original desaturated image.

FIG. 5C shows the image of FIG. 5B after being reduced to 6 colors.

FIG. 5D shows the image of FIG. 5B after being reduced to 5 colors.

FIG. 5E shows the image of FIG. 5B after being reduced to 4 colors.

FIG. 5F shows the image of FIG. 5B after being reduced to 3 colors.

FIG. 5G shows the image as FIG. 5B after being reduced to 2 colors.

FIG. 7 shows an example of a flowchart of a method of computing contiguity continuity values using a stitched image.

FIG. 8 shows an example flowchart of part of the method of FIG. 7. FIG. 8 is a continuation of FIG. 7, and is a method of computing a contiguity linearity value using a stitched image.

FIG. 11A-D shows tables of an embodiment of computing the Ambiguity Factor that may be useful in analyzing images.

FIG. 14A-D shows the application of a stitching analysis with quadrant-based color blocking, according to at least one embodiment.

DETAILED DESCRIPTION

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

In this specification, the term "logic" refers to a specialized circuit, embedded software, middleware, (note embedded software is hardware and middleware includes hardware), software, a specialized processor, a Very Large Scale Integration (VLSI) chip, a configured Application Specific Integrated Circuit (ASIC), a configured Field Programmable Gate Array (FPGA), or other logic circuit optimized and/or configured for the task in question (see U.S. Pat. No. 6,785,872 for methods for converting algorithms into circuits, which is incorporated herein by reference).

Figure 1:
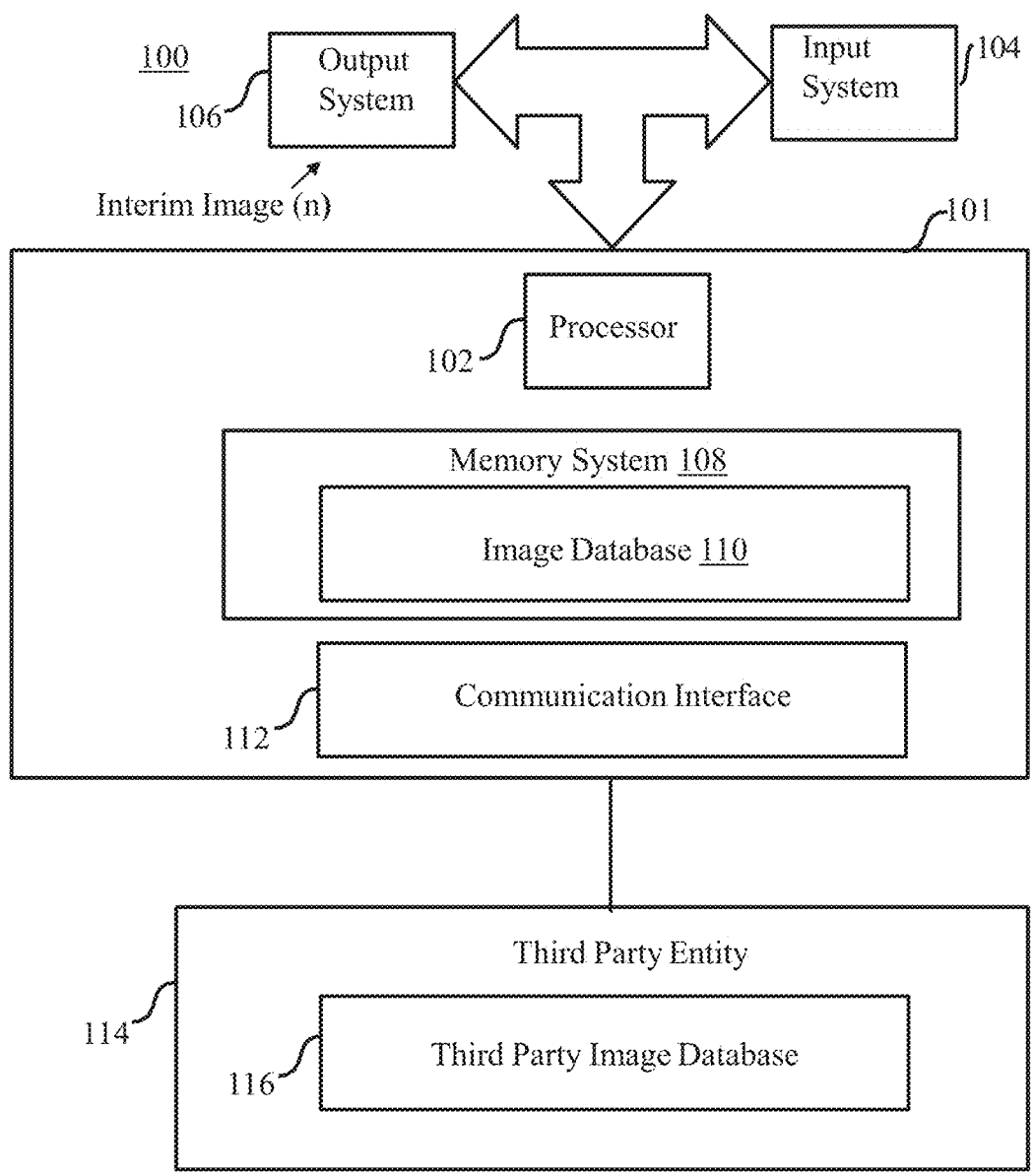
FIG. 1 is a block diagram of an example of a system that analyzes an image.

FIG. 1 is a block diagram of an example of system 100 that generates analyzing an image. System 100 may include machine system 101, which has processor system 102, input system 104, output system 106, memory system 108, image database 110, communication interface 112, and third party system 114 and third party database 116. In other embodiments, System 100 may include additional components and/or may not include all of the components listed above.

System 100 is a network of systems including multiple machines communicating in via a network, which may be used for analyzing images and/or creating artistic images by combining multiple images into one image, such as by interleaving multiple images with one another.

Machine system 101 includes one or more machines that run an image analysis system. Each machine of machine system 101 may run the image analysis system independently and/or as a distributed system. Machine system 101 may include one or more Internet servers, network servers, a system for analyzing images, may include one or more mobile machines and/or may include other machines that include machine vision, for example.

In at least one embodiment, in machine system 101, each image and/or each image of a plurality of images is analyzed to identify contiguity characteristics in the image that facilitate identification of visual qualities and characteristics indicative of how the viewer observes the image. In an embodiment, a contiguity is a continuous region having relatively uniform characteristics. In an embodiment, a contiguity is a region that is recognized by the system as one region. For example, the color recorded (e.g., as determined by the pixel value of the color) of a contiguity region may be uniform within preset thresholds (e.g., uniform enough so that an average observer would consider the color uniform or the wavelength of the color of the region is within 2 to 5 nm or within 5 to 10 nm or with a predetermined range of pixel values). Attributes of a region's color may used by system 100 to identify an interface between two regions.

As an aside, the value of a color may be represented as Hue-Saturation-Value instead of by wavelength of light. The pixel values may be used to represent the Hue-Saturation-Value or the color. Alternatively, each color may be represented by a separate pixel value. Returning to the discussion of uniformity, in another embodiment, a color is considered uniform if the variation of the pixel value representing the color varies by less than 10%, less than 5%, or less than 1% (depending on the embodiment). In another embodiment, a color is considered uniform if the variation of the pixel value representing the color varies by 10% or less, 5% or less, or 1% or less (depending on the embodiment). In another embodiment, a color is considered uniform if the variation of the pixel value representing the color varies by no more than 25 bits, no more than 15 bits, no more than 5 bits, no more than 3 bits, or no more than 2 bits (depending on the embodiment). In an embodiment, the contiguities that are of interest are those that extend horizontally across the image, which for example extend at least 75% of the width of the image (in other embodiments smaller or larger percentages of the width may be used). In an embodiment, the contiguities of interest can make an angle of 45 degrees or less with a horizontal line (in other embodiments the angle may be 75 degrees or less, 60 degrees or less, 30 degrees or less, or 15 degrees or less, for example). A contiguity can separate regions of the image and/or may define a region of the image. In at least one embodiment, the contiguity characteristics may include contiguity lines that separate different color segments in the image, e.g. the contiguities may form edges between the color segments. A contiguity line may separate a contiguity from other regions. In at least one embodiment, the images display landscape scenes in which the contiguity lines are naturally occurring horizon edges, horizon type edges, and/or border lines (e.g., edges that extend more than 50% of the width of the image and that are at an angle of less than 45 degrees). In an embodiment a contiguity line may also be horizontal. For example, in urban settings contiguity lines can be horizontal, but which depends on the subject matter. The edges of the contiguity may separate color sections of the image, for example the edges of a contiguity may separate between the background and the foreground, between objects, between different parts of a background, between different parts of a foreground, different parts of an object, and/or the like. The contiguity characteristics may enable a person viewing the image to mentally organize parts of the scene displayed in the image into different areas that allow the viewer to understand what is shown, and can be used to train a computer vision system to recognize continuities even between disrupted contiguities, which may be absent or obstructed. The terms disrupt and disruptor are used interchangeably with the terms distract and distractor. Either may be substituted one for the other to obtain different embodiments. The contiguity lines can provide a contrast, enabling the person's brain or the computer vision system to organize and evaluate the image and to resolve ambiguities in the image, image set, and/or image scene. In at least one embodiment, contiguities may be used to inform image classification (that is may be at least one factor used in determining the classification of an image) and can be used to identify content and aid in finding objects and/or regions in the image. The classification of an image is at least a part of identifying the content of the image. A classification system may have categories and subcategories and the smallest subcategories may be objects or parts of objects that are identified.

In at least one embodiment, contiguity may be defined and used to train systems to recognize parts of a whole. For example, a contiguity may correspond to (and thereby identifying the contiguity identifies) a single object or a contiguity may correspond to (and thereby identifying the contiguity identifies) a distinctive part of an object. When training a machine, contiguities may need to be identified in both single images as well as composites, and in composite images the contiguities may be split (or divided) by the other images of the composite image. A composite image is an image formed by combining at least two images together. For example, the at least two images may be interleaved with one another. The figure and ground relationships in a composite image is another value vis-a-vis training sets that may be used to further define relationships of objects in an image. An element, object, or region of an image is in the figure position when the element object or region is located where a main character of photograph would be located. An element, object, or region is in the ground position if the element, object, or region forms a contiguity that stretches across the image.

As another example, two contiguities may, or contiguity lines may section off, a region of an image that is one object or a group of related objects. Contiguities may be seen as familiar horizon lines, interfaces with a known and/or predictable color, color "context," and/or content characteristics, and may include information about the location of shapes and information about the density of a feature. The "context" of the color context refers to an assigned context, a context that is known for other reasons, a context that is predictable, and/or a context that is probabilistically inferred. The determination of the context may be based on the source of the data and/or user input specifying the context. For example, if the data has a known context, the accuracy of identifying objects may be improved. The word "density" may refer to a concentration of colors or to the saliency of elements within a defined space which may have additional context, optionally, as a result of the co-localization of the elements within a given context to help in its identification. For example, the interface with a vertically positioned blue of relatively uniform density is likely to be a sky. A dark element on the surface or at the interface is likely to be a ship—all based on known contexts and references that were previously learned over time.

An example regarding density, a uniform color may be indicative of a high density of a type of object in a particular region, and consequently, the presence of a contiguity may be an indication of a high density of some item depicted in an image. As a further example, bodies of water often form contiguities and are regions of high density of water droplets. As another example, color blocks may aid in the identification of objects or regions contained in an image or a plurality of images or image scene. The context may aid in interpreting whether a contiguity is water. Water is transparent, but reflects the colors around it—a stormy sea with dark clouds will have very different characteristics than a calm sea or lake reflecting a blue sky with still water. Nonetheless, based on the context both can still be recognized as a body of water.

As will be discussed further, below, color blocks are formed by dividing the image into blocks and assigning a color to each block. The color assigned to each block is the average color of the block. Alternatively, the distribution of colors within the block identified, or the colors by may be binned into a relatively small number of color (e.g., 6), and binned within a given block and the color that has the most pixels in its bin is the color assigned to the block, for example. In at least one embodiment, contiguities may be formed by color blocks, which can be viewed as the image's background (also referred to as ground or in the ground position) with or without a foreground image (also referred to as figure). A group of adjacent blocks having the same color may be and/or may identify a contiguity. The figure can be an object or other content element, including another color block which can disrupt the continuity of at least one color block-type contiguity.

In at least one embodiment, the system 101 may be configured to identify the contiguity lines by applying various image processing filters to the image, e.g. Sobel, thresholding, and/or the like, to identify the contiguities in the image. In at least one embodiment, the system can be configured to perform a stitch analysis of the image to designate the contiguity characteristics that are preferred for use for analyzing components in the image and to facilitate identifying images with similar or overlapping characteristics. Stitching may involve removing (or masking) portions of an image. For example, vertical sections of the image may be removed or masked. Throughout the specification the terms "remove" and "mask" and their conjugations, when used in reference to removing or masking part of an image are used interchangeably. Throughout the specification, the terms "remove" and "mask" and their conjugations may be substituted one for another to obtain different embodiments. The vertical sections removed may be of the same size as one another and equally spaced from one another. For example, the system can be configured to identify and designate contiguity lines that are horizontal, vertical, within a predetermined degree of angle deviation and/or the like, according to predetermined parameters provided to the system. Peeling or backstitching refers to putting back parts of the image that were masked or removed. In at least one embodiment, the stitch analysis may enable the system to identify contiguity characteristics that are obstructed by objects in the image that segment the contiguity line. In at least one embodiment, the stitch analysis may be implemented by dividing the image into a predetermined number of sections, e.g., three sections. At least one of the sections can be manipulated, e.g. shifted, to mask or overlap another section in the image. The overlapping section can then be peeled off the masked section to reveal portions of the masked section such that the contiguity line can be identified from the portions of the image being revealed via the peeling. An abrupt change in pixel value or Hue-Saturation-Value (HSV) in regions of the stitched image may indicate a potential disruption in the contiguity making the region a target region for further evaluation. A minimal change (within predetermined thresholds/limits) in pixel uniformity or a progression along a hue spectrum in other regions of the contiguity represents continuity of the contiguity across the width of the image.

In at least one embodiment, the system can be configured to identify the contiguity lines by applying various image processing filters to the image, e.g., Sobel, thresholding, and/or the like, to identify the contiguities in the image. In at least one embodiment, the system can be configured to perform a stitch analysis of the image to designate the contiguity characteristics that are preferred for use for analyzing components in the image and to facilitate identifying images with similar or overlapping characteristics. For example, the system can be configured to identify and designate contiguity lines that are horizontal, vertical, within a predetermined degree of angle deviation and/or the like, according to predetermined parameters provided to the system. In at least one embodiment, the stitch analysis can enable the system to identify contiguity characteristics that are obstructed by objects in the image that segment the contiguity line. In at least one embodiment, the stitch analysis can be implemented by dividing the image into a predetermined number of sections, e.g. three sections. At least one of the sections can be manipulated, e.g. shifted, to mask or overlap one other section in the image. The overlapping section can then be peeled off the masked section to reveal portions of the masked section such that the contiguity line can be identified from the portions of the image being revealed via the peeling.

Processor system 102 may include any one of, some of, any combination of, or all of multiple parallel processors, a single processor, a system of processors having one or more central processors and/or one or more specialized processors dedicated to specific tasks.

Input system 104 may include any one of, some of, any combination of, or all of a keyboard system, a mouse system, a trackball system, a track pad system, buttons on a handheld system, a scanner system, a microphone system, a connection to a sound system, and/or a connection and/or interface system to a computer system, intranet, and/or internet (e.g., IrDA, USB), for example. Input system 104 may include a graphical user interface that third parties can interact with.

Output system 106 may include any one of, some of, any combination of, or all of a display, a monitor system, a handheld display system, a printer system, a speaker system, a connection or interface system to a sound system, an interface system to peripheral devices and/or a connection and/or interface system to a computer system, intranet, and/or internet, for example. Output system 106 may include a network interface via which third parties interact with machine system 101. Input system 104 and output system 106 may be the same system or different system.

Memory system 108 may include, for example, any one of, some of, any combination of, or all of a long-term storage system, such as a hard drive; a short-term storage system, such as random access memory; a removable storage system, such as a floppy drive or a removable drive; and/or flash memory. Memory system 108 may include one or more machine-readable mediums that may store a variety of different types of information. The term machine-readable medium is used to refer to any non-transient medium capable carrying information that is readable by a machine. One example of a machine-readable medium is a non-transient computer-readable medium. Another example of a machine-readable medium is paper having holes that are detected that trigger different mechanical, electrical, and/or logic responses. Memory system 108 may store one or more images for users to select from and/or that users may use.

Image database 110 may be a database of images that may be analyzed, that were analyzed, and/or from which composite images may be formed. Optionally image 110 may include a relational database. Optionally, image database 110 may associate with images and/or portions of an image attributes, such as contiguity, ambiguity, juxtaposition (which is rating of a contiguity, which will be discussed further below), a color map and/or other color properties, saliency, complexity, aesthetic value, edge information, context information, content and/or category description, spatial information about contiguities, and/or threshold information. Optionally, image database 110 may be associated with a database server for retrieving information from image database 110. Optionally, the image server (if present) may be a relational database and the database server may be executed by processor system 102 or by its own processor system.

Communication interface 112 is an interface, via which communications are sent to and from machine system 101. Communications interface 112 may be part of input system 104 and/or output system 106.

Third party system 114 is a third party system and interacts with machine systems 101 to analyze images. Third party system 114 may include third party database 116, which stored images of the third party system 114. Third party system 114 is optional.

Processor system 102 may be communicatively linked input system 104, output system 106, memory system 108, and communication interface 112. Processor system 102 may be communicatively linked via any one of, some of, any combination of, or all of electrical cables, fiber optic cables, and/or means of sending signals through air or water (e.g. wireless communications), or the like. Some examples of means of sending signals through air and/or water include systems for transmitting electromagnetic waves such as infrared and/or radio waves and/or systems for sending sound waves.

In at least one embodiment, machine system 101 may be configured to receive an image, for example, from third party system 114. The image may be stored in the image database 108, which may store other images. Processor system 102 may retrieve, and/or the image may be provided, image to processor system 102 for the contiguity analysis. In at least one embodiment, machine system 101 may be configured to size and crop the image to a predetermined size and/or to divide the image into sections and each section may be sized and cropped. The cropping may remove portions of the image or the portions of the image that are not wanted, or edges of the image that cause the image to be too large for generating the composite image, and/or to centralize dominant contiguities and color blocks in the image or in a portion of an image. In at least one embodiment, machine system 101 can be configured to generate an image grid map. The image grid map may be generated, for example, by designating the Cartesian coordinate system to the image designating numerical coordinates of the image. In at least one embodiment, the numerical coordinates may be pixel locations of the image or may be used to construct (and/or define) quadrants, sub-quadrants and/or some other predetermined areas of the image.

Figure 2:
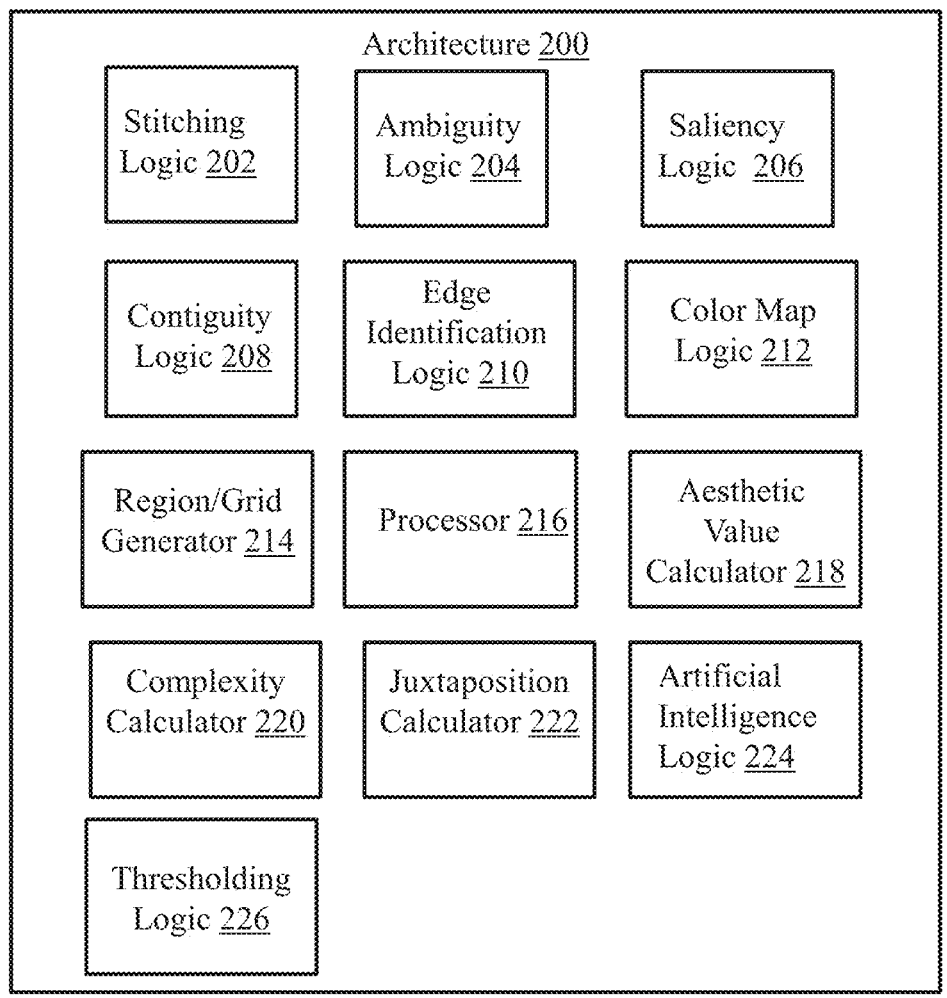
FIG. 2 is a block diagram of an embodiment of the architecture of the machine system of FIG. 1.

FIG. 2 is a block diagram of the architecture 200 of machine system 101, which may be designed to analyze an image and/or create composite images. Architecture 200 may include stitching logic 202, ambiguity logic 204, and saliency logic 206, contiguity logic 208, edge identification logic 210, and color map logic 212, region/grid generator 214, processor system 216, aesthetic value calculator 218, complexity calculator 220, juxtaposition calculator 222, the artificial intelligence logic 224, thresholding logic 226, and/or sizing and cropping logic 228. In other embodiments, architecture 200 may include additional components and/or may not include all of the components listed above.

Stitching logic 202 performs the stitching of an image. During the stitching a portion of an image (e.g., one or more horizontal strips) may be removed from the image. After removing the portions of the image, the image may be analyzed, such as by computing the contiguity, and optionally other characteristics of the image, such as the saliency, color block depth, ambiguity, color map, edge detection, color threshold map, brightness and/or threshold map. After removing the portions of the image, and analyzing the image, the portions may be returned. After each portion of the image is restored, the image is again analyzed to determine contiguities, determine contiguity characteristics, perform a multi-contiguity analysis, and optionally determine other characteristics.

Ambiguity logic 204 determines the ambiguity of an image and/or of a portion of an image. The ambiguity is a measure of the degree to which there are elements that may have multiple interpretations.

Saliency logic 206 computes the saliency of an object, image, or portion of an image. The saliency is a measure of the contrast within and between objects or elements. Specifically, the saliency is a measure of internal contrast. Regions of high saliency may be regions that include a foreground type object. In other words, if the saliency is above a predetermined threshold value it may be one or one of multiple factors used to determine whether a region is a foreground object or part of a foreground object. Alternatively, the saliency value may be part of a formula for determining whether a region is part of a foreground object.

Contiguity logic 208 identifies contiguities in an image and/or contiguity lines in an object. Contiguity lines may aid in identifying separate regions that have different meaning from one another, such as separating land from sky, foreground from background, street from buildings, plains from mountains or hills.

Edge identification logic 210 may identify edges in an image. In an embodiment, edge identification logic may divide images into regions that have pixels with brightness values above and below a particular threshold and/or have a wavelength of color within a particular window, to help identify regions in the image. Edge identification logic 210 may also divide regions that are below a particular color threshold. Color map logic 212 maps the color of different regions. The image may be separated out into images of different colors and color maps of the image may be constructed (e.g., a blue image made from the blue pixels of the image, a red image made from the red pixels of the image and a green image made from the green pixels of an image.

Region/grid generator 214 may generate a grid and/or divide the image into multiple regions (e.g., quadrants, halves, thirds, eighths), which may be further divided into sub-regions. The regions, subregions, and grid may be used to identify the locations of elements in an image. Processor system 216 may be an embodiment of processor system 102, and may be capable of implementing a stitching analysis, determining contiguities, computing aesthetic value, complexity, and/or juxtaposition of an image and/or portions of an image.

Artificial intelligence logic 224 may be a neural network or other artificial intelligence logic. Artificial intelligence logic 224 may receive a training set of images, and/or stitched images that are associated with the contiguity values, an identification of contiguities, an identification of contiguity lines, an aesthetic value, a complexity value, and/or juxtaposition values, and an identification of objects and/or of object parts in the image. After receiving the training set, artificial intelligence logic 224 may be trained to identify objects based on the stitched images that are associated with the contiguity values, an identification of contiguities, an identification of contiguity lines, an aesthetic value, a complexity value, and/or juxtaposition values, for example. Thresholding logic 226 creates a derived image by setting all pixels above a threshold to one value and below the threshold to another value, which may be helpful in identifying edges and/or other features. Thresholding logic 226 is optional and may be part of edge identification logic 210. Sizing and cropping logic 228 may automatically size and crop the image or portions of the image.

Figure 3:
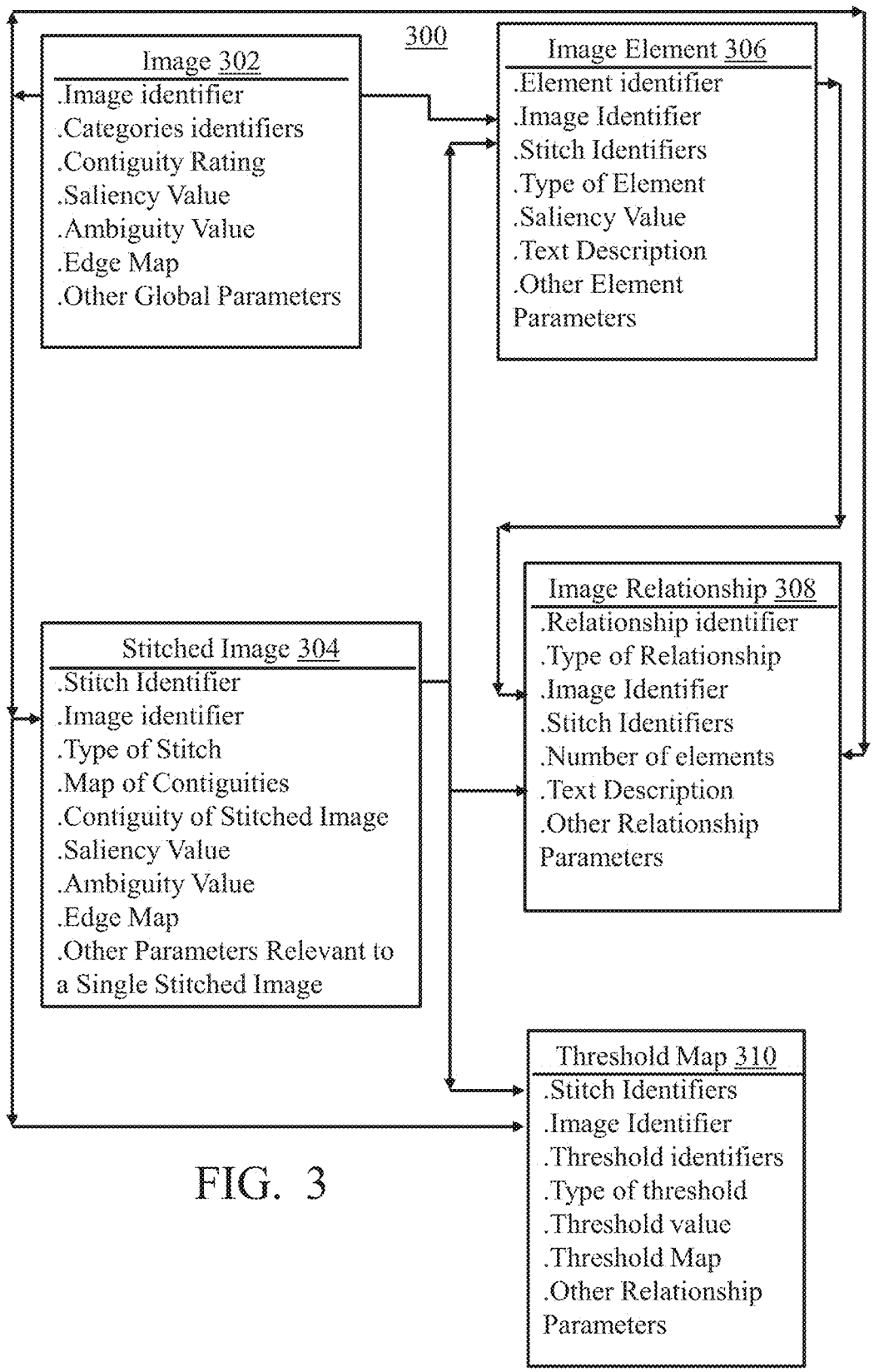
FIG. 3 shows an example of entity relationship diagrams of an embodiment of a database schema of the system of FIGS. 1 and 2.

FIG. 3 shows an example of entity relationship diagrams of an embodiment of a database schema 300 of the system of FIGS. 1 and 2. Database schema 300 may include an image table 302, a stitched image table 304, an image element table 306, a relationship image table 308, and threshold map 310. In other embodiments, database schema 300 may include additional components (such as tables) and/or may not include all of the components (e.g., tables) listed above.

Image table 302 may include various attributes associated with the image. A particular object of a table may be found by searching the attributes of the object. For example, a user may find a particular image by searching for an image having a particular set of attributes. For example, image table 302 may include among its attributes an image identifier, category identifier, a saliency value, and a contiguity rating value (or juxtaposition value), edge map, and/or other attributes. Image table 302 may also include an edge value, which may be generated by an edge identification table. The image identifier is a primary key and a unique identifier of an image.

Each of the stitched image table 304, an image element table 306, a relationship image table 308, and threshold map 310, have the image identifier as a key, so that each threshold map, image relation, image element may be associated with one image. The stitched image table 304 lists each stitched image of each image. Each image may have multiple stitched images. The attributes of the stitched image table 304 may include the image identifier, stitched image identifier, map of contiguities, stitched image contiguities, saliency value, ambiguity value, edge map, and other attributes. The image identifier identifies the image that the stitched image was generated from, and the stitched image identifier uniquely identifies the stitched image. Stitched image table 304 may also include a type, which describes the type of stitch, which may indicate how much of the image was removed and/or the portion removed. The saliency, ambiguity, and edge map may be the saliency value, ambiguity, and edge map of the stitched image.

Image element table 306 may be a table of elements identified in images. Image element table 306 includes an image identifier identifying which image the element was found in, and an element identifier identifying the element. Image element table 306 includes an image identifier, relationship identifier, stitched identifier, type of element, text description, and/or other attributes. Image element table 306 may include a descriptor that identifies any relationship that involves the element. Image element table 306 may include a type of element that describes the type of element.

Relationship table 308 may be a table of relationships identified in images. Relationship table 308 includes an image identifier, relationship identifier, stitched identifier, type of relations, text description, number of elements and other elements. The image identifier identifies which image the relationship was found in, and the relationship identifier uniquely identifies the relationship. Relationship table 308 may include a descriptor that identifies any objects in the image that are related by the relationship.

Threshold map table 310 may be a table that lists all the threshold maps. The attributes of threshold table 310 may include a relationship identifier, stitch identifier, type of threshold, threshold value, threshold map. The image identifier identifies the image from which the threshold map was created, and a threshold map identifier identifies the threshold map. The type of threshold indicates the type threshold, such as whether the threshold map is a black and white threshold map or color threshold map. Threshold attribute is the value used as the threshold for making the threshold map.

Figure 4:
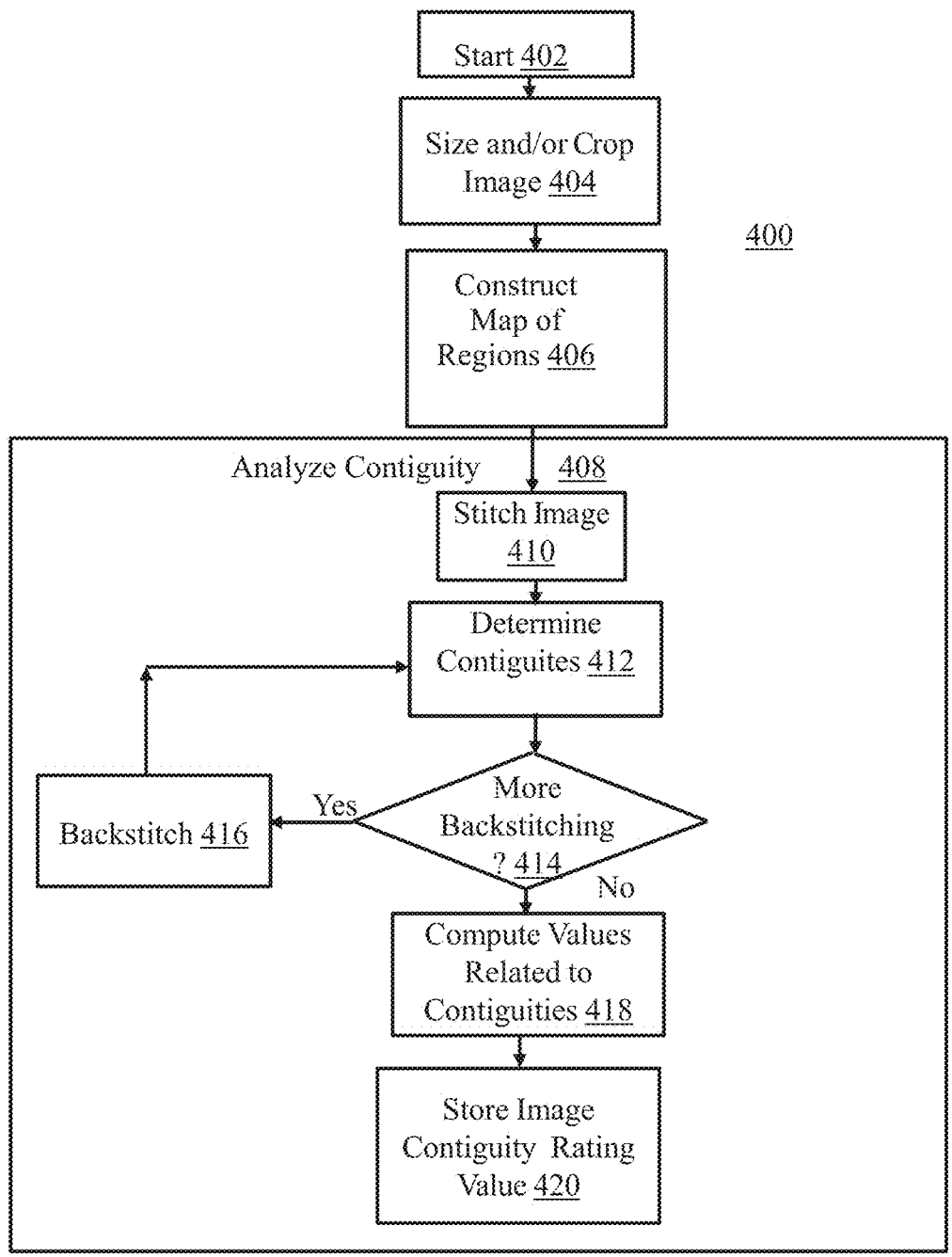
FIG. 4 shows an example of a flowchart for performing a contiguity analysis of an image.

FIG. 4 shows an example of a flowchart 400 for performing a contiguity analysis of an image. In step 402, method 400 starts. For example, in step 402, one or more images are received, retrieved, captured, taken and/or formed, via processor system 102 and/or communication interface 112.

In step 404, the image may be sized and cropped (step 404 is optional), via processor 112 and/or sizing and cropping logic 228. In other words, the image may be enlarged or reduced and/or edges may be removed by processor 112 and/or sizing and cropping logic 228. In at least one embodiment, machine system 101 may be configured to size and crop the image to a predetermined size. The cropping may remove portions of the image that are not wanted, or edges of the image that cause the image to be too large for generating the composite image, and to centralize dominant contiguities and color blocks.

In step 406, a quadrant map and an image grid map are generated, via region/grid generator 214. In at least one embodiment, machine system 101, via region/grid generator 214, may generate a quadrant map, which can equally divide the image into quadrants spanning the entire area of the image (or into another number of regions, such as halves, thirds, fifths, sixths, eighths, etc. In at least one embodiment, the quadrants can be arranged along a Cartesian coordinate system including an X-axis and a Y-axis, in which the center of the Cartesian coordinate system can be predetermined according to predetermined parameters, such as position of dominant content, color blocks, and/or the like. The dominant content may be content that occupies either a majority of the image or a greater portion of the image than other content identified. For example, a single contiguity that is larger than all other contiguities may be the dominant content. In other embodiments, other coordinate systems may be used, such as polar coordinates, hyperbolic coordinates, elliptical coordinates, etc.

In at least one embodiment, machine system 101, via region/grid generator 214, may be configured to generate the image grid map. The image grid map can be generated, for example, by designating the Cartesian coordinate system to the image designating numerical coordinates of the image. In at least one embodiment, the numerical coordinates can be pixel locations of the image or can be used to construct quadrants or some other predetermined areas of the image. The coordinates generated by region/grid generator 214 may be the pixel coordinates or may be the pixel coordinate plus (or minus) an additive constant and multiplied (or divided) by a scaling factor. In at least one embodiment, machine system 101, via region/grid generator 214, is configured to generate a measurement area within the image grid map. The measurement area may be designated as a predetermined area of the image grid map in which the contiguity characteristics may be identified. In at least one embodiment, the measurement area enables identification of objects in the image.

In step 408, the contiguities of the image are analyzed, via contiguity logic 208. In at least one embodiment, machine system 101, via contiguity logic 208, is configured to analyze the image to identify contiguities in the image. In at least one embodiment, the contiguity of the image can include contiguity lines, e.g. the edges that separate different regions of the image according to color differences between the areas, color combinations, and/or the like. The identification of the contiguities may be performed by identifying edges and/or regions having a uniform coloring and/or brightness (within a predetermined threshold). In at least one embodiment, the contiguities can enable a viewer of the image to identify objects, backgrounds, foregrounds, or the like in the image. The contiguities may appear in different locations within the image according to the visual content of the image, image set, or image scene comprised of a at least one image. Optionally, the contiguities are identified, via contiguity logic 208, prior to performing any of the substeps of step 408. Contiguity logic 208 may call edge identification logic 210 and/or thresholding logic 226 to assist in identifying contiguities.

In step 410, one or more images are stitched, via stitching logic 202, by removing one more parts of the image. Optionally, the parts removed may be rectangular sections stretching from the top of the image the bottom of the image. For example, the middle third of the image may be removed.

In step 412, the contiguities of the stitched image are identified and/or analyzed, by contiguity logic 208. Contiguity logic 208 may call stitching logic 202 to facilitate identifying contiguities. The stitching may further facilitate determining contiguities (that were not previously identified) and determining objects that interfere with the contiguity, breaking up the contiguities. Color blocks that have similar color but different colors may create object interference (interference that make it difficult to distinguish the border between two or more objects), by making it difficult to distinguish the border between colored regions. Stitching and peeling (via stitching logic 202 and/or contiguity logic 208) may facilitate identifying two separate contiguities and/or separate objects despite the object interference and may help bracket the location of a border between where two color regions and/or two objects. In at least one embodiment, the stitch analysis may include masking and progressively peeling portions of the image to enable analyzing a reduced portion of the image to enable defining contiguity characteristics, e.g. contiguity lines, horizon lines, interfaces breaking up the lines, linearities, continuities, regularities, object locations, for example. The steps for angularities, stitching and peeling are discussed further below.

In step 414, a determination is made whether predetermined criteria are met indicating to backstitch the image. For example, in an embodiment, a determination may be made whether the image has been backstitched, yet, and if it has not been backstitched, it is assumed that it is desired to backstitch the image. In another embodiment, the user may enter input that indicates whether to backstitch the image, and if it is determined that the input indicates that the user wants the backstitching to be performed, then it is determined that the backstitching is desired. If it is desired to backstitch, the method proceeds to step 416. In step 716 the image is backstitched. Optionally, each time step 416 is performed a fraction of the image that was previously removed (or masked) is put back into the image (or unmasked). After step 416, the method returns to step 412, where the backstitched image analyzed (e.g., for contiguities). Steps 412, 414, and 416 may be performed multiple times, until all of the backstitching desired is performed.

In at least one embodiment, machine system 101, can be configured to perform the serial backstitch to an image, set of images, or a scene within an image. The serial backstitch may compress the contiguity edge analysis by arranging in an adjacent manner the non-adjacent sections of an image. The serial backstitch can be configured to compress the image on which the contiguity and/or edge analysis is performed by bringing together non-adjacent sections of the image.

Returning to step 414, if all the backstitching needed has been performed, the method proceeds to step 418. In step 418, the computations of the multiple implementations of step 416 are combined. For example, the values representing the contiguity characteristics that were determined in each backstitch are averaged by the total number backstitching steps 416 were performed. The backstitching and evaluation of contiguities is discussed further below.

In step 420, an image contiguity rating ("CR") value (ambiguity value, or juxtaposition value) is stored in association with the image. In this specification the terms juxtaposition value and contiguity rating value and ambiguity value are used interchangeably. Throughout this specification either term may be substituted for the other term to obtain different embodiments. The locations of the contiguities are also stored in association with the data, for further analysis of the image. In at least one embodiment, machine system 101 can be configured to store the image CR value. The image CR value can include a rating that enables machine system 101 to determine an image compatibility for use in generating the composite images. Composite images may be the combination of multiple images. For example, two or more images may be interleaved with one another to form a composite image. The image CR value may be based on multiple parameters, such as the definiteness of the contiguity in the image (e.g., how much contrast exists between the contiguity and surrounding regions), the number of contiguities identified in the image, spatial distribution of the contiguities, the width of the contiguities, the color composition of the contiguities, and/or the angularity of the contiguity (that is, the angularity is the angle at which contiguity is oriented—a larger angle between the horizontal axis and the contiguity may detract from the contiguity and therefore lower the CR, in a convention in which a higher CR value represents more contiguities with a higher distinctiveness of individual contiguities, where viewed in isolation of the other contiguities).

FIG. 5 schematically illustrates a method 500 for generating a contiguity rating value and other related parameters. In step 502, dominant contiguities are identified by edge identification logic 210. In at least one embodiment, machine system 101 is configured to identify dominant contiguities. The dominant contiguities can be identified, for example, implementing Sobel filters to the image, or another edge identification method, and then using the edges to determine the size and distinctiveness of each contiguity. The dominant contiguities can be determined by the edges of the image as well as the color blocks in the image. For example, each contiguity may be assigned a score. In an embodiment, a contiguity that includes a dominant edge is a dominant contiguity. Dominant edges are dominant contiguities, but not all dominant contiguities may not be dominant edges as a contiguity can also be a color block. Dominant edges are discussed below in conjunction with step 502.

Continuing with the description of step 502, in step 502, the total number of contiguities and dominant edges are also identified in the image. In an embodiment, a dominant edge is an edge that extends across at least a majority of the image. In an embodiment, a dominant edge is an edge that is longer than the majority of other edges. In an embodiment, a dominant edge is an edge that is longer than the majority of edges and extends more horizontally than vertically, and/or extends diagonally. In an embodiment, a dominant edge-type contiguity would extend horizontally across 75% or more of the image. In at least one embodiment, machine system 101 is configured to verify the total number of contiguities, which include the dominant edges in the image, which may be in any direction. The dominant edge can be determined by performing a corner and border identification of the image and identifying edges between color blocks that are above a predetermined contrast and/or threshold level. A dominant edge can have a CR value between 0.75-2.25. In at least one embodiment the dominant edge/contiguity is the edge/contiguity that is used for making measurements, and which contributes to the image's switch capacity. Optionally, a dominant edge has a contrast between adjacent regions that is above a predetermined threshold. For example, in an embodiment, a dominant edge has a contrast of at least 8:1, at least 10:1, at least 20:1, or at least 100:1.

In step 504 thresholding is performed by threshold logic 226. Thresholding logic 226 may form a binary image by setting pixels of the original image above the threshold to white (or black) and the pixels below the threshold being set to black (white). The threshold may be for brightness, a particular color, and/or hue. In at least one embodiment, machine system 101, by thresholding logic 226, may be configured to apply a threshold filter function to the image. The threshold filter function of thresholding logic 226 may aid in partitioning the image into a foreground and background. The thresholding of thresholding logic 226 may be based on a particular reduction of the colors in the image. The reduction of the color in the image may be performed by representing a color that is not in the color palette of the machine that made the image with the closest color in the palette and/or a dithering pattern of the close colors. The threshold filter function of thresholding logic 226 may generate a binary image of the image to enable edge recognition or detection between the foreground, the background, and/or objects in the image, for example. The terms recognition and detection are used in interchangeably throughout the specification. Throughout this specification, each may be substituted for the other to obtain different embodiments. The threshold filter function may include computing, by thresholding logic 226, a histogram, and clustering the colors into bins and setting the threshold, so as to operate between two clusters of bins. Thresholding logic 226 may choose the threshold based on color, hue, or brightness level that divides between colors, hues or brightnesses that are associated with different levels of entropy (e.g., perhaps pixels having a brightness of above 200 are associated with regions having more entropy than those below the threshold and so the binary image is formed with the threshold set at a brightness of 200). The threshold of thresholding logic 226 may be set based on an object attribute. For example, pixels that are known to be associated with a particular attribute or interest (e.g., an object of interest) tend to have a particular color or brightness and so the threshold may be set and a color or brightness above or below that particular color. The threshold of thresholding logic 226 may be based on spatial filtering. For example, certain regions of the image may be removed from the image, prior to setting the threshold. In at least one embodiment, a multi-level thresholding filter can be implemented by thresholding logic 226 to designate a separate threshold for each of the red, green, and blue components of the image, which can then be combined, for example. Alternatively, multiple brightness thresholds may be set by thresholding logic 226 to produce multiple binary images.

In step 506, thresholding logic 226 may generate a threshold-spatial map (which may be referred to as a T-spatial map). The threshold spatial map stores the locations (e.g., the pixel coordinates of each pixel of the original image that has a value above a threshold and/or each pixel of the original image that has a pixel blue below a threshold may be stored as the T-spatial map). In at least one embodiment, machine system 101 can be configured to generate, by thresholding logic 226, the T-spatial map, for example, by implementing a threshold filter to the image. The application of the T-spatial map to an image helps define edges, contiguities, and dominant contiguities. The line in the image that divides between regions of the image having the pixels that are above and below the threshold may be and/or may be related to edges, contiguity lines, and dominant contiguities in the image. Similarly, the regions having pixels of one of the two types, may be contiguities or may be parts of contiguities (depending on the size and shape of the region, whether the region is identified as being part of a larger region and/or other characteristics of the region).

In step 512, color hues are compressed, by color map logic 212. The compression of the colors may involve, for each pixel determining which of a predetermined number of colors the pixel of the original image is closest to. In at least one embodiment, machine system 101 can be configured to compress the color hues. The color hue compression may reduce the colors in the image to a predetermined number of colors, for example, to a number of colors that is within a range of 2-6 colors, for example.

In step 514 the averaged hue percentages are computed, by color map logic 212. For example, for each of the predetermined colors the percentage of the total number of pixels in the image that are binned with (closest to) one of the predetermined colors. Thus, if one of the colors (e.g., red) has 2500 pixels associated with that color and the image has 1096×1096 pixels, then there are 2500*100%/(1096× 1096)=0.2% red pixels. In at least one embodiment, machine system 101 can be configured to calculate, via color map logic 212, the averaged hue percentages. Optionally, a map is constructed having the pixel locations (e.g., pixel coordinates) of each color. The averaged hue percentages of the colors may be identified in the image locations.

In step 516, the hue compression ("HC") spatial distribution is mapped by the color map logic 212. In at least one embodiment, machine system 101 may be configured, by the color map logic 212, to map the hue compression spatial distribution. In other words, the probability of a pixel having a particular color being in a particular region is computed (e.g., as the percentage of the pixels in a particular region having that color). The HC spatial distribution can be correlated to location according to a higher-order probability distribution and/or correlation between the pixels of the image and the location of the colors in the image. The higher order probability refers to other information that may skew the probability distribution. For example, perhaps, as a result of binning the pixels, it is known that 30% of the pixels are blue. Perhaps, as a result of user input, prior images, a category to which the image belongs (or other information), it is expected that the image includes a region in the upper half of the image representing the sky, and as a result, based on prior images there, is a 90% chance of a blue pixel being located in the upper half of the image and only a 10% chance that a blue pixel is located the lower half of the image. Then for this image, there is a 27% chance that pixels in the upper half of the image are blue and 3% chance that pixels in the lower half are blue. The likelihood of a particular pixel being a particular color, depending on where the pixel is in the image, may be affected by the context, saliencies, and a knowledge reference matching pixel distribution (that is, based on prior distributions of the pixels of prior images).

In step 518, a hue compression spatial map may be generated by color map logic 212. In at least one embodiment, machine system 101 can be configured to generate the hue compression spatial map. The hue compression spatial map provides a mapping of the colors provided through the hue compression. As part of step 518, color map logic 212 may compute the locations of color blocks (each color block has the color of the average of the color of the block or the hue with the most pixels in its bin). Optionally, each block of a grid is overlaid on the image and is assigned its average color as the color of that block, by color map logic 212.

In step 522 color blocks are compared to one another, by color map logic 212. In at least one embodiment, machine system 101 can be configured, by color map 212, to compare the color blocks, which may determine different color blocks in the image and may determine similarities and dissimilarities within and across the image grid map. Regions of color blocks (where each region is a group of adjacent blocks of the same color) may be compared according to different quadrants in the image grid. The comparing of the color blocks may be in order to determine the different values. For example, in a black and white image, the color block comparison can differentiate between colors having a binary value of zero for white color blocks and a binary value of one for black color blocks. In a second example, the image may include color blocks such as green and blue, where each color is represented by a distinct value, which enables comparing the color blocks within the image grid map.

In step 524, symmetrically-placed color blocks may be mapped by color map logic 212. In at least one embodiment, machine system 101, by color map logic 212, may map color blocks that have a symmetrical shape. Machine system 101, by color map logic 212, may determine that the color blocks are symmetrical according to the pixel location or the location within the grid of the color block pixels on the image grid map and may evaluate the asymmetry of a color block, by color map logic 212. In at least one embodiment, the number of grid boxes of the color block on the image grid map may be compared, by color map logic 212, to determine the edges of a region having adjacent block of the same color to determine whether the region of having a group of color blocks of the same color is symmetric, across and within the region of the color blocks of the same color, and may be compared to color block depth$_{ST}$ (CBD$_{ST}$) data obtained as being symmetrical or showing symmetrical color characteristics, such as blue hues in a region of sky. The "ST" in the subscript of the term "color block" stands for the word "stitch," and the number "ST" indicates the percentage of the total image that remains after the stitching. For example, color block depth67 means a color block value performed in an image that was stitched by removing ⅓ of the image leaving ⅔ of the image and the value assigned according to rules described in FIG. 11B. The shape of the region of blocks having the same color may be indicative of an underlying contiguity and may place limits on the size and shape of the underlying contiguity. Using the bins, the color block depth may be computed. The image is divided into four blocks, where each block is a quadrant of the image. For each quadrant the color with the most pixels in that color's bin is determined, and that is the "color mode" for the block (the "color mode" of a block is the color—of the 2-6 colors into which the image is mapped that occurs most often in that block). If all four quadrants have the same color mode, the color block depth is 1. If two adjacent blocks have one color mode and the other two adjacent blocks have another color mode, the color block depth is 0.75. If two adjacent blocks have one color mode and the other two blocks have each have a color mode different from one another and different from the first two blocks, the value is 0.5. If two nonadjacent blocks have one color mode and the other two nonadjacent blocks have another color, the color mode block depth is 0.5. If all quadrants have different color block modes, the color block depth has a value of 0. If two nonadjacent blocks have one color mode and the other two blocks each have a color mode that is different from one another and different from the first two blocks, the color block depth is 0. Each quadrant may be further subdivided into quadrants and a color block depth may be computed for each quadrant. The color block depth may be computed for different degrees of the stitched or backstitched image.

In step 526, a color block depth 100 ($CBD_{100}$) map is generated by color map logic 212. In at least one embodiment, machine system 101 can be configured to generate the $CBD_{100}$ map. The image may be divided into a predetermined number of blocks. Quadrants that can be defined as positive and negative values arranged on the Cartesian coordinate system or with a numerical label, Q1, Q2, Q3 and Q4. The number of color block patterns identified by machine system 101, in each quadrant, relative to other quadrants in the image can provide a relational analysis of different color portions of the image, their distribution and symmetry, and which can be mapped onto the grid of the map to generate the $CBD_{100}$ map. The nuanced differences are regions which are subjected to further analysis. As quadrants are drilled down into sub-quadrants (and sub-sub-Qs) is where CB differences become more evident allowing for the identification of IE and VD. Each quadrant may be analyzed individually, and any quadrant that has features that correspond to something of interest may be further divided into quadrants (or other sectors) and analyzed individually and each sub-quadrant, having features corresponding something of interest may be further subdivided and analyzed individually. The process of identifying sectors having features corresponding to something of interest and then further subdividing those sectors may be continued until there are two few pixels in the sectors with which to make further analysis (e.g., when each sector only has one pixel).

The values for $CBD_{100}$ are based on the rules which will be described, below, in FIG. 11B. The color block map of the original intact image and the various stitched images may be compared and the characteristics of the image derived from the color maps from each stitch may be averaged.

In step 528, the hue compression spatial map and $CBD_{100}$ map are combined (e.g., integrated or superimposed on one another, so that one map appears foreground and the other map appears as background). In at least one embodiment, machine system 101 combines the hue compression spatial map and the $CBD_{100}$ map. The hue compression spatial map generated from the threshold function may be aligned with the $CBD_{100}$ map to provide a unified map for recognizing the necessary edges for designating the contiguities in the image based on the color composition. The combined hue compression spatial map and $CBD_{100}$ map may be used maintain the embedded color information of the image.

In step 530, a $CBD_{100}$ is generated in at least one embodiment, machine system 101 can be configured to generate the $CBD_{100}$, which is the composited map including the overlaid information obtained by aligning the hue compression spatial map and the $CBD_{100}$ map.

In step 532, the T-spatial map and the $CBD_{100}$ are combined. In at least one embodiment, machine system 101 can be configured to combine (e.g., integrate) the T-spatial map and the $CBD_{100}$.

In step 534, a contiguity number (or value) is generated by contiguity logic 208. Color block data and spatial data may also be generated by contiguity logic 208, as part of step 534. In at least one embodiment, as part of step 534, machine system 101 may generate the contiguity number, the color blocks and the spatial data. The contiguity number may be the number of contiguities designated in the image based on predetermined parameters (e.g., based on predetermined thresholds for threshold maps and predetermined number of stitches and peels, are predetermined set of bins of hue, and predetermined grid, and block size for the blocks of the regions of color blocks having the same color).

In step 536 an image saliency value is generated. In at least one embodiment, machine system 101 can be configured to generate the image saliency value. The image saliency value provides a 'unique quality for a group of pixels or for a single pixel relative to surrounding pixels and the rest of the image, and enables easier analysis of the image. In one embodiment, the saliency is represented by a combination of contiguity factors including: contiguity number, number of color blocks, color block depth 100, and the spatial color contiguity comparison. Regions where color or brightness differences may be present are identified by the differences in the distribution and the number contiguities and color blocks in an image.

The image saliency value sets a contour for extracting information from the image to enable edge detection, e.g. each pixel in a region that is similar with respect to a predetermined characteristic or computed property, such as color, intensity, texture or the like. In other words, since the saliency value is an indication of whether a particular region is of interest (e.g., as a result of having a different color, brightness, texture, and/or other characteristics than neighboring regions) if the saliency value crosses a particular threshold value the region may be further analyzed to determine characteristics of sub-regions with the region of interest. In this specification, the words brightness and intensity are interchangeable, either may be substituted for the other wherever they occur to obtain different embodiments.

In step 538, the saliency value is stored in image database 110 and/or passed on to other methods that make use of the saliency. The image saliency value, which is a measure of internal contrast, contributes to the dominance of a subset of image characteristics defined in part or whole by continuous and/or a contiguous group of color blocks of recognized elements and their corresponding juxtapositions (or Contiguity Rating-CR values), or as defined by the shape of the group of color blocks. As will be discussed further below, the ambiguity value is given by $Ambi_{SAL} = \Sigma(AF_1 + AF_2 + AF_5 + AF_6)$.

Figure 5A:
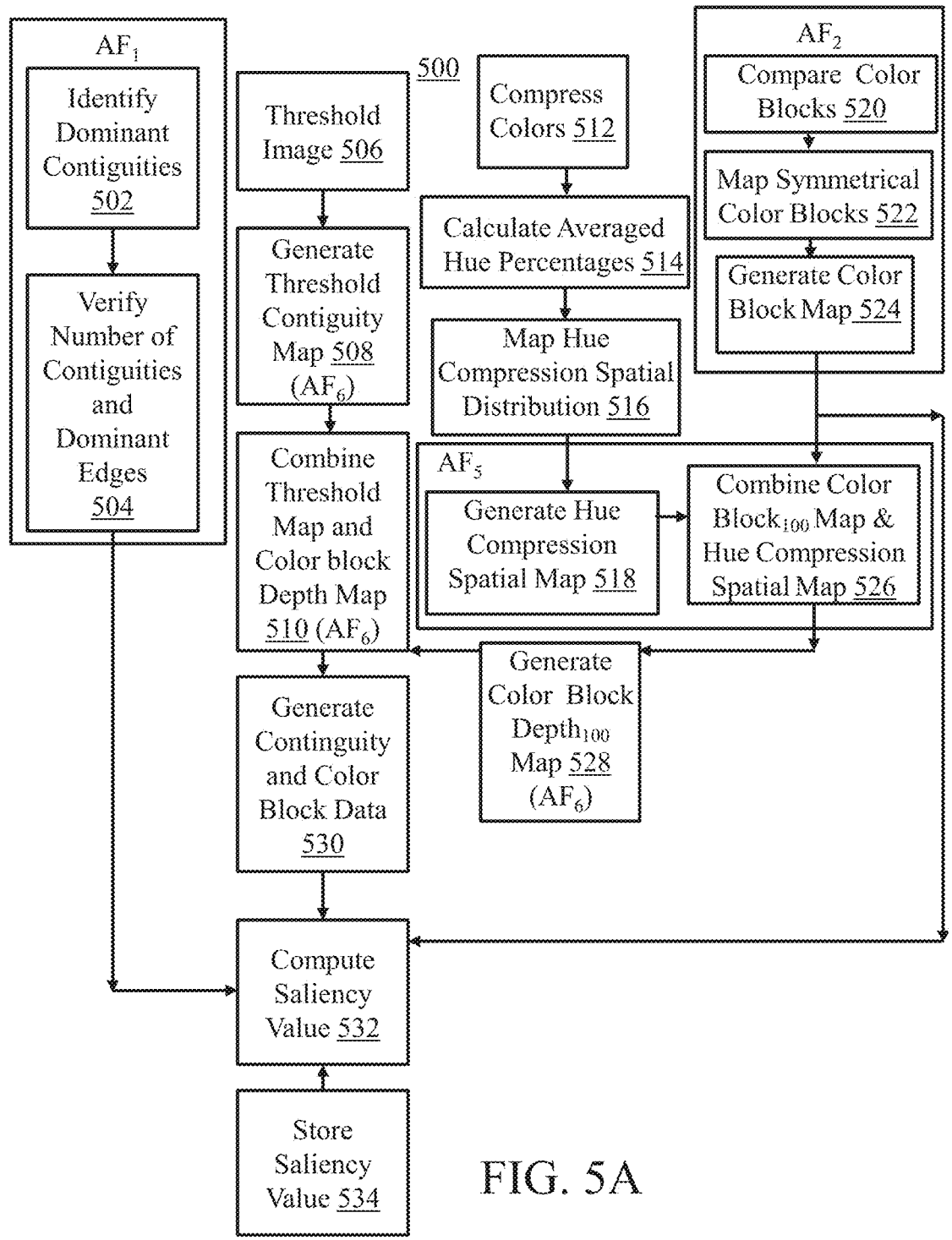
FIG. 5A shows an example of flowchart of an embodiment of a method for computing parameters associated with contiguities and/or contiguity lines.

$AF_1$, $AF_2$, $AF_5$, and $AF_6$ are discussed further below, and the steps of FIG. 5A that compute each ambiguity factor is indicated in FIG. 5A. In an embodiment, if $Ambi_{SAL} < 5.5$, the images contains a significant amount of nuanced or poorly defined distractions—no clear attention focus, save for the contiguities present in the image. Images in this category can be used to focus on nuanced details as an attractor and/or distractor element. If $Ambi_{SAL}$ is between 5.5-14 then there is a balanced color blocking and contiguity/edge sharpness (an optimal range for looking at details in an image and/or for focusing on a particular object or element in the image. If $Ambi_{SAL} > 14$, the the image contains a significant number of discontinuous contiguities, little or no color symmetry, and the objects may be disrupted; there are lots of parts to look at. Images in this category can be used to focus on nuanced details as attractor and/or distractor element).

Figure 5B:
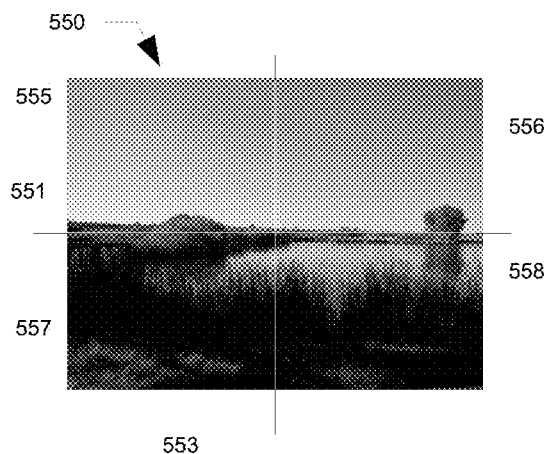
FIGS. 5B-G show an example of T-spatial, hue compressed maps.
Figure 5C:
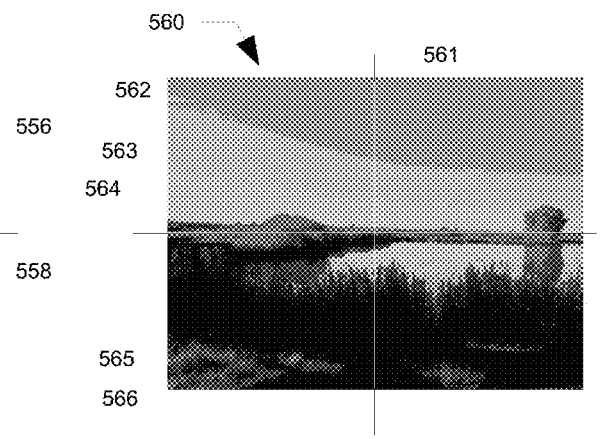
Figure 5D:
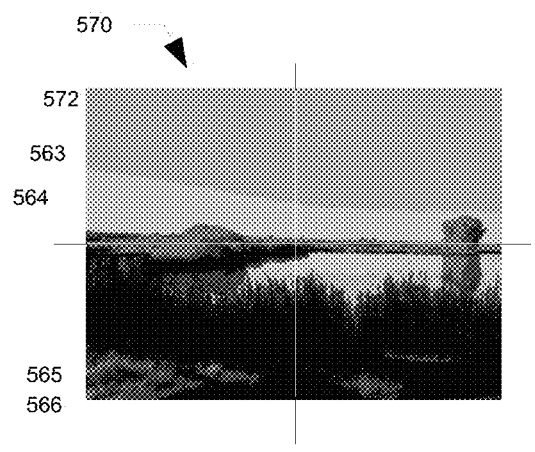
Figure 5E:
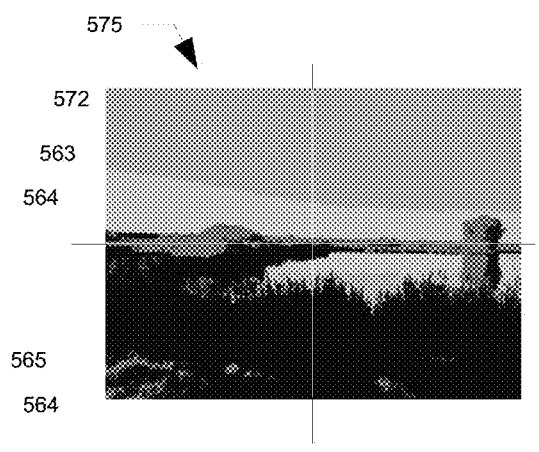
Figure 5F:
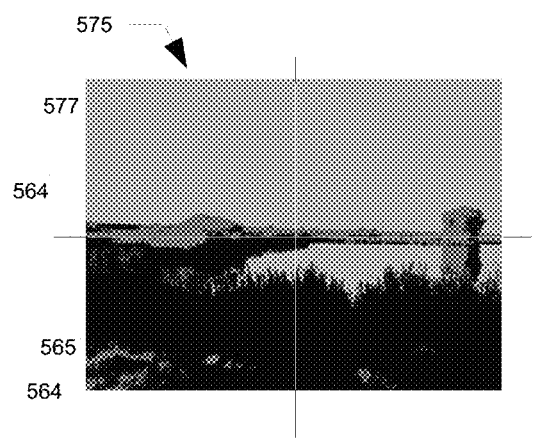
Figure 5G:
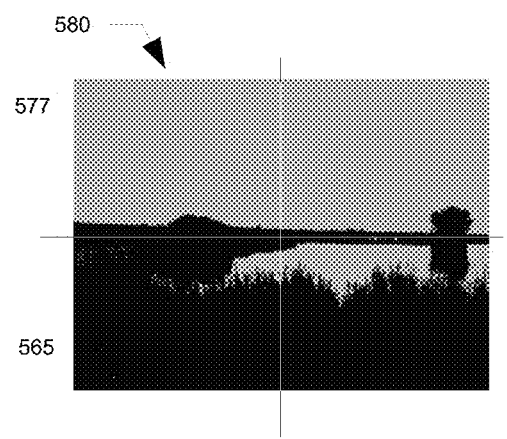

FIGS. 5B-G show an example of T-spatial, hue compressed maps the applying a color reduction method 500 to an image (see steps 504-580 of FIG. 5). Specifically, FIG. 5B shows the original desaturated image 550, which includes horizontal axis 551, vertical axis 553, which divide image 550 in quadrants 555-558 (see step 526 of FIG. 5). FIG. 5C shows a color reduced image 560, which is the same image as FIG. 5B except after being reduced to 6 colors. Colors 561-566 form regions, some of which may be contiguities. For example, in FIG. 5C the sky is divided into three regions, which are contiguities. The lake has color 563. FIG. 5D shows a color reduced image 570, which is the same image as FIG. 5B except after being reduced to 5 colors, 563-566 and 572. FIG. 5E shows a color reduced image 575, which is the same image as FIG. 5B except after being reduced to 4 colors, 563-565 and 572. In FIGS. 5D and 5E, the sky is divided into just two color contiguities. FIG. 5F shows the same image as FIG. 5B except after being reduced to 3 colors, 564, 565, and 577. FIG. 5G shows the same image as FIG. 5B except after being reduced to 2 colors, 565 and 577. In FIGS. 5F and 5G, the sky is just one color contiguity. Thus the number of contiguities may depend in-part on the color reduction used, among other things, and so the different contiguity count may be averaged.

Figure 6:
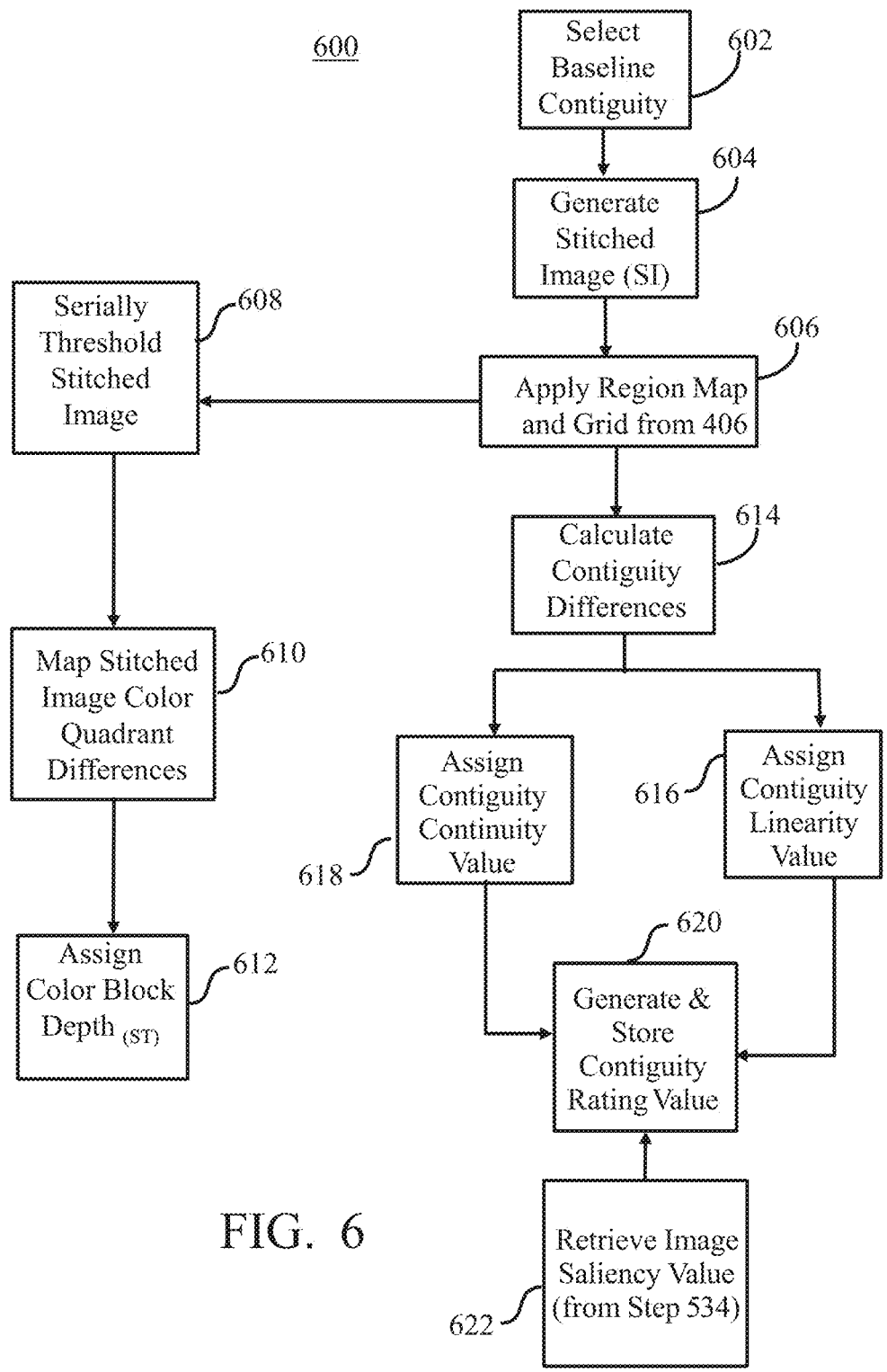
FIGS. 6-8 show an example of a flowchart of an embodiment of a method for computing parameters related to the contiguity of a saliency.
Figure 7:
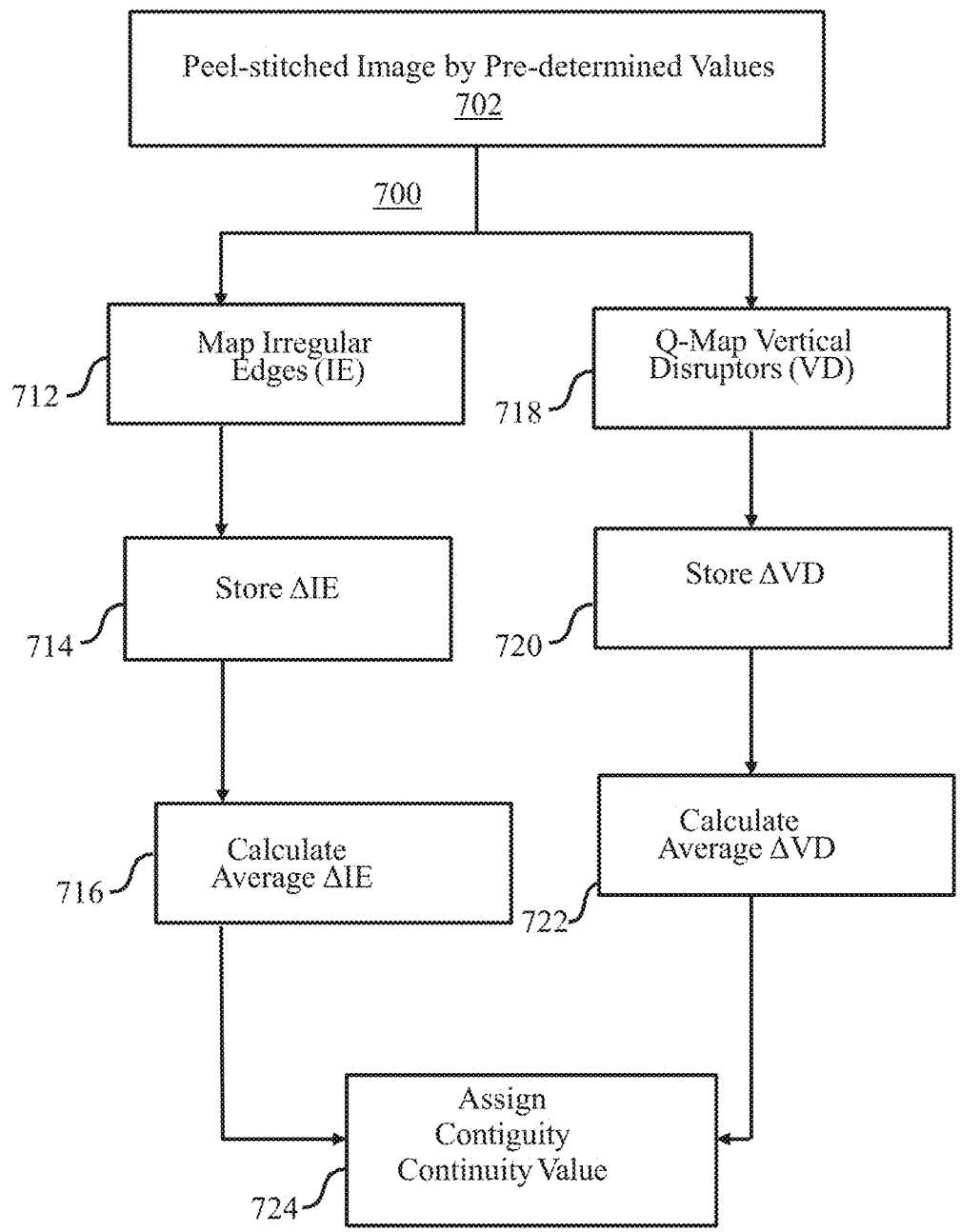
Figure 8:
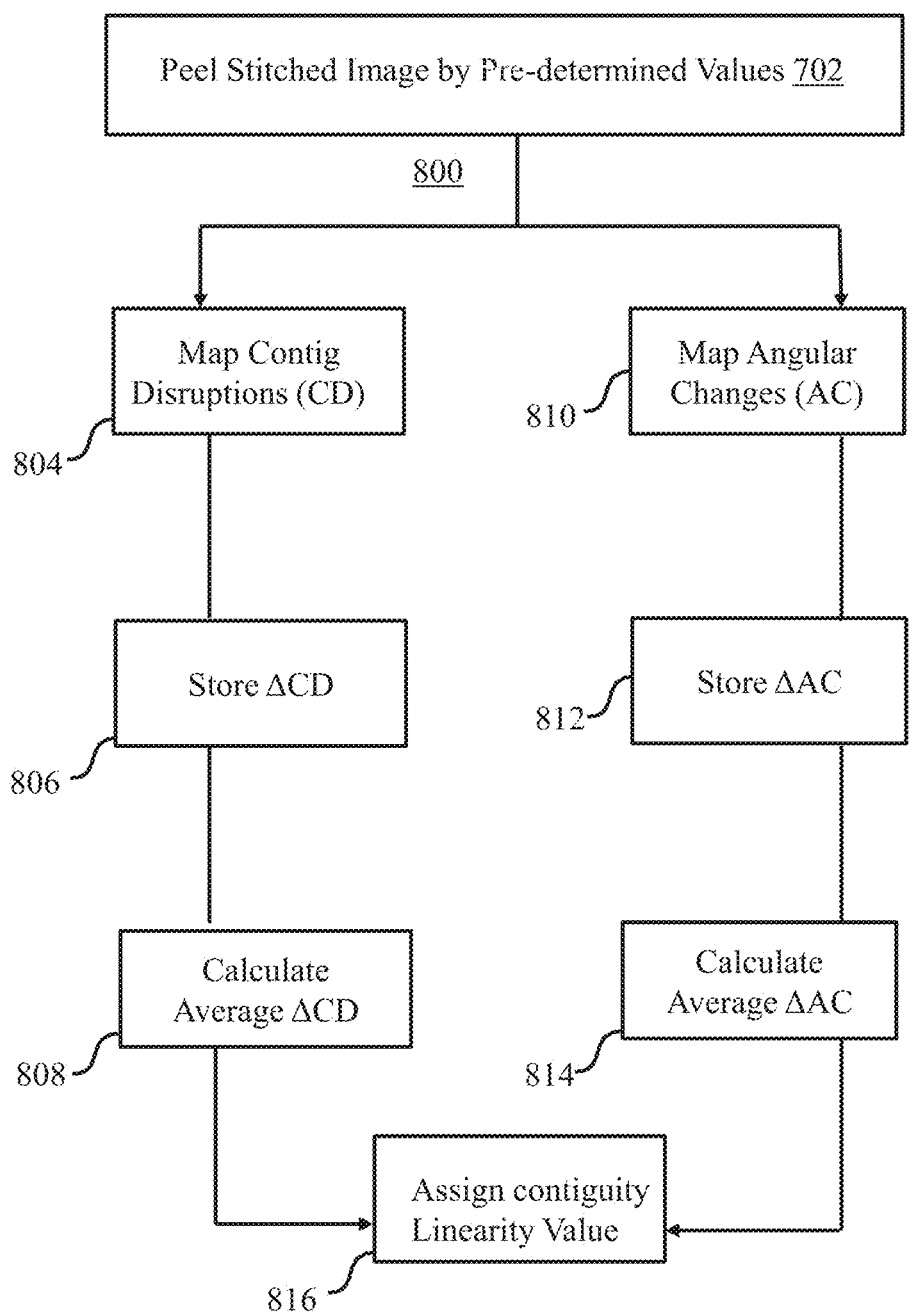

FIGS. 6-8 show an example of a flowchart of an embodiment of a method for stitching an image to identify at least one contiguity and defines a subset of attributes that are associated with the contiguity (subset being a subset of all of the attributes associated with the image). FIGS. 6-8 schematically illustrate a method to stitch an image to identify at least one contiguity and define a subset of attributes associated with the contiguity.

FIG. 6 schematically illustrates the stitching method described in step 410 of FIG. 4 in more detail. The stitch method utilizes the image saliency value of step 538 (FIG. 5) and the color block depth generated in step 528 and the saliency value and color block depth is combined with threshold maps in step 510 and with contiguity data in step 530 (FIG. 5). In at least one embodiment, parameters such as color block depth$_{67}$, contiguity angle changes (AC), contiguity disruption (CD), vertical disruptors (VD), and/or irregular edges (IE), for example, may be obtained. In step 602, a baseline contiguity is defined. In other words, a contiguity is identified based on edge identification (or a threshold map) on the full intact image is the baseline contiguity. Contiguities based on other methods/images (e.g., based on the stitched images or color maps) are compared to the baseline contiguity.

In step, 604 a stitched image is generated. In at least one embodiment, machine system 101 can be configured to generate the stitched image. The stitched image may be generated by sectioning the image into a predetermined number of sections, e.g. three sections across a defined area, which are used to implement the stitching analysis. For example, the image can be divided into three equal sections, e.g. a first section, a second section and a third section. The sections may be divided such that one section of the three sections can be shifted to mask another section of the three sections, in part or as a whole according to user requirements. In step 614 a delta contiguity is computed. The delta contiguity refers to values computed in the stitched and peeled images which are used to obtain a value for the continuity of one or more contiguities ($AF_5$) and the linearity of one or more contiguities ($AF_6$). The flowchart in FIG. 7 shows the method for obtaining the changes in the contiguities, the delta contiguity, by identifying and characterizing vertical disruptors and irregular edges; while the flowchart in FIG. 8 shows the method for identifying and characterizing contiguity disruptions and contiguity angularity. In at least one embodiment, system 100 may be configured to calculate the delta contiguity, which may provide baseline measurements for the stitched image, and which may be compared to an unstitched version of the image. In at least one embodiment, the delta contiguity may provide baseline values of the stitched image that can be compared to a later peel value, e.g., parameter values measured during peeling of the image as further described herein. For example, based on the unstitched image, a contiguity and/or other properties may be computed as baseline values. Then when the image is stitched and peeled for each stitch/peel changes from the baseline values of the properties computed may be computed to facilitate computing the average value of each property (which is averaged over all the stitches and peels).

Continuing with the description of FIG. 6 and method 600 in step 608, threshold images at predetermined threshold values are generated. In at least one embodiment, machine system 101 can be configured to generate the threshold images at predetermined filter values, which provides various levels of threshold of the image to enable recognition of edges in the image. For example, there may be three different predefined thresholds of brightness that are used to generate three threshold images.

In step 610, a stitched image quadrant percentage is mapped. In other words, the stitched image is divided into quadrants and the percentage of color pixels in each bin is mapped to blocks in each quadrant. In at least one embodiment, machine system 101 can be configured to map the stitched image quadrant percentage.

In step 612, the color block depth$_{ST}$ is computed, which is the color block depth computed for an image that is stitched to remove a percentage of the image where ST represents the percentage of the image which remains after the stitch. In at least one embodiment, machine system 101 can be configured to map the spatial contiguity data. In at least one embodiment, the color block depth may be generated using a color block depth$_{100}$ map divided by the color block depth$_{ST}$ derived from the stitched image. The ratio of the color block depth$_{100}$ to color block depth$_{ST}$ indicates the degree of symmetry in the image's color blocks. Any value other than 1 for the color block depth comparisons indicates one or more type of disruptions including color differences, vertical disruptors, and/or irregular edges in a comparison of two or more quadrants, i.e. left top to right top; left top to left bottom; left bottom to right bottom; right top to right bottom; left half to right half; top half to bottom half, and where an individual quadrant can be divided into sub-quadrants and the comparisons repeated in a newly defined subregion of the image.

A contiguity may be measured from edge to edge, manually or automated; and the color block characteristics compared. In at least one embodiment, where the differences are in a range greater than 15% the image stitching can be reversed, performing a peeling of the masked section at a predetermined value of a pixel width, e.g. the total return moves to return the first section to its original position to enable mapping vertical objects and disruptions to linearity and/or continuity across a contiguity.

In step 614 contiguity differences are computed. In other words, the differences between the contiguities of the image at various degrees of stitching are computed. In step 616, contiguity linearity values are computed, which represents the degree to which a contiguity is a straight line (which could be based on the square root of the average of the squares of the difference in distance from a least squares fit of a straight line to the direction of the contiguity and the actual average direction of the contiguity). In step 618, contiguity continuity values are computed, which represent the degree to which the contiguity extends across the image horizontally. In step 620, the contiguity rating is computed based on steps 614-618. In step 622, the saliency value (of step 534) is retrieved and/or received.

FIG. 7 schematically illustrates a method 700 of peeling, according to at least one embodiment. In step 710, peeling operations are performed at predetermined values, such as predetermined percentages of stitching and/or peeling. In at least one embodiment, machine system 101 can be configured to peel a first section (e.g., a first 30% of the image), and then a second section at the predetermined values (a second 30% of the image). Alternatively, the different percentage could be used, such as 25% or 10%.

In step 712, irregular edges (IE) are mapped. In step 712, a map of irregular edges is computed. The map may be based on the regions (e.g., quadrants and blocks of the quadrants) of the region map, and the map for each region may be computed. In at least one embodiment, machine system 101 can be configured to map the irregular edges, which can be edges that include shapes, contrast hue, and/or color difference with the surrounding areas. The edge irregularity may be computed by computing differences between edge parameters, such as the differences in the angle, contrast, brightness, color, and hue of the edge. Differences between edge irregularities of different degrees of stitching/peeling and/or thresholding may also be computed.

Using either the original image or the stitched image, deviations off the X-axis relative to the dominant contiguity may be evaluated setting up a grid to define the Intrusion Area, which is the area that the vertical intrusion intrudes into an area above (and/or optionally below) the dominant contiguity. The vertical disruption by a Vertical Disruptor (VD) can be in the contiguity may be objects of interest, and the fact that a region is a vertical disruptor may be used as one factor of multiple factors that indicate that a region is part of an object of interest and/or that the object may be a foreground object. If the suspected IE extends beyond one or more adjacent grid boxes, or extends along the X-axis for 3 or more grid boxes, which for example may be 0.1 inch to ⅛th inch (when the image is viewed in the size that the image will be printed or presented) and/or fills 1 or more grid boxes more than 20% and/or extends beyond the boundaries of one or more grid boxes, the intrusion is evaluated as a Vertical Disruptor. Vertical Disruptors are irregular edges, so all Vertical Disruptors are irregular edges, but not all irregular edges are Vertical Disruptors. In an embodiment, in step 712, the irregular edges that are not Vertical Disruptors are mapped. In measuring a VD, the size of the boxes should be chosen so that the area of the Vertical Disruptor arrived at by using the number of boxes that the width and height of the Vertical Disruptor fit is within 40% of the area of the vertical disruptor when using the actual height and width to compute the area of the vertical disruptor (as an approximation of the actual area of the vertical disruptor). The area of the intrusion may be computed in other ways (such as by counting the number of pixels used to represent the intrusion divided by the number of pixels in the region that intrusion intrudes into). A stitched image may be used to remove regions known to contain one or more Vertical Disruptor. In step 1, the dominant contiguity is identified on a thresholded or edged image (stitched or original). In step 2, the grid is boxes (or pixels occupied by the intrusion are identified and counted and/or identified. In step 3, intrusion areas are classified as non-regular (irregular) or classified or as Vertical Disruptors depending on the size of the intrusion.

In step 714, the edge irregularities and optionally the differences in edge irregularities are stored.

In step 716, the average position and/or contour of the irregular edges are calculated. In at least one embodiment, machine system 101 can be configured to calculate the average irregular edges. The average position and/or contour of the irregular edges may be computed by averaging the differences in the edge irregularities (e.g., including one value of no difference corresponding to the baseline value itself), and then adding the average values of the position to the baseline values (of the location and contour of the irregular edges) of the contiguities.

In step 718, vertical disruptors in the contiguity and/or contiguity lines are mapped. In step 718, a map of vertical disruptors is computed as a baseline computation of the position and other parameters (e.g., the contrast or degree of disruption) of the vertical disruptor. In at least one embodiment, machine system 101 may be configured to map the vertical disruptors. The vertical disruptors may be objects or elements identified in the image that extend into a vertical plane from a horizontal line, e.g., from a contiguity. Vertical disruptors are horizontal features that disrupt contiguity lines and/or contiguities. The map may be based on the regions (quadrants) of the region map, and a map for each region may be computed. In at least one embodiment, machine system 101 can be configured to map the vertical disruptors. Differences between the vertical disruptors of different degrees of stitching/peeling and/or thresholding may also be computed.

In step 720, the vertical disruptors and optionally the differences in the positions of the vertical disruptors are stored.

In step 722, an average vertical disruptor may be calculated by averaging the differences in the vertical disruptor (e.g., including one value of no difference corresponding to the baseline value itself) and then adding the average of the differences to the baseline values of the vertical disruptor, and/or the spatial separation between multiple VDs stored. In at least one embodiment, machine system 101 can be configured to calculate the average width span, height and/or density (co-localization) of the vertical disruptors.

In step 724, a contiguity continuity value (CV) is computed (e.g., based on steps 716 and 722). In at least one embodiment, machine system 101 can be configured to assign the contiguity continuity value, which is the value assigned to the contiguity and represents the degree to which there are disruptions in the contiguity across the X-axis, e.g., where the X-axis is the horizontal plain of the image. For example, the contiguity continuity value can have a value within a range of −1.0 to 1.0. The contiguity continuity value may be assigned according to the values obtained for the vertical disruptors and irregular edges. For example, where the contiguity extends across the image within a range of 75 to 100 percent, a contiguity value range of 1 may be assigned. Where the contiguity line extends across the image width within a range of 50 to 75 percent, a value of 0 may be assigned. Where contiguity extends across the image within a range of 0 and 50 percent, or the contiguity is zero, a value of −1 may be assigned. In alternative embodiments other values and methods of computing the contiguity continuity may be used. For example, the percentage of the width of the image that the contiguity extends (or the percentage of the width of the image that the contiguity extends minus 50%) may be used as the contiguity continuity value (so that the contiguity continuity value is a continuous variable).

The method of FIG. 8 is part of the method of FIG. 7. Step 702 of FIGS. 7 and 8 may be the same step.

In step 804, the position and shape (and optionally other parameters) of the contiguity disruptions (CD) are mapped to establish a baseline of the shape, dimensions, and/or position of the disruptions. Contiguity disruptions are breaks or partial breaks into a contiguity. For example, a region in which the width of the contiguity is less than the adjacent regions (e.g., by more than 10% or 15%) may be considered a contiguity disruption (in other embodiments other criteria and/or percentages may be used for determining a contiguity disruption). Note that the terminology used here the length of contiguity extends generally along the horizontal axis or at an acute angle with the horizontal axis of the image, and the width of the contiguity extends along the vertical axis of the image or at an acute angle to the vertical axis of the image. In at least one embodiment, machine system 101 can be configured to map the contiguity disruptions. The contiguity disruptions are mapped to enable machine system 101 to locate the contiguity disruptions in the image, e.g. where there are objects or portions of the image that disrupt the contiguity in the image. The map may be based on the regions (quadrants) of the region map, and map for each region may be computed. In at least one embodiment, machine system 101 can be configured to map the contiguity disruptions, which may also include vertical disruptions in contiguities or contiguity lines. Optionally, differences in one or more contiguity's linearity and continuity may also be computed and compared using different degrees of stitching/peeling and/or thresholding.

In step 806, the contiguity disruptors and optionally the differences in contiguity disruptions are stored.

In step 808, an average contiguity disruption is computed, by averaging the differences in the contiguity disruption (e.g., including one value of no difference corresponding to the baseline value itself) and then adding the average of the differences to the baseline values of the contiguity disruption. In at least one embodiment, machine system 101 can be configured to calculate the average contiguity disruption.

In step 810, angular changes (AC) in the contiguity and/or contiguity lines are mapped, to establish baseline values. In at least one embodiment, machine system 101 can be configured to map angular change of the contiguity line. The angular change (AC) can be the angle at which the contiguity in the image relative to an X-axis (a horizontal axis), e.g., horizontal plain of the image. The map may be based on the regions (quadrants) of the region map, and map for each region may be computed. Optionally, difference between angular changes in contiguities of different degrees of stitching/peeling and/or thresholding may also be computed. In step 812, the angular changes and optionally the differences in angular changes are stored.

In step 814, an average angular change (AC) is calculated, by averaging the differences in the angular change (e.g., including one value of no difference corresponding to the baseline value itself) and then adding the average of the differences to the baseline values of the angular change. In at least one embodiment, machine system 101 may be configured to calculate the average angular change. The average angular change can be the average angular change of the dominant contiguity, another designated contiguity or all contiguities in the image.

In step 816, a contiguity linearity value is computed, which may be based on steps 808 and 814. In at least one embodiment, machine system 101 can be configured to assign the contiguity linearity value, which is the value assigned to the contiguity for a deviation of the X-axis, e.g., horizontal plain of the image. For example, in an embodiment, the contiguity linearity value can have a value within a range of −1.0 to 1.0 and is derived from the average contiguity changes (Step 808) and angular changes (Step 816) using measurement boxes, which may be computed in steps 406 (FIG. 4) and/or step 606 (FIG. 6). The measurement boxes (or regions of other shapes) may be boxes formed by the grid. The contiguity disruptor and angular change may be computed for each region (in steps 804 and 810) and then the values of each region for the contiguity disruptor and angular change may be averaged over the entire images in steps 808 and 816, and then the two averages (the contiguity disruptor and angular change) may be used to compute the contiguity linearity in step 818. Although in FIGS. 6-8 average values are computed by computing a baseline value and then averaging the differences of subsequent measurements taken at different degrees of stitching and/or thresholding, in other embodiments, the average values may be computed in other ways, such as by remeasuring the edge irregularities, the vertical disruptors, the continuity contiguity, and/or the continuity linearity, and averaging the entire measurement.

An ambiguity value (also referred to as the contiguity rating value (CR)) can be a sum of individual ambiguity factors, which are then divided by a total number of factors. For example, some ambiguity factors can be the number of contiguities in the composite image, the number of color blocks, linearity of the contiguities, the continuity of the contiguities, the color block depth$_{100}$, the spatial color-contiguity, and/or the like.

The ambiguity value describes the contiguity characteristics of an individual image and its potential interactions with one or more other images in an interleaved composite. The ambiguity value represents how one component image can interact with other component images to form a composite image comprised of interleaved sections. The ambiguity represents the tendency of a particular portion of the composite image to stay assembled in the mind of the average viewer. The ambiguity value can be a measure of how dominant the contiguities are present in the image and how easy it can be for a viewer to switch between the different contiguities in the composite image. The ambiguity value represents the capacity of the image to switch between figure and ground positions when combined with one or more other images. In an embodiment, the word switch refers to an average user's ability to switch between seeing one image or one aspect of an image and another image. In an embodiment, the word switch refers to an average user's ability to switch between seeing one image or one aspect of an image and another image or aspect of an image based on Gestalt principles concerning figure and ground relationships, completion and continuation. The capacity to switch is always related to another image as to whether the second image also has the capacity to switch (switching occurs when both have contiguities or both do not have contiguities). In an embodiment, if only one image has a contiguity and a second or third image does not have areas of saliency such as a single dominant object or differences in image content which provide saliency, the image with the contiguity is stable in the ground position as the image is reassembled in a typical user's mind. In an embodiment, if only one image has a contiguity and a second or third image does not have areas of saliency such as a single dominant object or differences in image content which provide saliency, the image with the contiguity is stable in the ground position as the image is reassembled in a typical user's mind according to Gestalt principles of continuation and completion. The logic being since the contiguities draw the eye and tend to capture the attention of a person, the more pronounced the contiguity, the more likely the mind can hold on to the image associated with the contiguity, even when combined with another image in a composite. Similarly, a switch capable image, i.e. one with at least one contiguity, can be stabilized in the figure position of a composited image set with the removal of its contiguities by graphical means, such as by masking and/or cropping to remove one or more contiguities.

In at least one embodiment, the ambiguity value can be used to provide an ambiguity rating to the image as how the ambiguity of one image can be compared to other component images in forming a composite generated by machine system 101.

An aesthetic value can be determined from a number of colors, a mix of colors, a density of content in the image, and/or the like. In at least one embodiment, the aesthetic value can be provided as a ratio of the number of colors to the number of pixels. The aesthetic value is given by the formula $1/((CBD_{100})(CB_{DEPTH}))$, where the $CB_{DEPTH}$ is the ratio of the color block depth$_{100}$ of the intact image ($CBD_{100}$) to the color block depth of the stitched image ($CBD_{ST}$), and where individual quadrants and/or sub-quadrants can be compared and/or averaged as described below.

Figure 9:
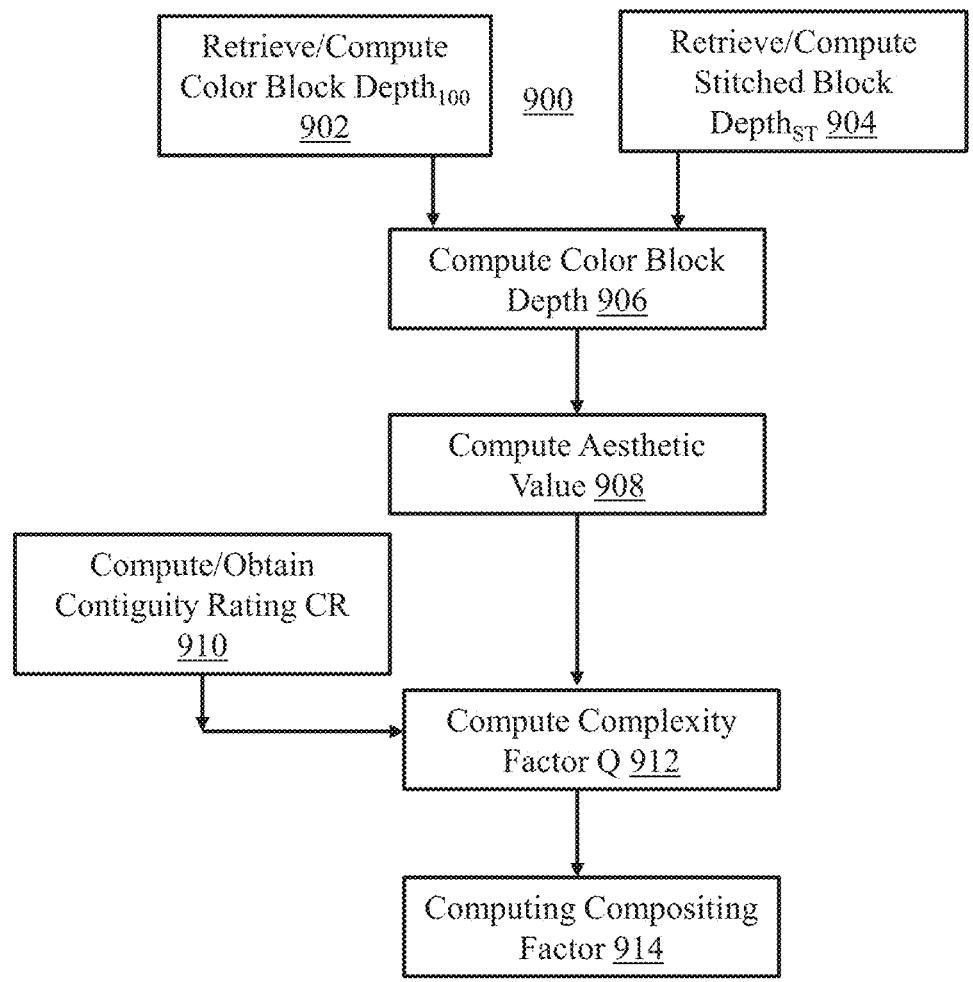
FIG. 9 is an example of a flowchart of an embodiment of method of computing color block depth$_{100}$ ($CBD_{100}$) that is useful in computing a contiguity rating value and compositing factor.

FIG. 9 is an example of a flowchart of an embodiment of method 900 of computing some parameters that are useful in computing a contiguity rating. In step 902 a color block depth, $CBD_{100}$ is retrieved (the color depth is the number of bits used to represent color). In step 904 a stitched color block depth is retrieved $CBD_{ST}$ (e.g., $CBD_{67}$), where ST stands for the percentage of the image that remains after the stitch is complete. In step 906, the $CBD_{100}$ and $CBD_{ST}$ are combined (e.g., the ratio of $CBD_{100}$ to $CBD_{ST}$ is computed) and the value is assigned to the Color Block$_{DEPTH}$. In step 908, the aesthetic value is computed, based on the Color Block$_{DEPTH}$. The formula for Color Block$_{DEPTH}$ is Color Block$_{DEPTH}$=$CBD_{100}$/$CBD_{60}$ The Aesthetic Value may be computed as Aesthetic Value (VAEs)=$1/((CBD_{100})(CB_{DEPTH}))$=$CBD_{60}/(CBD_{100})^2$ In step 910, the contiguity rating value is retrieved or received (which was computed in step 620 of FIG. 6). In step 912, a complexity factor-Q is computed, by combining the aesthetic value and the contiguity rating value. In step 914, a Compositing Factor ($CF_{(CR)}$) is computed from step 912 value minus 0.25 if $AF_6$ value is equal to 0, or is a positive number; and the same as the value obtained in step 912 if $AF_6$ is negative.

The Complexity Rating for the composite image set ($CR_{IS}$) may be computed from each image in the image set's: Compositing Factor Complexity Rating ($CF_{(CR)}$), Compositing Factor Ambiguity Value (CFA)) and, Compositing Factor Sectioning Strategy ($CF_{(SEC)}$), which refers to the sectioning strategy used to generate a specific number of sections, for each image as follows:

$$CR_{IS}=\Sigma(CF_{(CR)1},CF_{(CR)2},CF_{(CR)3})/n+\Sigma(CF_{(AM)1}, CF_{(AM)2},CF_{(AM)3})/n+\Sigma(CF_{(SEC)1},CF_{(SEC)2}, CF_{(SEC)3})/n,$$

where n can be 2 or 3, depending on the number of images; and where the 3rd term will be included, accordingly. The values range of the complexity rating for the image set may be between −2.25 and 12.75 for a 3-image composite; and, −2.25 and 10.75 for a 2-image composite.

Step 1: The $CF_{(CR)}$ is determined by finding the average contiguity rating ($CF_{(CR)}$) for the image set, which may be computed by the sum of the CR values (Complexity Rating) assigned to each component image to be used in the composite divided by the number of images (n) in the composite, which yields the $CF_{(CR)}$ value and which in-turn is used to define the Complexity Rating for the Image Set ($CR_{IS}$).

In step 2, the average $CF_{(AM)}$ is computed for the image set. $CF_{(AM)}$ is based on each image's Ambiguity Value (Ambi Value), which has a value between 0 and 1. Individual image values are assigned according to the following rules:

Assign a $CF_{(AM)}$=1.0 for images with an Ambi Values>0.5 but<2.25 which are switch capable.

Assign a $CF_{(AM)}$=0.5 for images with an Ambi Value>2 (Images will be switch capable, but may have contiguity overlaps; images should be paired with other images with an ambiguity value between 0.5-1.8 to reduce the potential for contiguity overlaps.

Assign a $CF_{(AM)}$=0.0 for images with an Ambi Value between 0-1 (images may be a switch capable, but indicates a dominant object may be present in the image.

Assign a $CF_{(AM)}$=0.0 for images with an Ambi Value<0 (these images are categorized as predominantly "figure" and are likely to be switch negative.

In Step 3, the average $CF_{(SEC)}$ values is computed for the image set. $CF_{(SEC)}$ is based on the sectioning/splicing strategy with values between 0 and 1. Individual values are assigned based on the following rules:

Assign a $CF_{(SEC)}$=1.0, where an equal sectioning strategy is used for the component images with between 2-10 (1:50 to 1:10) for either a 2- or a 3-image composite; or, for a variable sectioning strategy where the total # of sections is between 10 to 20 for a 3-image composite with an Ambi Value for the individual images which are greater than 0.75 but less than 1.5. Assign a $CF_{(SEC)}$=0.5, where equal sectioning is used for component images with 10-20 sections for 2-image composite; or where a variable sectioning strategy is used with a total # of sections 10 to 20 for a 3-image composite and where the Ambi Value for the individual images are less than 0.75 and/or greater than 1.5.

Assign a $CF_{(SEC)}$=0.0, where an equal sectioning strategy is used for the component images with 10-20 sections for 3-image composite; or, for equal sectioning with greater than 20 image sections for one of the component images and/or if the Ambi Value is negative; or, where a variable sectioning strategy is used; or where the total # of sections is greater than 20 for a 3-image composite with an Ambi Value being<0.75 or >1.5.

In step 914, the compositing factor ($CF_{(CR)}$) is computed.

Figure 10A:
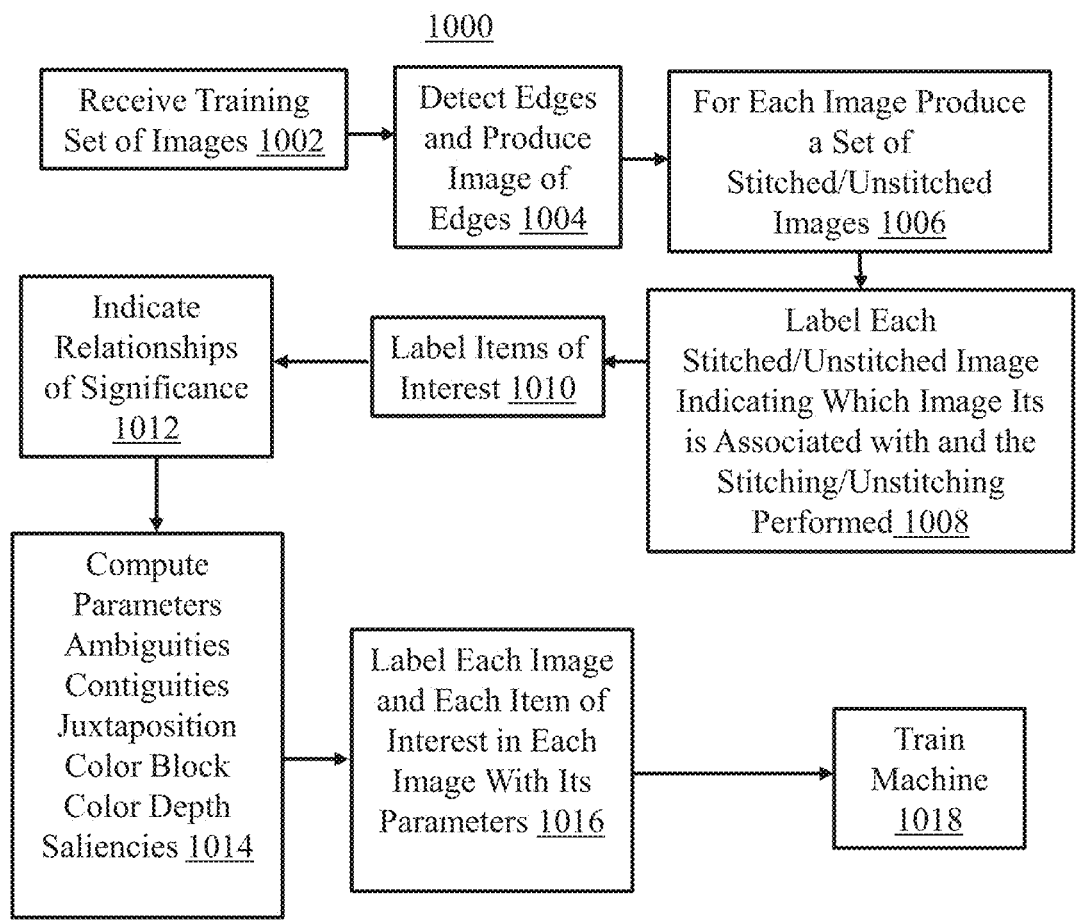
FIG. 10A is an example of a flowchart of an embodiment of method of training artificial intelligence logic, based on the methods of FIGS. 3-9.

FIG. 10A is an example of a flowchart 1000 of an embodiment of a method of training artificial intelligence logic 224, based on the methods of FIGS. 3-9. In step 1002, a group of training images is received. The training images may be based on a particular subject matter of interest. For example, if artificial intelligence logic 224 is being used for navigating a vehicle or for providing navigation guidance to the visually impaired, the images may relate to different situations seen on a road while driving. If the artificial intelligence logic 224 is being used to identify security threats, the images may be various scenes just prior to a tragic incident. If artificial intelligence is being used to identify natural events of interest (e.g., the appearance of animals not often seen or activities of animals not often seen), the images may be of similar events. In step 1004, edges within images are detected and the image of the edges may be saved. In step 1006, for each image a set of stitched images is produced. Step 1006 may optionally also include producing a set of threshold maps, contiguity maps, maps of contiguity irregularities, maps of contiguity angle changes, maps of contiguity disruptions, maps of vertical contiguity disruptions and/or color maps for each stitched image. In step 1008, the stitched images, the color threshold maps, the black and white and/or threshold maps are labeled, stored, and/or tagged, so as to maintain an association between the image, the stitched versions of the image, the edge map, the threshold and/or color maps of the image and/or the stitched images. In step 1010, the items of interest in the images (and optionally in the color maps, threshold maps, edge maps, and/or stitched images) are labeled, so that the machine has an association between the item of interest and the image. In step 1012, an indication is added of the relationships in each image and is associated with the image (and optionally with the color maps, threshold maps, edge maps, and/or stitched images). In step 1014, the parameters associated with the image are computed, such as the ambiguity value, which may be computed for the image as a whole, and/or for each block the image, and/or for each variation of the image. In step 1016, the parameters computed are associated with the images and/or the variation of the images (e.g., the color maps, threshold maps, edge maps, and/or stitched images). In step 1018, artificial intelligence logic 224 is trained to identify the items of interest and/or relationships of interest, based on the set of training images and the information added to the image.

Figure 10B:
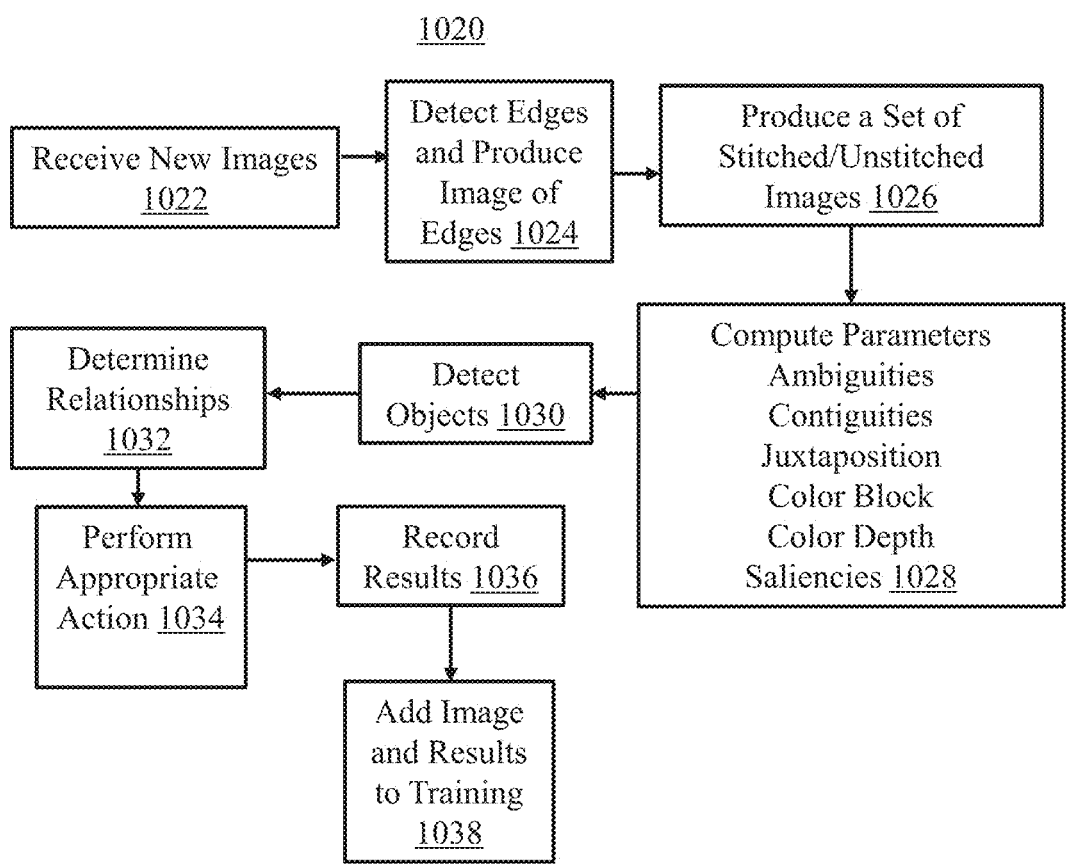
FIG. 10B is an example of a flowchart of an embodiment of method of identifying objects and relationships.

FIG. 10B is an example of a flowchart 1020 of an embodiment of method of identifying objects and relationships, via artificial intelligence logic 224, based on the methods of FIGS. 3-9. In step 1022, a group of one or more new images is received. The images may be collected as a part of artificial intelligence logic 224 performing a task, such as navigating a vehicle or machine, for providing navigation guidance to the visually impaired, monitoring a wildlife preserve for animals or activities of scientific interest, or monitoring a location for signs of danger or change, for example. In step 1024, edges within images are detected. In step 1026, for each image a set of stitched images is produced. Step 1026 may optionally also include producing a set of threshold maps, contiguity maps, maps of contiguity irregularities, maps of contiguity angle changes, maps of contiguity disruptions, maps of vertical contiguity disruptions and/or color maps for each stitched image. In step 1028, parameters of the images are computed, such as saliency, ambiguity, contiguity, and/or contiguity linearity associated with the image. In step 1030, the items of interest are identified, based on the input and based on the training of FIG. 10A. In step 1032 relationships of interest in the images are identified (based on the input and based on the training of FIG. 10A). In step 1034, appropriate action is taken, which may be causing the vehicle or machine (e.g., a navigation device for the visually impaired) to turn to avoid an object or stay on the road, send an alert if a dangerous situation or other change in the scene is detected, or store and log the image for researchers to analyze. In step 1036, results of the situation and/or the action taken may be recorded. In step 1038, the results and the new image may be added to the training set, to improve artificial logic 224 ability to identify the items and/or relationships of interest.

FIGS. 11A-D shows a table of rules and values that summarize some computations that may be performed to identify and/or characterize contiguities. Referring to FIG. 11D, the prominence and number of contiguities may be represented by a contiguity rating value (CR also referred to as the Ambi Value or juxtaposition value), which may be computed based on the formula, $$CR = \Sigma(AF_1 + AF_2 + AF_3 + AF_4 + AF_5 + AF_6)/n$$

(where n=6), where $AF_1$, $AF_2$, $AF_3$, $AF_4$, $AF_5$, $AF_6$ are ambiguity factors (AF). In other embodiments, there may be other factors and/or one or more of $AF_1$, $AF_2$, $AF_3$, $AF_4$, $AF_5$, $AF_6$ may be divided into multiple factors, while one or more others of $AF_1$, $AF_2$, $AF_3$, $AF_4$, $AF_5$, $AF_6$ may be left out thereby changing the value of n.

As indicated in the table, $AF_1$ is a contiguity number, which is determined by detecting edges, using an edge detection technique and/or threshold techniques edge detection technique and/or other types of filters, which produce a binary image based on a threshold that determines which of two values a pixel is assigned.

Contiguity Count Total ($AF_1$) is the average of the count of contiguities based on a variety of methods of counting contiguities. For example, a number of different threshold images may be produced for a variety of intact or different stitched images, where the thresholded values for the image measured at a starting point of 127 value (for example) and then at 160 (for example) for standard images, where the color may be represented by pixels values of 0 to 255, for example, and for each image and stitched image the number of contiguities are counted. The number of contiguities may also be separately computed from the edges generated by an edge detection technique, such as a Sobel. A variety of color map images may be generated for a variety of different stitches, and the contiguities for each image may also be counted. Then the total number of contiguities counted for each variation of the image and method of counting contiguities are averaged.

More than just two thresholds may be computed.
For a thresholded Image at 127 and 160

$$\text{Averaged Contiguity Count}_{T127} = (\text{Parts}_{T127b} + \text{Parts}_{T127w})/2$$

$$\text{Averaged Contiguity Count}_{T160} = (\text{Parts}_{T160b} + \text{Parts}_{T160w})/2,$$

where $\text{Parts}_{T127b}$ and $\text{Parts}_{T160b}$ are the number of parts of the image, that after thresholding have an average pixel value of black, and where $\text{Parts}_{T127w}$ and $\text{Parts}_{T160w}$ are the number of parts of the image that after thresholding have an average pixel value of white, and the subscripts T127 and T160 represent the threshold used for generating the threshold map. Each part may be a continuous region of a set of contiguous pixels of the same pixel value after thresholding. In an embodiment, one may count the number of black and white regions across the width of the image to arrive at the number of parts (e.g., along the central horizontal axis of the image or a long a line that is halfway between the top and the bottom the image). In another embodiment, a vertical disruption larger than a predetermined threshold divides a region into different parts. Additionally, or alternatively, the horizontal disruptions may also divide a region into parts. Additionally, or alternatively, disruptions in other directions may also divide a region into parts. In an embodiment, a disruption is more than 50% of the distance from a first edge to a second edge facing the first edge. For example, a vertical edge that is 50% of the distance from the top edge to the bottom edge of the region divides a region into parts. In other embodiments, the ratio of the length of the disruption to the distance between the opposite facing edges (e.g., between the top and the bottom edge) may be a different percentage, such as 15%, 25%, 75% or 80%.

Contiguity Count Total $(AF_1)$=(Averaged Contiguity Count$_{T127}$+Averaged Contiguity Count$_{T160}$)/2.

$AF_2$ is the color block. Color blocks may be determined based on a sequential color extraction using a reduced, fixed number of colors (e.g., 2-6) from which color images may be based. Color blocks are a kind of contiguity. $AF_2$-CB defines the distribution of color. A color block may extend in any direction. A color block may be formed by a concentration or density of similar colors representing an object or region across a continuum or continuous region in both the horizontal and vertical directions. An example of a color block is the sky. Even in a stitched image, the sky can be blue, albeit of different hues, across the width of an image. The image may be divided into regions (e.g., quadrants and sub-quadrants) and dominant color or colors are determined for each region. Color blocking allows for the identification and analysis of the colors in an image. Color blocking allows for an analysis of the colors in an image, the distribution of the color, and the identification of breaks in the block, indicating the presence of one or more vertical disruptors or other objects. The interruptions in color confluency can disrupt the color block's saliency and/or facilitate identifying what the color block is. In this process, the image is progressively reduced to a smaller number of colors (e.g., less than 8, less than 7, less than 6, less than 5, less than 4, less than 3) During color reduction, the pixels may grouped into bins of a histogram according to which color bin color value of the pixel is closest (e.g., if the image is reduced to the colors having color pixel values 100 and 200, then a pixel with a color value of 75 would be place in the bin for the color 100. A color extraction is performed on each color-reduced image to determine the number of pixels in each color bin. The values are averaged to arrive at the $AF_2$. Up to 6 color blocks can be identified and used for the calculation, depending on the number of colors and their percentage of contribution to the image.

For example, for a 3-color reduction the formula for the $AF_2$ is

CB.$c_{\bar{x}}(AF_2)$=(CB.$c2$+CB.$c3$)/3

More generally, the formula for $AF_2$ is

CB.$c_{\bar{x}}(AF_2)$=(CB.$c2$+CB.$c3$+ ... CB.$c(n)$)/$n$ (where n is the number of colors which are in the image, and which is an integer number having a value selected form the numbers 2-6). In the above formula CB.c2 is the number of regions of contiguous pixels of one color identified after a reduction to two colors. CB.c3 is number of regions of contiguous pixels of the same color identified after a reduction to three colors, and CB.c(n) is number of regions of contiguous pixels of the same color identified after a reduction to n colors.

$AF_3$, is contiguity linearity ($C_{linearity}$) for a contiguity using a stitched image. It may be computed from $C_{linearity}$=$C_A$+$C_D$, where $C_A$ is a value that represents an average of the degree to which the angle of the contiguity changes (e.g., the angularity) across the contiguity, and $C_D$ is average the number of breaks in the contiguity. $C_D$ also represents a value that reflects how disrupted the contiguity is, as measured using the stitched image. For example, in an embodiment, $C_D$ may have one of two values, which are 0 and −0.25, where $C_D$ is assigned the value of zero if the contiguity spans more than 75% of the width, and $C_D$ is assigned a value of −0.25 if the contiguity spans less than 75% of the width.

The contiguity angle may be computed from $C_A$=(L2C$_{\bar{x}}$+R2C$_{\bar{x}}$)/2, where L2C is the angle made by a line connecting the center of the contiguity to the point where the contiguity intersects the left side of the image, and R2C is the angle made by a line connecting the center of the contiguity to the point where the contiguity intersects the right side of the image R2C is the line that best approximates the angle made by the right side of the contiguity whether or not the contiguity intersects the right side of the image. L2C is the line that best approximates the angle made by the left side of the contiguity whether or not the contiguity intersects the left side of the image.

Some rules for determining linearity according to at least one embodiment are as follows. The values in this discussion are based on the angle of the dominant contiguity and, the distance off of the X-axis. The measured angles are computed and averaged. The measured angles are further distilled with rules, so that images which differ significantly in terms of content can be still be grouped and categorized according to their angular complexity. However, having the angularity data for each stitch and peel image additionally allows for the extraction of other information.

A value of 0 is assigned if the contiguity disruption is a straight edge, extending across more than 75% of the image width and if the averaged angular difference of a single baseline point is less than 5°.

A value of 0.15 is assigned to the linearity if the average angular difference is between 5° to 30°.

A value of 0.25 is assigned to the linearity if the average angle difference is between 30° to 45°.

A value of 0.75 is assigned to the linearity if the average angle difference is greater than 45° and if the contiguity extends across the image as a diagonal.

A value of −0.15 is assigned to the contiguity if the contiguity is disrupted and/or non-linear (or irregular).

A value of −1.0 is assigned to images without a defined contiguity or without an object-based contiguity. For example, if the only contiguity is the sky it has a linearity of −1.0.

In this embodiment, a solid block of color is not viewed as a horizon contiguity with linearity. If there is a horizon type of contiguity, the value of the horizon contiguity is different than −1, but in this embodiment, as a color block the sky has no linearity, per se, as defined by angles or disruptions since there are no disruptions in the sky's continuity.

In an alternative embodiment, the absolute value of the sine of the average angle (or the square of the sine of the average angle) may be used for linearity for contiguities with no disruptions.

Referring to FIG. 11A, $AF_4$ is a continuity value ($C_{continuity}$) for a contiguity using a stitched image. $AF_4$ is computed from $C_{continuity}$=$C_{VD}$+$C_{IE}$, where $C_{VD}$ is a value representing the average of the span (e.g., average of the total width of all) of the vertical disruptors per contiguity, and $C_{IE}$ is an average of the span of irregular edges of a contiguity. Some examples of VDs are a tree, a grove of trees, or a house on an otherwise continuous contiguity. Each VD has a height and can extend from the contiguity to the top edge of the image or to points in between. The irregular edges (IE) refer to what can be likened to an uneven surface—a rocky shoreline, or a city landscape which forms an irregularly edged (uneven, bumpy) contiguity by virtue of the color block of sky above and the continuity of the buildings across some or all the horizon.

The Continuity Rules for assigning values to images with Vertical Disruptors and/or Irregular Edges are summarized in FIG. 11A. The Continuity Rules are: if an image has at least one contiguity which is continuous across the entire width of the image (75-100%+/−3%), then assign a value of 1.0. If the contiguity is continuous across 50-75%+/−3% of the image, then 0; if less than 50% or if contiguity number is 0, then assign a value of −1.0. If there is/are a vertical disruptor extending more than 5% but less than 30%, individually or if combined, up from an otherwise linear and continuous contiguity but which has additional complex contiguities, then assign a value of 0.5. If there are 2-3 VD but which are spatially separated, then assign a value of 0.5. If the vertical disruptors individually extend in the vertical direction less than 20% of the distance to the top of the image from an otherwise linear contiguity then the VD is assigned a value of 0.5.

If there are multiple vertical distractors present in the image (trees in the foreground), then assign a value of −1.0. Optionally one can use progressive decrements to identify variations/objects off the X-axis and their return to an established baseline across the entire image. If there are multiple irregular edges on one or more contiguities or if there is a single contiguity without a color block greater than 30% of the image's height above the IE, then assign a value of −0.25. Assign a value of −0.15 for a single contiguity with a poorly defined edge which may be interrupted across the width of the image, be irregular, or have vertical disruptions, but which is adjacent to at least one continuous color block or a color block greater than 30%.

For Irregular Edges, a poorly defined edge is a contiguity which is irregular, and/or which has multiple vertical disruptions throughout its width and/or clustered in regions. From a quantitative standpoint a poorly defined edge would be an edge having multiple Vertical Disruptors present along the entire length of the contiguity, disrupting the horizon interface and/or where less than 30% of the contiguity's interface has a discernible color block above the disrupted portion of the contiguity. The percentage of disruption may also be defined by a series of grid tools labeled 1910 in FIG. 19A to evaluate how much space a VD occupies and the color block above and around it.

The $C_{VD}$ is computed using the above contiguity rules (FIGS. 11A and 11B).

Note that the formula below is used to determine where a VD meets the criteria for the rules. The formula accounts for multiple vertical disruptions. For example, for a farmhouse on the prairie with a silo, windmill, barn and house in otherwise open space, each of the elements would represent a VD which would be analyzed according to each VD's contribution to the overall VD impact to disrupting the contiguity's continuity, because the individual VDs are considered to define the VD relative to one another (the space between VDs from a width perspective, and the height parameter for the image as defined by the contiguity's Y-location).

To compute the $C_{VD}$, the Sub-area$_{dc}$ is the area above the dominant contiguity. The distance between vertical distractors is measured. The ratio of the area of the first vertical distractor to the subarea (e.g. quadrant) in which the first vertical distractor is in is computed according to the formula $$C_{VD.a1} = \text{Vertical Distractor area1} = (VD1_{Q1w})(VD1_{Q1h})/\text{Sub-area}_{dc}$$

$VDmQ_{nw}$ is the width of vertical disruptor m of quadrant n and $VDmQ_{nh}$ is the height of the vertical distractor m of quadrant n. For example, $VD1_{Q1w}$ is the width of vertical disruptors of quadrant 1 and $VD1_{Q1h}$ is the height of the vertical distractors of quadrant 1. the subarea is the area above the contiguity, and each $C_{VD}$ is the percentage of the area above the contiguity that is occupied by the vertical distractor. The above continuity rules are applied to the first vertical distractor based on the area $C_{VD.a1}$.

The ratio of the area of the second vertical distractor to the subarea (e.g. quadrant) in which the second vertical distractor is in is computed according to the formula $$C_{VD.a2} = \text{Vertical Distractor area 2} = (VD2_{Q2w})(VD2_{Q2h})/\text{Sub-area}_{dc}$$

The continuity rules of FIG. 11, are applied to the first vertical distractor and to the ratio of the area of the second vertical distractor to the subarea containing the second vertical distractor, $C_{VD.a2}$. The process applied to VD1 and VD2 is repeated for each vertical distractor $C_{VD}$. In an embodiment, for Irregular Edges, there is only one definition for a vertical disruptor, which is based on the width of the irregularity. (All VD are irregular, but not all irregularities are VDs. For example, the trees of a grove of trees VDs are; the grass or flowers of a field with flowers or grass form an IE or part of an IE).

$C_{IE}$ describes irregular edges as part of computing the contiguity's continuity according to the following rule: If there are multiple irregular edges present on one or more contiguities; or, if a single contiguity is present but without an vertically adjacent color block with an area greater than 30% of the image above the contiguity, then assign a value of −0.25. Assign a value of −0.15 if there is only a single contiguity with a poorly defined edge, but which is adjacent to at least one continuous color block, or has a vertically adjacent color block with an area greater than 30% of the image, above the contiguity.

Referring to FIG. 11D, $AF_5$, is the color block depth 100, which defines the color block distribution (see step 524, above). The assignment of a value follows a set of rules described in FIG. 11B using a quadrant-based analysis of the color distribution in the image. The FIG. 11B rules table applies to both $AF_5$—Color Block Depth 100 ($CBD_{100}$) and $CBD_{ST}$, for the stitched image.

Referring to FIG. 11D, $AF_6$ is the spatial color-contiguity, which compares the contiguity number to the color block number. To obtain a value for $AF_6$, compare the value obtained for $AF_2$ (Color Block) to $AF_1$ (# of contiguities present in the image), and are summarized in the table in FIG. 11C as follows: If AF1 is equal to AF2, then assign a value of 0; if AF1 is greater than AF2, then assign a value of 1; if AF1 is less than AF2, unless the contiguity number is equal to 0, then assign a value of 2; and, if AF1=0 then assign a value of −1.

Figure 12A:
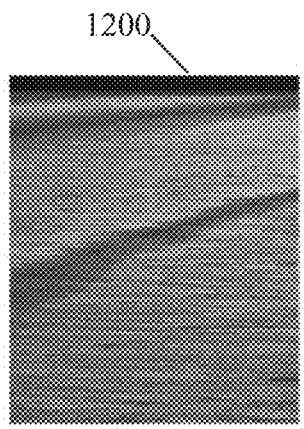
FIGS. 12A-G show the application of a stitch and peel, according to at least one embodiment.
Figure 12B:
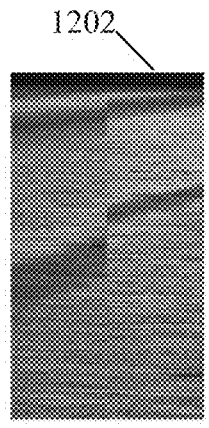
Figure 12C:
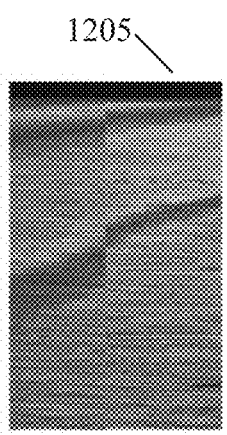
Figure 12D:
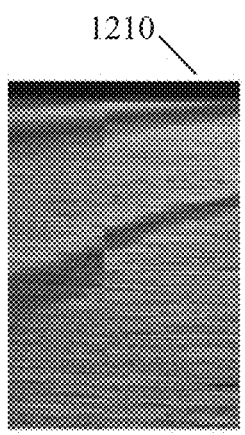
Figure 12E:
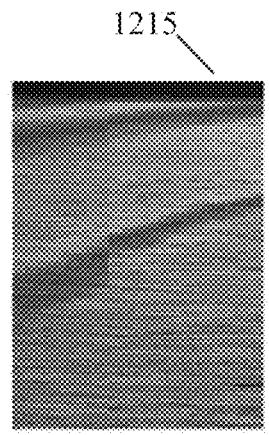
Figure 12F:
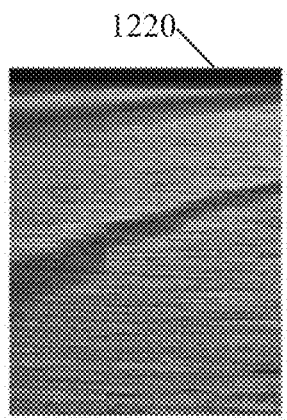
Figure 12G:
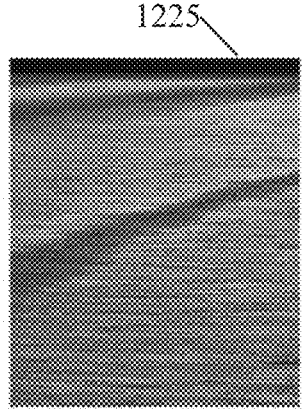

FIGS. 12A-G show the application of a stitch and peel, according to at least one embodiment. FIG. 12A shows image 1200 prior to being altered. In at least one embodiment, an image 1200 (FIG. 12A) is divided into predefined sections, e.g., a first section, a second section, and a third section. In FIG. 12B, the first section can be shifted from a first area in which it is arranged to a second area, so that the first section can mask the second section, thereby removing the second section (which in one embodiment may be ⅓ of the image), resulting in image 1202. The first section can be peeled at a predetermined value, for example, at twenty percent, as represented by image 1205 (FIG. 12C in which the central 25% of the image is removed); image 1210 (FIG. 12D in which one quarter of what was removed, which is 6.26%, of the total image is returned); image 1215 (FIG. 12E in which two quarters or one half of what was removed, which is 12.5%, of the total image is returned); image 1220 (FIG. 12F in which three quarters of what was removed, which is 18.75% of the total image is returned), until the first section is arranged in the first area and the second section is uncovered, and the image is restored to the previous shape and size of the image, as shown in image 1225 (FIG. 12G, which is the same image as image 1205 shown in FIG. 12A, however, FIG. 12A is the image before being stitched, whereas FIG. 12G is the image after being stitched and then peeled to the point of being fully restored). As the first section is peeled and moved, the contiguity in the image is identified by machine system 101. The contiguity, and the thresholding may be repeated for each of images 1200 (FIG. 12A)—1225 (FIG. 12G). Different aspects of the contiguities and the images, as a whole are emphasized, and by averaging the characteristics of each of the images 1220-1225 features that may be missed by looking at the image as a whole may be found. In other embodiments the stitching and peeling may be done in a different way than in FIGS. 12A-12G. For example, a different percentage of the image may be removed (e.g., 90%, 80%, 60%, 40%, or 20% may initially be removed), and different percentages may be put back (e.g., the put back parts in each stitch may be 10% of the amount removed, 15% of the amount removed, 20% of the amount removed, 25% of the amount removed 33% of the amount removed, or 50%). The amount put back at each stitch and peel may be different. For example, in the first stitch 15% of the amount removed may be returned, and in the second stitch 55% of the amount removed may be returned, and as a result of the first and second stitch is to return a total of 15%+55%=70% to focus on an area of interest.

Figures 13A, 13B, 13C:
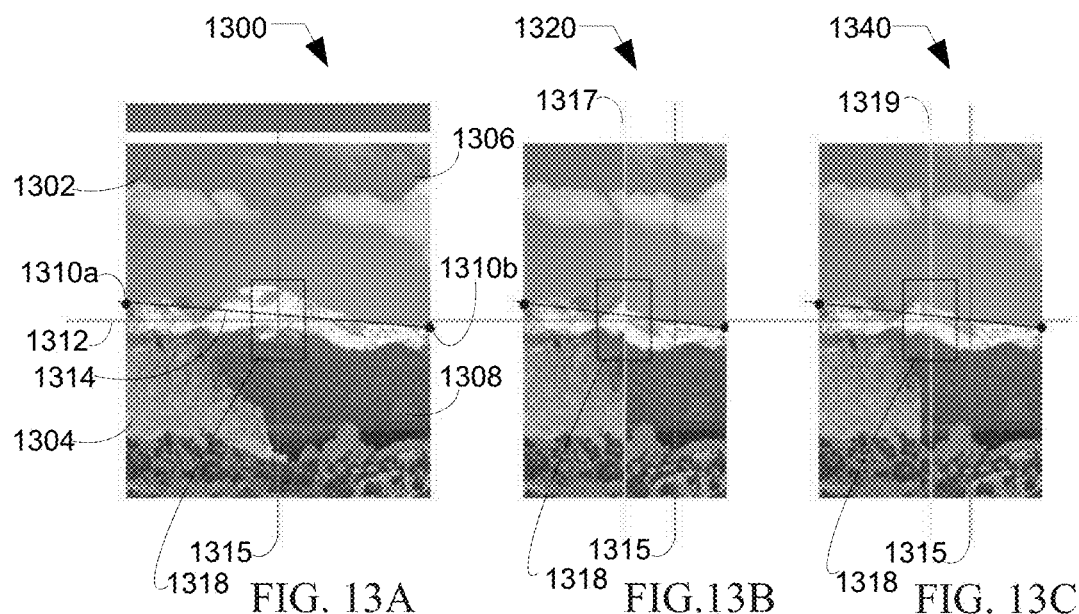
FIGS. 13A-H shows the application of quadrant-based measures, a stitch-based angle determination in an image, according to at least one embodiment.

FIGS. 13A-H shows the application of quadrant-based measures, a stitch-based angle determination in an image, according to at least one embodiment to emphasize a difference in the quadrants, according to at least one embodiment using the stitch and peel. Image 1300, the intact whole image is divided equally into four quadrants, e.g. first quadrant 1302, second quadrant 1306, third quadrant 1304, and a fourth quadrant 1308, which are separated by horizontal line 1312 and vertical line 1315. In image 1300, vertical line 1315 is aligned with a horizontal center of the image. To generate image 1320 shown in FIG. 13B, image 1300 was divided into three equal sized sections: Section 1, Section 2 and Section 3. In the stitch process, Section 1 is moved to the area previously occupied by Section 2, in effect masking the image parts of Section 2. In FIG. 13B, the vertical axis 1317 is the new vertical axis that divides the stitched image into quadrants, vertical axis 1315 is now off center as a result of the stitching. Baseline 1314 is a baseline contiguity line that establishes an initial contiguity line (based on the entire image) from which changes in and to the contiguity line in the stitched images may be computed. Baseline 1314 is a line connected by endpoints 1310a and 1310b, which may also represent a dominant contiguity in image 1300. However, any artificial contiguity may be used instead for the purpose of a baseline contiguity on which further measurements may be based. In at least one embodiment, a measurement area 1318 for evaluating the contiguity can be designated. In FIGS. 13A-G, the measurement area 1318 is a rectangular box centered at the intersection of the horizontal line 1312 and vertical line 1315, which may be used for identifying the vertical disruption caused by the mountain in the center of the image; to evaluate color symmetries; or, angular differences across a reference point may be computed. Multiple measurements can be taken using different points on the grid. Multiple grids can also be used to measure multiple VDs and/or the vertical disruption resulting from multiple vertical disruptions. In other embodiments, the measurement box may be located elsewhere and/or may have a different shape.

In FIG. 13B, the middle ⅓ of the total image of FIG. 13A has been removed. Stitched image 1320 (FIG. 13B) of image 1300 can be created and a stitch analysis of FIG. 4 is implemented. In at least one embodiment, when the image is compressed to the stitched image 1320, the vertical line 1315 is maintained in an original horizontal center according to the horizontal center of image 1300. In FIG. 13B, the measurement area 1318 is defined, as in FIG. 13A, to cover an area of interest according to predetermined parameters. However, since the middle of the image is removed, the portion of the image within measurement area 1318, in FIG. 13B is different than in FIG. 13A, allowing for an analysis and comparison of image elements, objects, color distribution and other contiguity characteristics as otherwise non-contiguous regions are brought into proximity to one another. Applying the measurement area 1318 to the stitched images of FIGS. 13B-13F, facilitates analyzing and comparing image elements, objects, color distribution and other contiguity characteristics of different parts of the image, as a result of being adjacent to one another or closer to one another in FIGS. 13B, 13C, 13E-G than those areas are in the full intact image of FIGS. 13A and 13H.

Performing peeling on the stitched image 1320 results in image 1340. The measurement of the contiguity angle change because of the vertical disruption, color block and the content within measurement area 1318 is different in each of images 1300, 1320, and 1340.

Figures 13D, 13E, 13F:
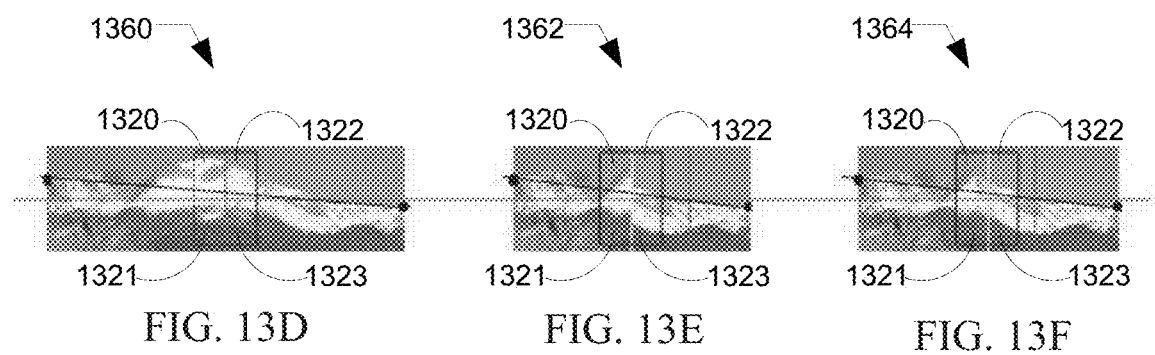

In images 1320 and 1340, measurement box 1318 is divided into quadrants to facilitate making measurements, such as comparing color blocks and/or measuring the vertical disruption of the object over which the measurement box 1318 is overlaid. In FIGS. 13D-F the images 1300, 1320, and 1340 have been cropped to form images 1360 (FIG. 13D), 1362 (FIG. 13E), and 1364 (FIG. 13F) to focus on an enlarged view of a strip of the image that is the same height as measurement box 1318. Images 1360, 1362 and 1364 are enlarged so that the measurement tool (rectangle) is proportionately enlarged, having an area that is similar to or closer to the area occupied by the mountain. When performed automatically, by system 100, by having fewer elements in the strip, the context is limited, so that there are fewer possibilities of interpretation, for system 100 to choose between increasing the accuracy of the measurement and automated interpretation. Measurement box 1318, may be divided into quadrants, which are labeled as the first quadrant 1320, second quadrant 1322, third quadrant 1321, and fourth quadrant 1323, as illustrated in FIGS. 13D-F). Each quadrant of the quadrants 1320-1323 can be further divided into sub-quadrants to obtain additional information of contiguity characteristics in the image.

Figures 13G, 13H:
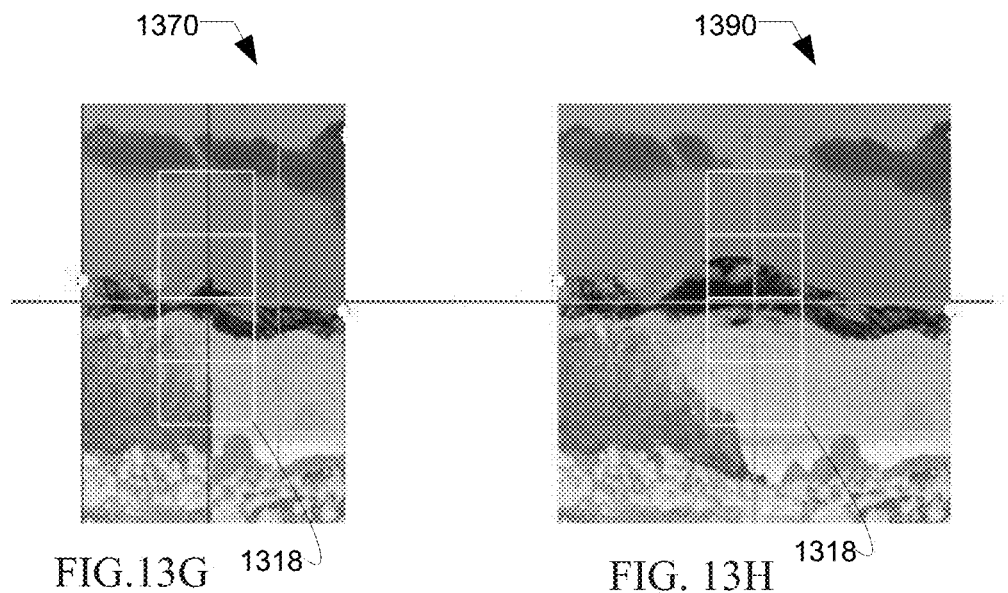

Image 1340 shows identifying multiple contiguity characteristics through implementation of a measurement area 1318. Measurement box 1318 may be used to compute the area of the mountain peak within measurement box 1318, which may be used to determine whether the mountain peak in measurement box 1318 is a vertical disruption relative to the angled contiguity, labeled 1314 with endpoints 1310*a* and 1310*b* at the sky mountaintop interface. FIGS. 13G and 13H show images 1320 and 1300, respectively, in which the colors have been reversed for easier visualization, and show 1318 measurement box, which is stacked along the images' midlines. The stacking of measurement box 1318 highlights color block relationships, and additional discontinuities in a secondary contiguity—the rock structure labeled 1304 in FIG. 13A.

FIGS. 13A-G, depicts the same mountain scenes that are subjected to a 1:3 Stitch in FIGS. 13B, 13E, and 13G. The 1:3 in the 1:3 stitch refers to the ⅓ of the image removed. Color and content symmetry is evident in the image portion on the top though the mountain contiguity is disrupted. Nonetheless, the image shows significant saliency and symmetry across the top half of the image at the irregular, snow-covered mountain-top horizon-type contiguity with the sky color block contiguity above it. Whereas, the bottom portion of the image does not portray content, color or saliency and the rock labeled 1304 shows significant discontinuities and irregular edges relative to the top portion of the image.

FIG. 14A-D shows the application of a stitching analysis with quadrant-based color blocking, according to at least one embodiment. Image 1420 (FIG. 14B) shows stitch of a first image 1400 (FIG. 14A), according to at least one embodiment. The first image 1400 (FIG. 14A) is divided into four quadrants, e.g. first quadrant 1402, second quadrant 1406, third quadrant 1404 and fourth quadrant 1408. The four quadrants are defined by horizontal line 1412 and vertical line 1410 (FIG. 14A).

In stitched image 1420 (FIG. 14B) the quadrants overlap to produce first stitch quadrant 1422, second stitch quadrant 1426, third stitch quadrant 1424 and fourth stitch quadrant 1428. The stitched image 1420 can enable determining that the color blocks between the quadrants, and in which of the quadrants are different and asymmetrical. By bringing together two areas of the image that are not actually juxtaposed, machine system 101 can more easily provide an indication of a disruption in the color block or the presence of an object (e.g., a vertical distractor) in the image. In FIG. 1420, the stitched image of FIG. 1400, the vertical axis 1410 is replaced with vertical axis 1430, while the horizontal axis 1412 is the same.

Image 1480 (FIG. 14D) shows a stitch of a second image 1460 (FIG. 14C), according to at least one embodiment. Image 1460 is divided into four quadrants (but could be divided into a different number of regions), e.g. first quadrant 1462, second quadrant 1466, third quadrant 1464 and fourth quadrant 1468, by vertical line 1470 and horizontal line 1472. In stitched image 1480, the quadrants overlap to produce first stitch quadrant 1482, second stitch quadrant 1486, third stitch quadrant 1484 and fourth stitch quadrant 1488, in which vertical line 1490 replaces vertical line 1470.

Figures 15A, 15B, 15C:
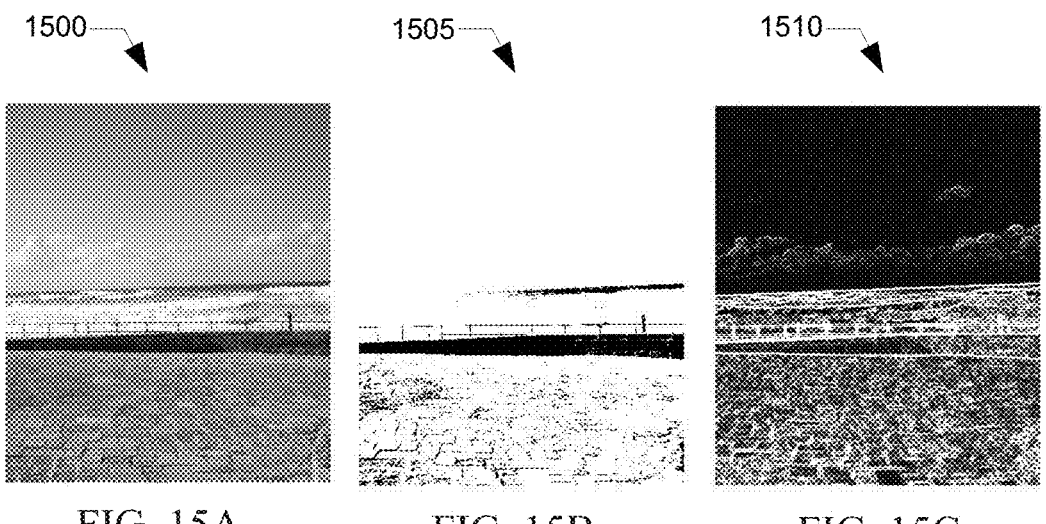
FIG. 15A-C shows application of edge detection using thresholding and edge detection, according to at least one embodiment.

FIG. 15A-C shows the application of edge detection using thresholding and Sobel edge detection, according to at least one embodiment. The original image 1500 (FIG. 15A) can be filtered using thresholding to generate the threshold filtered image 1505 (FIG. 15B) at a setting, and can be filtered using Sobel to generate a Sobel-filtered image 1510 (FIG. 15C). FIG. 15B may be a binary image in which pixels having a value below a given threshold are set to a first value (e.g., white) and pixels having a value above the threshold are set to a second value (e.g., black). Note that the edge separating the sea from the sky and the edges demarcating the clouds are easier to see in FIG. 15C than in FIG. 15B, whereas the contiguity forming the sea wall is easier to identify in FIG. 15B than in FIG. 15C. Also, in the FIG. 15B, the contiguity forming the sky is large and not interrupted by clouds, for example.

Figure 16A:
FIG. 16A-D shows color block contiguities through implementation of different image filters, according to at least one embodiment.

FIGS. 16A-D show color block contiguities through the implementation of Sobel edge detection and thresholding edge detection, according to at least one embodiment. In FIG. 16A, the original color image 1600 has been desaturated to produce a halftone image and which has then been thresholded at a pixel value of 127 as the threshold.

The progressive removal of a contiguity from an image or composite image (and which can be likened to what is being analyzed in an image with the application of different threshold/Sobel filter combinations) changes the switch capacity of the image set.

Figure 16B:
Figure 16C:
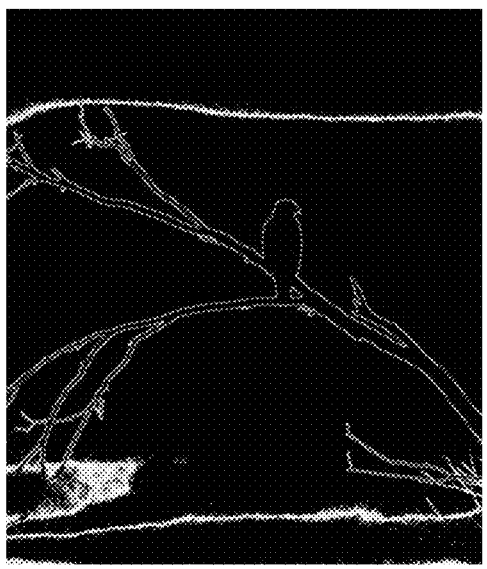
Figure 16D:

In FIG. 16B, the original color image is reduced to 2 colors, which was then desaturated. FIG. 16C shows the halftone image which has been thresholded at 127 and then the edges detected with a Sobel filter. FIG. 16D shows the results by applying a Sobel filter directly to is the same halftone image used to produce FIG. 16C. FIG. 16D shows a loss of details when compared to FIG. 16C (see the contiguity color block interface at the top of the image, and the details in the bottom left hand corner of FIG. 16C, which are missing from FIG. 16D), which shows that the application of different filters to the same image can yield different results with the loss of information, in this case contiguity information and that there is an advantage of thresholding an image prior to applying a Sobel filter. In at least one embodiment, image 1610 and image 1615 illustrate the limitations of edge detection by using only a Sobel filter subsequent to color reductions to b/w and using the Sobel filter (or another edge detection filter) without color reduction. When compared, both images 1610 and 1615 show a loss of detail, corresponding to color block-related differences which is evident in both images 1600 (FIG. 16A) and image 1605 (FIG. 16B) which show color block banding at the top and bottom of the image. The loss of information demonstrates that one technique or use of the filter alone is not adequate to provide the kinds of details that the human eye perceives.

In FIGS. 16A-D, the branch extending diagonally across the image is a contiguity and the color block region above and below the branch (which is the sky in the background) is also a contiguity—which is a color block contiguity. The bird on the branch is a vertical disruption in the contiguity of the area above the branch and the branch. A contiguity, such as the branch (having the bird), can be interrupted by interleaving intervening images to form a composite image, and still be used to inform subsequent image sections for discerning content, including machine vision training schema as part of a predictive model system to identify parts of sequential images and/or multiple images sets, despite the spatial hyphenation of the content. The vertical disruption which can be in the contiguity may be objects of interest, and the fact that a region is a vertical disruptor may be used as one factor of multiple factors that indicate that a region is part of an object of interest and/or that the object may be a foreground object as with the bird on the branch which is contextual and can be used to inform the image's content.

Figure 17:
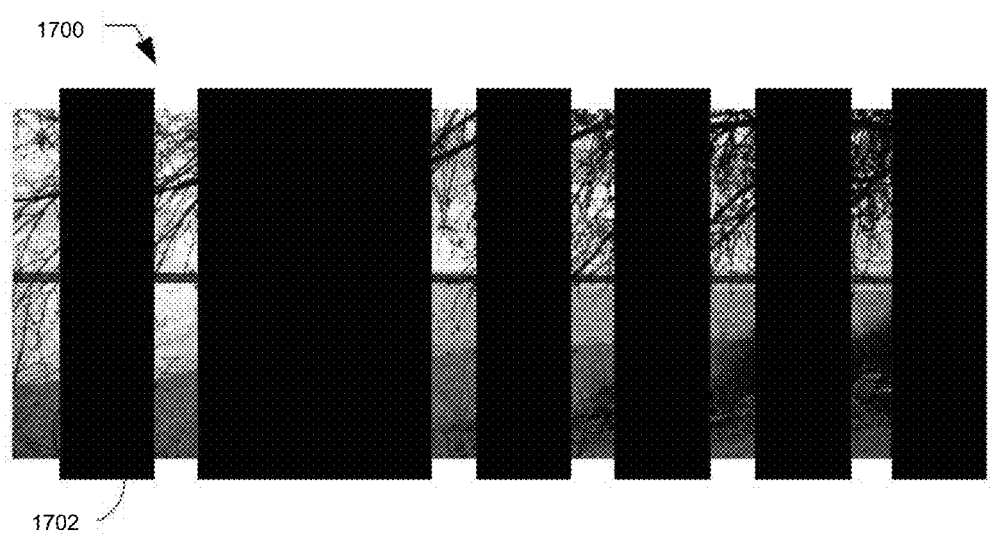
FIG. 17 shows an example of masking of contiguous regions of an image according to at least one embodiment.

FIG. 17 shows an example of masking of contiguous regions of an image according to at least one embodiment. In at least one embodiment, image 1700 and labeled 1702 illustrate that despite application of a mask, which is placed, and may represent, a missing area of an image, the contiguity can nonetheless be identified using color blocks and edge determination to fill-in the masked content, such as by logically (e.g., numerically, inferentially and/or predictively) extending the contiguities to fill-in the masked content. In at least one embodiment, image 1700 and labeled 1702 illustrate that despite application of a mask, which is placed, and may represent, a missing area of an image, the contiguity can nonetheless be identified using color blocks and edge determination to fill-in the masked content in accord with Gestalt principles of completion and continuation, such as by logically (e.g., numerically, inferentially and/or predictively) extending the contiguities to fill-in the masked content.

Figure 18:
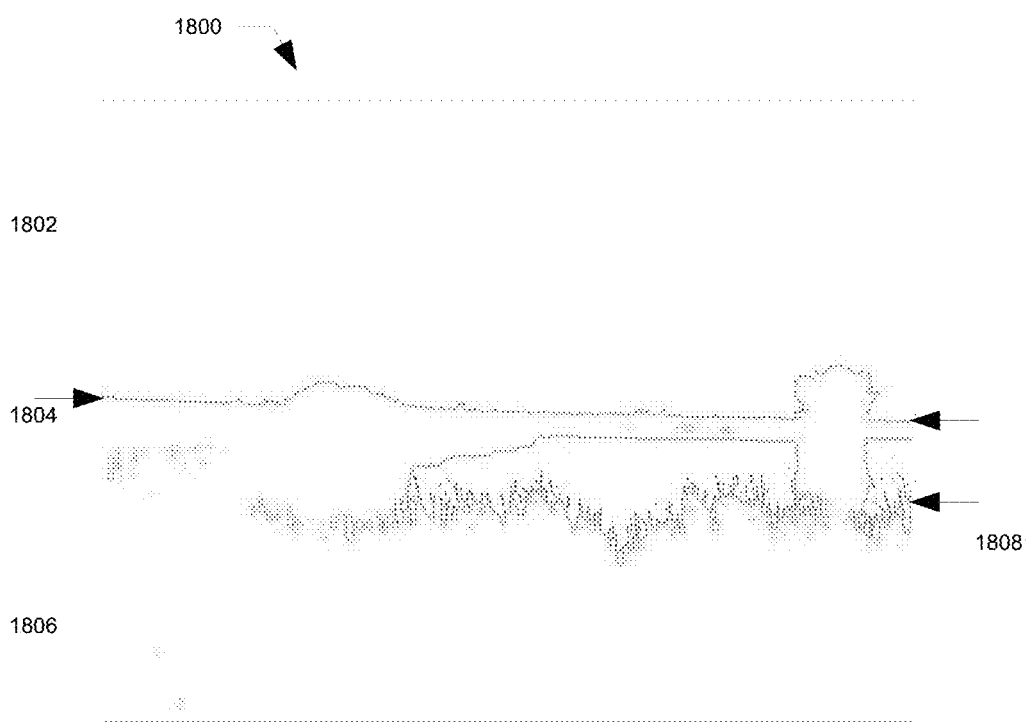
FIGS. 18, 19A, and 19B show examples of contiguity identification methods using different filters.
Figure 19A:
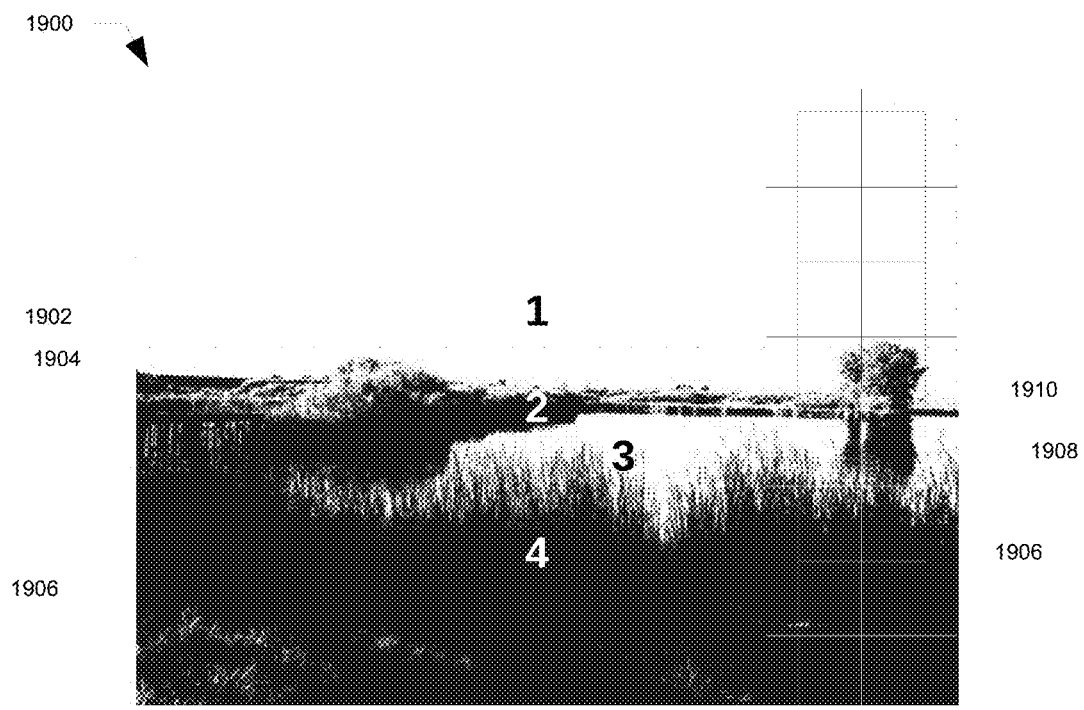
Figure 19B:
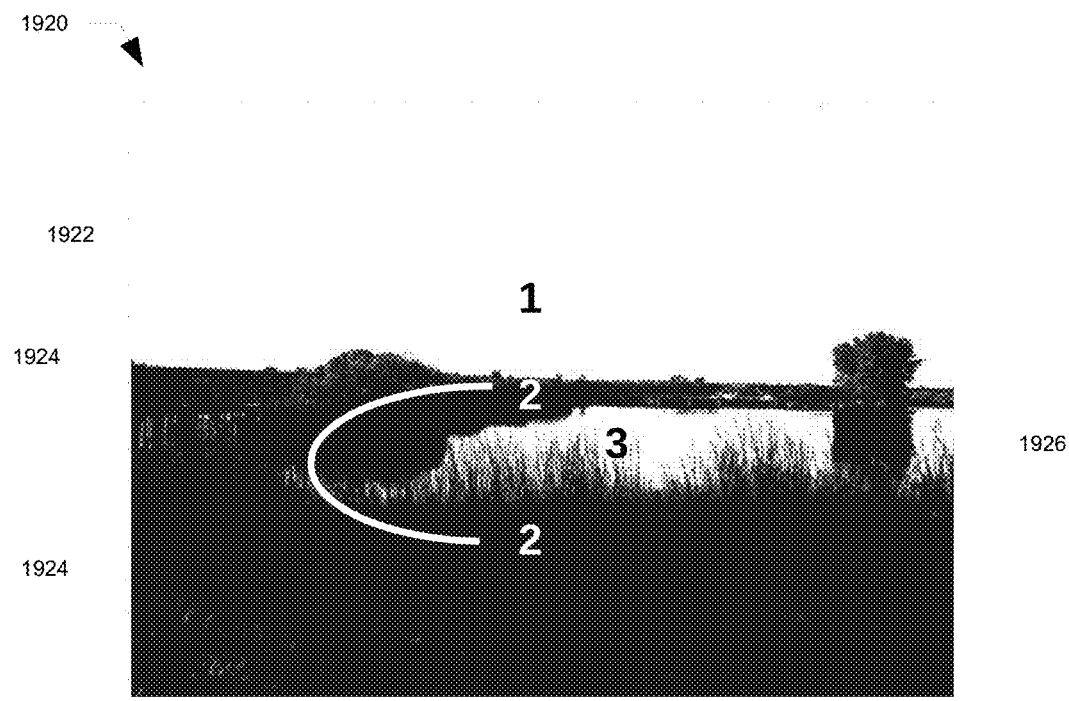

FIGS. 18, 19A and 19B show examples of contiguities identified using threshold filter and edge detection filters. Labeled part 1802, 1902, and 1922 is respectively identified in each of the FIGS. 18, 19A and 19B as sky (which in FIGS. 19A and 19B is labeled "2"). In FIG. 19A, contiguity 1904 is the land above the lake (which is labeled "2"), contiguity 1908 is the lake (which is labeled "3"), and contiguity 1906 is the land below the lake (which is labeled "4"). In FIG. 19A, the lake visually extends far enough to the left to divide the land above and below the lake. In FIG. 19B, by using a different threshold the land above and below the lake are joined to form a single contiguity (1924, which in FIG. 19B is labeled "2"), because the lake does not extend further to the left to continue the definition of each part as separate contiguities (the curved line having the label "2" at both ends indicates that the entire region has been identified as one contiguity). In an embodiment, for the lake to divide the land into two contiguities, the lake would need to extend to the left edge of the image and not be interrupted by a land mass. However, in an embodiment, if system 100 has additional information (e.g., based on the context or based on a break in the uniformity of the image of the grass near the lake or of an image showing a different angle on the scene, for example) indicating that there is a portion of the lake which does extend to edge of the image, but is not visible in image 1920, system 100 may designate the land parts as two separate contiguities. System 100 may have information (e.g., based on the pattern formed by the surrounding plants and/or the context) indicating that the lake extends to the left but is framed by land on either side in a region where the lake is joined with a narrower inlet. Note that attributes of a contiguity's color may be used by system 100 to identify an interface between two regions and/or by two color block regions of a same or different colors separated by a contiguity with thin characteristics, e.g. having 1-5 pixels of height or with greater dimensions and characteristics of its own as a picture element such as a shoreline with trees, separating a blue sky region from a blue lake region.

General Comments

The contiguity analysis process defines image characteristics that can be applied to any field that deals with edges within images of all types, and the use of edges for identifying elements of an image. For example, autonomous vehicles and the visually impaired are concerned with object boundary detection (such as lanes, cars, and people) as part of feature extraction and scene analysis to detect what is on the road and/or to detect where the road is (for example). At least one embodiment associates additional information with edges (or associated edges with additional information) and, as such, to view the edges as integral elements of an image (static or moving), in slightly different ways. At least some of the methods disclosed herein help identify relationships in images, because contiguities tend to indicate relationships between elements. While the analyses processes are described in an orderly fashion, data from one measurement and the image sets generated (stitched, color reduced, etc.) may be used as resources in the analysis for another step or process. Although some output characteristics are dependent on other data, the interrelationships between the different steps and methods help to define relationships between objects in the image scene as well—where the different methods can be computed in parallel.

The use of the 1:3 stitched images and variations on the 1:3 stitch can be viewed in terms of scene processing which involves considering both near and far elements in analyzing scenes. The stitched image can be likened to near-sighted vision, where elements are brought into closer proximity; whereas, the unaltered image can be likened to farsightedness views. By giving system 100 fewer items to analyze simultaneously, it therefore may be able to do a better job of identifying those images and parts of the images.

The combination of the stitched image(s) and the unaltered image, together, reflect how humans see the world. As humans move from point to point, humans, albeit not necessarily consciously, receive information about what objects are close by (e.g., via peripheral vision, via visual information that the person may not have been paying attention to, but was within their field of vision, based on inference, and/or based on past experience), to avoid obstacles in the way, how to get from point to point safely, quickly, and to planning a path of travel. A 1:3 stitched image can be thought of as a way of folding space focusing on details of the image at the edges of the image and on the spatial relationships between features on the left and right edges that might be more difficult to identify when the central part of the image is present. The juxtaposition of the features on the right and left edges of the image may help identify how the features on the left edge of the image match and/or relate to features on the right side of the image to help identify contiguities, for example.

Further Tangential Points

Some further points about at least one embodiment of the system: Saliency can be sharpened and adjusted by cropping to eliminate distractor elements. Stitching can be iterative (drilling down to smaller and smaller areas). Stitching can join different sections and mask different amounts of an image (1:3, 1:5; 3:1, etc.). Any quadrant (or other region) can be iteratively subdivided for additional analysis. Differences in similar hues can be more evident in stitched images. The observed color on screen may be different than the colors analyzed/extracted (green on screen, may be brown, or gray when color mapped).

Example 1

Figure 23:
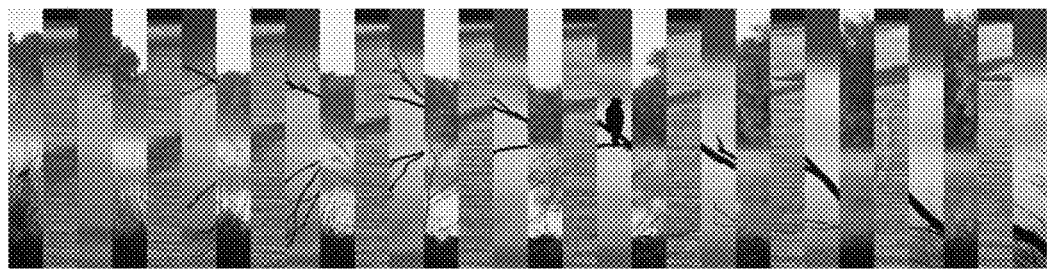
FIG. 23 shows a halftone composite image involving the image of FIGS. 16A-D

If a user has a composite image made from three images interleaved with one another. If it is desired to substitute one of the images with another image with similar subject matter (e.g., perhaps the composite image is a combination of an elk, a partly cloudy sky and a lake, and perhaps it is desired to substitute the elk with another image having an elk or the partly cloudy sky with another image having a sky, or the image of the lake with another image having a lake), but this time it is desired to have a different image to be the easiest image for the average viewer to hold together in their mind (see FIG. 23).

Some Rules and Further Discussion of Example 1

Images that show an image element or object, such as land, ground, sidewalk, or a snow-covered field in the ground position in a context such as the field that is familiar or known to system 100 (e.g., where system 100 has been trained to recognize, where system 100 is programmed to recognize, and/or where system 100 has a database with categories, such as attributes, that facilitate finding images having features associated with the ground) will be easier to discern and be assigned as ground (e.g., because of its associative context or a relational database having images categorized as having ground position features). In the following discussion, regarding the references to the mind and to the average viewer, the average viewer is the same as an average person, and the mind refers to the mind of the average person as determined by a survey of a statistically significant sample of people that is large enough to determine how the average person, e.g., within a given age range (e.g., 18 to 50), perceives what is happening in their mind. In general, system 100 will search for images associated with numerical values (e.g., as attributes) that are above or below a given threshold for the ambiguity value (CR), aesthetic value, saliency, for example, as an indication of the qualities of the image that are expected to achieve the desired effect in the mind of the average person. An image showing a large portion of the ground may be said to occupy the ground position, because the mind (of the average person) sees the ground as the ground in the composite image in context. An image having a horizontal contiguity, will be associated with the ground position, because the contiguity tends to divide ground from sky in the mind of the average viewer, and thus images with a horizontal contiguity tend to occupy the ground position (e.g., FIGS. 5A-G, 15A-C, the image strips that have not been hidden by the mask in FIGS. 17, 18, 19A, and 19B). In other words, an image having a horizontal contiguity, will have image parts traditionally associated with the ground position, because horizon-type contiguities tend to divide ground elements from sky or sky elements based on known contexts, user experiences and probabilistic relationships. In an embodiment, system 100 is configured to associate an image with a horizontal contiguity as an image that assumes the ground position, when implementing rules that require an image that is in the ground position or requires an image that is not in the ground position.

In an image with a central object (e.g., the hawk of FIGS. 16A-D or the elk of FIGS. 22A-C), but which optionally may have no other contiguities, the central object tends to occupy the figure position in the image, which is the position where the mind places the foreground of an image (e.g., in a picture of a person, the image of the person in the picture is usually in the figure position), and consequently, system 100 may be configured to associate images with a central object, but with no contiguities, with the figure position. However, an image with no objects and/or contiguities tends to occupy the ground position, and consequently, system 100 can be configured to associate images with no contiguities with the ground position.

In the example above, the hardest image to assemble in the mind, representing the image least likely to occupy the ground, is assumed by system 100 to re-assemble in the mind of the average user will be an image that occupies the figure position and has limited or no switch capacity when it is juxtaposed with an image which has a contiguity. By default the image with the contiguity will be seen to occupy the ground position. The switch capacity is the capacity of the component images in a composite of interleaved image sections to alternately occupy the ground position. The switch capacity is a value intended to indicate the ease with which an average viewer can switch between two or more ways of assembling an image in the mind, a percept, and hold that percept in the mind. The stability of a percept may come into play in terms of switch rates, where one percept is preferentially held in the ground position based on a variety of factors (such as the viewers head position, eye gaze, spatial separation between the contiguities, and/or color differences). This would impact the rate of switching between percepts and can be integrated as part of user cognitive training in stabilizing their attention for a designated time and on a target (not for training sets for AI). A related parameter is the stability of a percept which may be captured by assigning a value to an image or a combination of images for ease of switching, where one percept is assumed to be preferentially held in the ground position based on a variety of factors (spatial separation between the contiguities, color differences, etc., which are used to compute an ease of switching value). The stabilization of percepts or preference of one percept over another is the result of a variety of factors. An image in the ground position is stabilized in that position if only one image has a contiguity and the other one or two do not. The concept of percepts by definition means there is more than one, as in alternative percepts. Which percept is favored in a switch-capable image is a function of a multiplicity of variables including: bias, head position, gaze position, distractors, color blocks and spatial separation. If the contiguities in two different images are spatially separated then where the person is looking will be a dominant factor. For contiguities with a stacked quality or with less spatial separation as the person tracks across the image the likelihood of a switch is higher as their gaze (and focus) drifts or shifts. The saliency notwithstanding vis-a-vis color blocks can also hold the person's attention and serve to stabilize the image position as ground, impacting the switch rates.

In the Cognitive Platform, these variables are used or training purposes, for attention stabilization, to improve cognitive flexibility using switch capable images with easier to more difficult to discern contiguities, which is discussed in greater detail in U.S. Provisional Patent Application No. 62/721,665, entitled "MULTI-PURPOSE INTERACTIVE COGNITIVE PLATFORM," filed on Aug. 23, 2018, by Tami Ellison, which is incorporated herein by reference.

The switch capacity may be computed by system 100 from $$CF(Q) = V_{AES} + CR$$

In other words, the switch capacity is the sum of the aesthetic value and the contiguity value. In other embodiments, a different combination (e.g., the product or a weighted sum) of the contiguity values and the aesthetic value may be used for evaluating the switch capacity. The factors that aid the mind of the average person in holding one particular image assembly, in the above example, is that one image or two images do not have contiguities and where the other image has contiguities that are easily identified. Thus, when system 100 is requested to provide a composite image with the requirement that an image set is easy to assemble in the mind, system one 100 automatically searches for an image having a contiguities that are expected to be easily identifiable (e.g., as determined automatically based on the contrast and size of the contiguity) and system 100 would pair that image with an image which lacks contiguities or a dominant object.

An image with no contiguities (or more accurately with a very low contiguity rating, which may be associated with the absence of any contiguities or the absence of a dominant object) can be juxtaposed (e.g., interleaved) with a second image which also has a low contiguity rating value, and then both will be equally easy to reassemble in the mind of the average viewer and take up the ground position (e.g., FIG. 21), which seems counter-intuitive, except where system 100 may return two images with low contiguities in response to a request to form a composite image with two images that are equally easy to assemble in the mind of the average user. When a contiguity is present the contiguity defines the figure and ground. When two images have contiguities, then system 100 automatically assumes that both can occupy the ground position, but with different frequencies or ease of being held by the mind in the ground position, based on saliency/contrast—as determined by an automated determination of the saliency and/or contrast and their contributions in each image.

If both of the images in a 2-image composite do not have contiguities or poorly resolved contiguities, and are therefore images low CR values, then both the internal and juxtaposed image differences/contrasts in value and hue will contribute more to defining which has a higher degree of saliency (in an embodiment, system 100 uses CR as the basis of making decisions and may not necessarily determine whether there were any contiguities that were detectable after the CR was computed). The image milieu/pairing determines which image occupies the ground positioning, stability and switch capacity of the image set. If the internal contrast is only in a portion of the image then potentially the ease of assembly may be assumed by system 100 to be regionally dependent—in that in one portion of the image, can be in the ground position, but may switch to the other image as the viewer tracks across the image set and is viewing another portion of the image set where the saliency/contrast is poor and the image gets "stuck" in the figure position in that region.

In an embodiment, system 100 automatically assumes that the mind may need to work harder in a smaller image to be able to observe a switch between two images. The size of the image set, similar to cropping may remove distractor elements. The size of the image may interact with the viewer in discerning subtle changes in hue and value, and the machine may take into account the size at which it is desired to present and/or print the image. In full-size images, system 100 assumes that it is easier to resolve having either of the images in the ground position. System 100 assumes that the higher contrast areas affect placing and keeping the image in the ground position in the viewer's mind. Consequently, system 100 may search for a full size image and/or images with a higher contrast when searching for an image that will be able to occupy the ground position. As an aside an image may occupy the figure position in a three-image composite, the ground position when it is combined with one of the other images into a two-image composite. This alternative figure-ground positioning is a result of the image having a lower contrast than the images it was combined with in the first image set, but having a higher contrast than one of the images from the first when the two are combined in the second image set. Consequently, when system 100 is searching for an image to place in the ground position, system 100 may search for an image that has a higher contrast than the other image or images that will make up the composite image.

Figure 20:
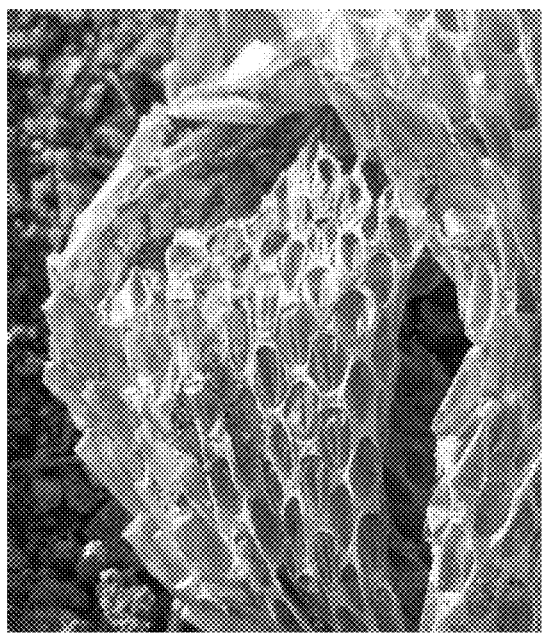
FIG. 20 shows an example of an image with a good saliency, but no contiguity.
Figure 21:
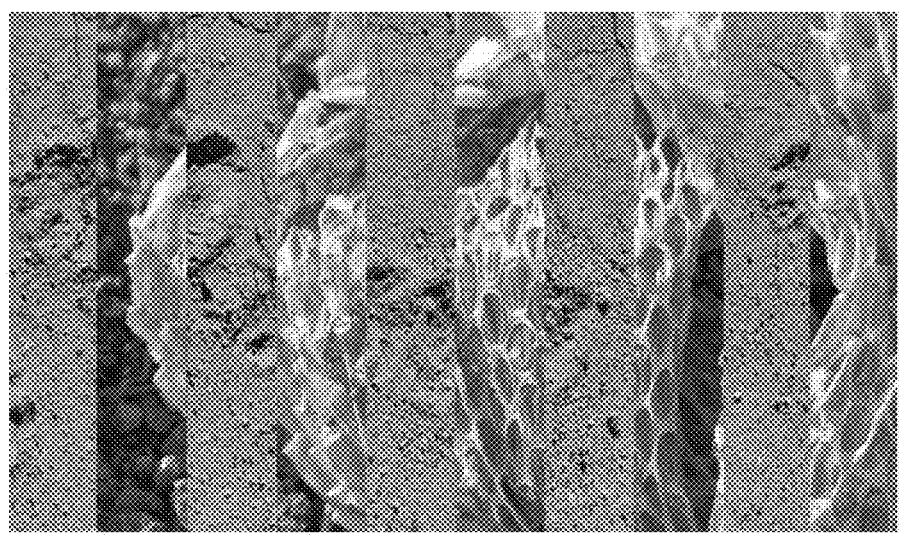
FIG. 21 is an example of a composite image having the image of FIG. 20 as one of the component images of the composite.

Referring to FIG. 20, one caveat being that even in an image with a very low CR value, e.g., made up of a large object, such as the snakeskin of FIG. 20, which occupies almost the entire image area, and having only a small but high contrast area gives that area sufficient saliency to drive that image to the ground position. The snakeskin of FIG. 20 has saliency in the region on the left where the snakeskin ends and the pebbles are seen to generate a figure-ground relationship in the image. On the left of FIG. 20, however, where there is a "transition" between the snakeskin and the background rocks, the saliency is such as to allow a discrimination of elements in the image and a figure-ground relationship is observed. In FIG. 21 when the snakeskin image of FIG. 20 is combined with the image of raccoon tracks to form a 2-image composite, the region of high saliency for the snakeskin in the composite, translates to a zone in the component image where the image content in the foreground can be distinguished from the parts of the image in the background giving FIG. 21 depth. However, when attention is focused at the far right of the composite image, the snakeskin image is not placed in the ground position relative to the raccoon track image or relative to the region of the snakeskin image in the composite on the left. Consequently, when system 100 is searching for an image to place in the ground position, system 100 may also search images that have no contiguities or have one contiguity. In FIGS. 20 and 21, there is a hierarchy of relationship of contiguities, where some contiguities stand out or are more dominant than others. In one embodiment, an image with a weak contiguity (e.g., having a low contiguity score) can be combined with one or more images which do not contain any contiguities, making the image with a weak contiguity the dominant image and when the sections of the images are combined in a combined image, for example, the image with the weak contiguity will assume the ground position. The hierarchy can be driven in part by the contiguity's characteristics and user's/viewer's input and/or bias and/or preferences, which the user may input via a user interface. The multi-stable capacity is nonetheless conferred on an image based on the individual image's absolute contiguity characteristics and are metered. The hierarchy is a ranking of the dominance or strength of the contiguities and/or other image elements, such as which elements of the image are in the figure position and which elements of the image are in the background position. Specifically which element appears in the figure and background depends on what other elements are in the image or the image is combined with by its combination with other images.

Not all percepts are equally stable and dominance is relative to the composite's composition. For example, if the component images in a stable 3-image composite are extracted and reassigned to a 2-image composite, a previously figure-bound image in a 3-image composite can assume the ground position because of a relative state of contiguity dominance. In other words, a weak contiguity can be in the ground position relative to a composite with a second component image with weaker contiguity characteristics, but be relegated to the figure position in a stable composite if it is dominated by an image with a contiguity with stronger characteristics. In part this is due to the presence of a minor contiguity whose contiguity characteristics while present were otherwise perceptually masked in the 3-image composite or a 2-image composite, but which can be expressed in certain combinations of the derived 2-image composite and/or in combination with other images.

As such, in one embodiment, an image with a weak contiguity can be combined with one or more images which do not contain any contiguities, making it the dominant image and when the sections are combined, it then can assume the ground position. This hierarchy can be driven in part by the contiguity's characteristics and user's/viewer's input and/or bias and/or preferences. The multi-stable capacity is nonetheless conferred on an image based on the individual image's absolute contiguity characteristics and are metered by its combination with other images in terms of its expression.

The image which can occupy the ground position can be predicted relative to the image or images which occupy the figure position based on specific image characteristics and the relative strength of those image characteristics and conferring a type of dominant and recessive relationship when specific image characteristics are compared.

The more horizontal the visual cues are, the easier it will be for the mind to maintain the image in the ground position and to suppress a switch as the viewer tracks across the image set. In general, 3-image composites in which each image occupies an equal percentage of the image are more challenging than 2-image composites for the mind to assemble, in part because there is a greater ratio of the spatial distance between the parts of any one image and the size of the entire composite image, with two intervening image sections between target image sections in the ground position and which are comprised of potentially conflicting/confusing content and/or overlapping contiguities. To maintain the coherency of the contiguity throughout the image, there needs to be both a vertical spatial separation between the contiguities and color differences in potentially juxtaposed regions. Depending on the image, the width of the sections in a composite (1.5% vs 10% vs. 20% vs. 25%) can make it easier or harder to assemble (the less detail per section, the smaller the gap distance needs to be to maintain the image in the ground position in an assembled coherency, and therefore easier to keep the image assembled the mind, etc.). Thus, when system 100 is assembling a composite image by interleaving images, the ratio of gap between different parts of one image to the gap distance between different parts of another image may be chosen based on which image is to be in ground position and on how much variation in contrast or how much saliency and its localization is present in each image. If all other characteristics of the two images are similar, system 100 will make the gap distance smaller for the image that needs to be in the ground position, but if the image that needs to be in the ground position has more detail (as indicated by the number of vertical edges, vertical disruptors, the saliency, and/or the variation in contrast, the gap distance may not necessarily be made smaller.

If the image's contiguity has a high angularity (e.g., the contiguity has a large angle with respect to the horizon or a horizontal line), it will generally be more challenging to reassemble, despite the image having a high saliency and based on the CR value, but which can be mitigated by other factors such as the presence or absence of a vertical disruptor. So, an elk (a vertical disruptor) on a hillside (a contiguity with a high angularity) will be more challenging than one elk standing in a field because the contiguity is at an angle in the hillside image. Thus when searching for an image, that is easier to reassemble, system 100 weights images with less angularity as better (e.g., having a higher or better score) than images with similar characteristics, but that have more angularity.

Further, an image set forming a composite image with an object/animal on an angled contiguity may appear distorted. The distortion may be further magnified if the image has animals or objects. The distortion in either case (on an angle or splitting animal parts on a level field) will complicate the reassembly of the image in the mind. To aid the mind in reassembling an image, the salient part or parts of the image should ideally have fewer disruptions. In the hawk example FIG. 23, which is the same hawk image in FIGS. 16A-D, reassembly is facilitated when the image is sectioned where the hawk in its entirety is centrally placed within the image section, even though the contiguity is disrupted by the hawk, and even though the branch may appear distorted as a result of the interleaving and the angularity of the branch. Although the branch is at an angle, the branch is still recognizable, despite the crookedness of the branch (the branch portion on the right looks like the parts of the branch do not fit together). Thus when searching for an image that is easier to reassemble, system 100 may weight images with a centrally located object (e.g., a vertical disruptor) with a higher weight than similar images without the centrally located image if the VD is contextual, such as a bird on the branch.

A different sectioning strategy or image crop could shift the hawk where it would be split between two image sections, separating its parts, making its identification as a continuous image part difficult, and reassembly as such more challenging. Thus, system 100 may automatically interleave images with a centrally located object for objects which can be fitted into a single section, such that the object is not split, if, based on a user's input, the image with the centrally located object is supposed to be an image that is easy to reassemble in the viewer's mind.

Single objects or ones that dominate an image (e.g., a flower) with a consistent background may be easier to identify and therefore reassemble even though it is split between multiple sections than an image where an animal, an irregular contiguity, is split between multiple sections, even if the part of an object in the former construct (the flower) cannot be easily or immediately identified.

One may compute a score that is a combination of the percentage of the composite image that is occupied by the image, a contiguity score, the angularity of the contiguity, and the saliency. The contiguity score may be the number of contiguities or may be a weighted sum of weights, where each weight represents how distinct a particular contiguity is, which may depend on how straight a contiguity is (e.g., bold a straight line may have a weight of 1 and a crooked line or faint line may have a weight of 0.5 or some other number between 1 and 0 representing how easily the contiguity can be distinguished). The angularity may be the average of the absolute value of the angle of the contiguity. The manner in which the percentage of the composite image that is occupied by the image, a contiguity score, the angularity of the contiguity, and the saliency are combined, may be a weighted sum, for example. The weights may be determined experimentally and in an embodiment, may depend on the context, types of image being combined, and/or the purpose of the combined image. In other embodiments, the saliency, percentage of the composite image, the contiguity, and the angularity may be combined in another manner, such as in a product. Each of the saliency, percentage of the composite image, the contiguity, and the angularity and/or their weights may be raised to a power, be operated upon by a log function, a trig function, and elliptic function, a Bessel function, and/or another function, and then combined.

To select an image, so as to be easier to combine than another, system 100 selects an image with a better score for the component image relative to the other component images in the composited image set. Two images can be compared and assigned to similar complexity categories when their value scoring is the same or within 0.1%, within 0.5%, or within 10% of one another, depending on the embodiment).

Example 2

Assume that a robotic device captures the image of FIGS. 14A and B. In order to direct the robotic device to automatically fly over the elk and take a photo of the top view of the elk (based only on what is visible in FIGS. 14A and B).

The assumptions are that (1) the elk is stationary and could represent any other stationary object on the hillside; (2) there are no other available images that show other angles, (3) there are no other obstructions or higher elevation portions of the hill in the direction of the viewer, (4) the area beyond the hill is open space or at least does not contain an area with a higher elevation than that of the elk on the hillside; (5) the drone is small and has excellent maneuverability; and, (6) a map of the area is available that has the longitude and latitude coordinates for the hillside.

Using edge detection, the elk may be recognized by the robotic drone as a vertical disruption and the slope of the hill may be computed to be 4.5.

Figure 22A:
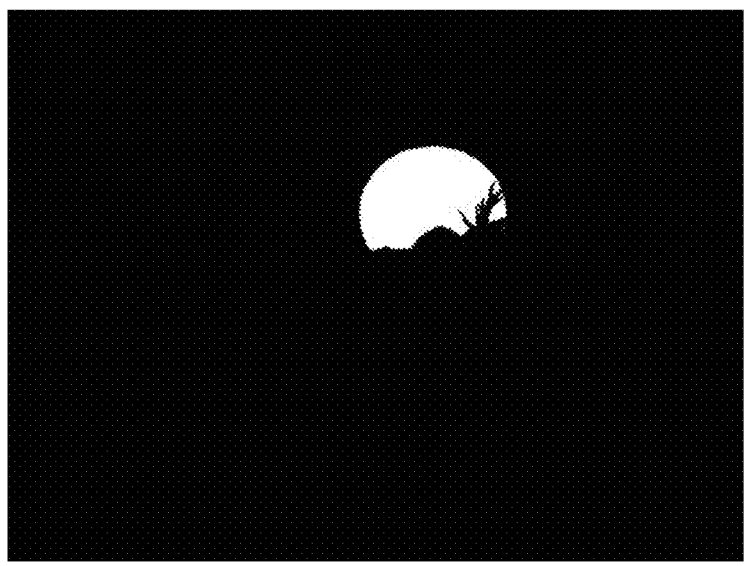
FIG. 22A-22C is an example of a desaturated image at three different thresholds.
Figure 22B:
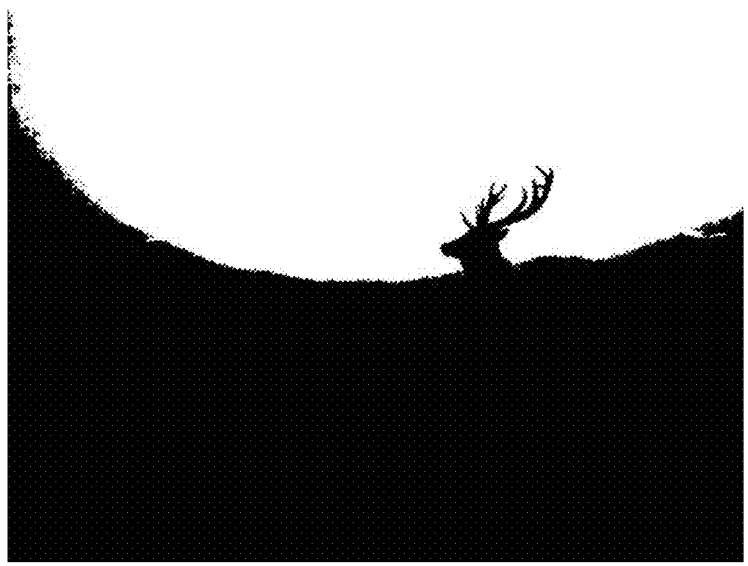
Figure 22C:

Thresholding and edge analysis of the elk silhouette yields the FIGS. 22A-22C, where a standard desaturated image thresholded at 127 (is shown in FIG. 22B) reveals the edge separating the sky from other image elements in the foreground. FIGS. 22A-22C, are related to step 504, of FIG. 5. Also, FIGS. 22A-22C show and example of dividing images in quadrant that can be defined as positive and negative values arranged on the Cartesian coordinate system or with a numerical label, Q1, Q2, Q3 and Q4 (see step 526, FIG. 5). Increasing the threshold of the desaturated image to 206 (FIG. 22A), reveals the sun's location in the sky portion of the image. However, in FIG. 22C the threshold is reduced to 42 so as to reveal the hillside with the elk, albeit with the loss of the sun element in the image. In an embodiment, system 100 automatically tests a variety of thresholds to extract more information about the locations of edges and contiguities in the image to define object relationships. A simple thresholding and edge analysis of the elk silhouette yields the following images, where FIG. 22B (desaturated, threshold 127) revealing the sky interface; FIG. 22A (desaturated, threshold 206) where the tolerance is pushed to reveal the sun's location relative to the elk's antlers; and, FIG. 22C (desaturated, threshold 4) is used to identify the hillside's edge, an angled contiguity, and the elk as a vertical disruption. The image of FIGS. 22 A-C requires multiple thresholding analyses to correctly analyze the image; without further analysis, FIG. 22B could be confused with an elk swimming in the water, or an elk standing behind a U-shaped hill, or in a valley where only the elk's head is visible (see step 504, FIG. 5). Thresholding at only one threshold value and edge detection alone can be inadequate tools to locate and identify objects, or analyze scenes, or understand the relationships between objects in an image, because content may be lost, thereby yielding indicating erroneous information, such as the elk's body being concealed.

Returning to the FIG. 22A-C drone example, to compute the slope of the hill, the hill may be replaced by a straight line that approximates the slope of the hill from the image's edge to edge, and then the height divided by the length of the hill to give the slope of the hill. Alternatively, the slope of each point of the outline of the hill may be computed and the slope may then be averaged. Alternatively, a stitch analysis can be conducted to focus the analyses on regions of interest using FIG. 14B. The elevation from the bottom to the top of the hill may be computed to be 12.51° (the elevation is the given by $\cot^{-1}(\text{slope})=\cot^{-1}(4.5)=12.51$ degrees). The drone has several flight path options. The drone can fly directly towards the elk and have a clear path using the area defined by quadrant Q1 (labeled 1402) and/or Q3 (labeled 1404). If the drone uses a Q3 approach, the drone can target the lowest visible part of the hill using the edge detection to find where the edge that represent the hill intersects with the left edge of the image. Using an (x,y) coordinate system (where x represents distance and y represents height), the intersection of the edge representing the hill with the left edge of the image occurs at pixel having coordinates (0, 275). By inferring the distance to the elk based on the size of the elk in the image and the average size of elk, for example, the pixel coordinates may then be converted to longitude and latitude. To fly over the elk, there are multiple approaches based on the location of the elk on the hill. To fly directly at the elk, the drone would have to clear the antlers' portion which is defined in the vertical disruption calculation, but a wide-angle lens may be helpful to capture the entire area coming at the elk from that direction, because it is not evident from this image what the depth of the hill is in the forward facing direction, even if making a left-sided approach. Any region could be targeted using the quadrant analysis as landmarks. If the image and/or stitched image (FIG. 14B) is divided into a grid, and then each grid box is analyzed for color symmetry, one finds that the grid boxes of Q1 and Q3 that are in front of the elk have a color symmetry indicating no obstructions are present. Similarly, the saliency of each box may computed, which will be low, for the boxes in front of the elk, which is at least one indication that there is nothing present. The use of the stitched image defines a clear path to the elk in Q1 and/or Q3, avoiding the hill at the base of Q3. The path to flying directly at the sun becomes apparent in the stitched image (with a −67% peel) for the nearest approach aiming directly for the sun but which also avoids hitting the elk. The stitching better illustrates the local angle of the hillside and also the more cautious angle of approach for the drone to travel upwards in terms of avoiding the elk or other solid object.

Properties of the image that are useful in determining a region or path by which to approach the elk on the hill is an area containing:

Symmetrical color blocks with no vertical disruptions (no elk in the way) or other color interruptions, which is satisfied by the quadrants defined as Q1 (top left) or Q3 (bottom left) of FIG. 14A in the simplest analysis of the image.

The definition of the angular differences across the image using the stitch to define the linearity of the ground element and which can further identify the area occupied by a vertical disruption (in FIGS. 14A and B, where the elk is the vertical disruption).

The elk (or other vertical disruption) is in a fixed location. If the "elk" is moving and the location of the elk has already been mapped, the stitching may potentially allow for faster targeting (target acquisition), as the elk moves up or down the hill.

The machine system 101 may be a system that implements a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CDROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

ALTERNATIVES AND EXTENSIONS

Each embodiment disclosed herein may be used or otherwise combined with any of the other embodiments disclosed. Any element of any embodiment may be used in any embodiment.

Although the invention has been described with reference to specific embodiments, it will be understood by those skilled in the art that various changes may be made, and equivalents may be substituted for elements thereof without departing from the true spirit and scope of the invention. In addition, modifications may be made without departing from the essential teachings of the invention.

The invention claimed is:

1. A system comprising:
a processor system having at least one processor and
a memory system, the memory system storing one or more machine instructions, which when invoked cause the system to implement a method including at least,
identifying, by the system, a first section of an image stored at least temporarily in the memory system, the first section of the image including at least a first portion of the image, which when rendered is represented by a first set of contiguous pixels;
identifying, by the system, a second section of the image, the second section including at least a second portion of the image, which when rendered is represented by a second set of contiguous pixels;
associating, by the system, a spatial relationship between the first section and the second section;
analyzing, by the system, the image based on at least the first section, the second section, and the spatial relationship; and
determining, by the processor system, one or more features of the image based on the analyzing, wherein the first section of the image and the second section of the image do not have overlapping regions.

2. The system of claim 1, the image being a first image, the method further comprising searching for a second image that will occupy a background of a composite image by at least searching for an image having a horizontal contiguity line, where the composite image is a composite of at least the first image and the second image.

3. The system of claim 1, the method further comprising determining a relationship between elements of the image by at least determining that an element is in a figure position of the image.

4. The system of claim 1, the method further comprising determining a relationship between elements of an image by at least determining that an element is in a ground position of the image.

5. The system of claim 1, the one or more features including at least one or more contiguities, and the identifying of the one or more features including at least identifying the one or more contiguities.

6. The system of claim 1, the image being a current image, and the method further comprising: selecting another image based on the one or more features of the current image; and forming a composite image based on the current image and the other image.

7. The system of claim 1, the spatial relationship being a spatial relationship that is found in the image between the first section and the second section.

8. The system of claim 1, the spatial relationship being a spatial relationship between the first section and the second section that is different than a spatial relationship found in the image between the first section and the second.

9. The system of claim 1, the spatial relationship including at least a distance between the first section and the second section.

10. The system of claim 1, in the image, the first section not being adjacent to the second section, the spatial relationship including at least setting a distance between the first section and the second section, such that the first section and second section are adjacent to one another.

11. The system of claim 1, the first section including at least a first edge of the image, the second section including at least a second edge of the image and the spatial relationship including at least a distance between the first section and the second section.

12. The system of claim 1, the method further comprising predicting information about content of the image that is at least not entirely within the first section and not within the second section.

13. The system of claim 1, the method further comprising searching for the image.

14. The system of claim 1, the image being a first image; the method further comprising searching for a second image from a collection of images that includes at least one or more images that are unrelated to the first image.

15. A system comprising:
a processor system having at least one processor and
a memory system, the memory system storing one or more machine instructions, which when invoked cause the system to implement a method including at least,
identifying, by the system, a first section of an image stored at least temporarily in the memory system, the first section of the image including at least a first portion of the image, which when rendered is represented by a first set of contiguous pixels;
identifying, by the system, a second section of the image, the second section including at least a second portion of the image, which when rendered is represented by a second set of contiguous pixels;
associating, by the system, a spatial relationship between the first section and the second section;
analyzing, by the system, the image based on at least the first section, the second section, and the spatial relationship; and
determining, by the processor system, one or more features of the image based on the analyzing, the image being a first image,
the method further including at least searching for a second image that will occupy a background of a composite image by at least searching for an image having no contiguity, where the composite image is a composite of at least the first image and the second image.

16. A system comprising:
a processor system having at least one processor and
a memory system, the memory system storing one or more machine instructions, which when invoked cause the system to implement a method including at least,
identifying, by the system, a first section of an image stored at least temporarily in the memory system, the first section of the image including at least a first portion of the image, which when rendered is represented by a first set of contiguous pixels;
identifying, by the system, a second section of the image, the second section including at least a second portion of the image, which when rendered is represented by a second set of contiguous pixels;
associating, by the system, a spatial relationship between the first section and the second section;
analyzing, by the system, the image based on at least the first section, the second section, and the spatial relationship;
determining, by the processor system, one or more features of the image based on the analyzing; and the determining of the one or more features of the image including at least identifying a location of an object, and the method further including at least maneuvering a vehicle based on the location of the object.

17. A system comprising:

a processor system having at least one processor system and a memory system, the memory system storing one or more machine instructions, which when invoked cause the system to implement a method including at least, identifying, by the system, a first section of an image stored at least temporarily in the memory system, the first section of the image including at least a first portion of the image, which when rendered is represented by a first set of contiguous pixels;

identifying, by the system, a second section of the image, the second section including at least a second portion of the image, which when rendered is represented by a second set of contiguous pixels;

associating, by the system, a spatial relationship between the first section and the second section;

analyzing, by the system, the image based on at least the first section, the second section, and the spatial relationship;

determining, by the processor system, one or more features of the image based on the analyzing;

the determining of the one or more features of the image including at least identifying a location of an object, and the method further comprising navigating the system based on the location of the object.

18. A system comprising:

a processor system having at least one processor and a memory system, the memory system storing one or more machine instructions, which when invoked cause the system to implement a method including at least, identifying, by the system, a first section of an image stored at least temporarily in the memory system, the first section of the image including at least a first portion of the image, which when rendered is represented by a first set of contiguous pixels;

identifying, by the system, a second section of the image, the second section including at least a second portion of the image, which when rendered is represented by a second set of contiguous pixels;

associating, by the system, a spatial relationship between the first section and the second section;

analyzing, by the system, the image based on at least the first section, the second section, and the spatial relationship; and determining, by the processor system, one or more features of the image based on the analyzing;

in the image the first section being adjacent to the second section, the spatial relationship including at least setting a distance between the first section and the second section, such that the first section and second section are not adjacent to one another.

19. A system comprising:

a processor system having at least one processor and a memory system, the memory system storing one or more machine instructions, which when invoked cause the system to implement a method including at least, identifying, by the system, a first section of an image stored at least temporarily in the memory system, the first section of the image including at least a first portion of the image, which when rendered is represented by a first set of contiguous pixels;

identifying, by the system, a second section of the image, the second section including at least a second portion of the image, which when rendered is represented by a second set of contiguous pixels;

associating, by the system, a spatial relationship between the first section and the second section;

analyzing, by the system, the image based on at least the first section, the second section, and the spatial relationship; and determining, by the processor system, one or more features of the image based on the analyzing;

the first section being a first slice of the image; and the second section being a second slice of the image that is parallel to the first slice of the image.

20. A system comprising:

a processor system having at least one processor and a memory system, the memory system storing one or more machine instructions, which when invoked cause the system to implement a method including at least, identifying, by the system, a first section of an image stored at least temporarily in the memory system, the first section of the image including at least a first portion of the image, which when rendered is represented by a first set of contiguous pixels;

identifying, by the system, a second section of the image, the second section including at least a second portion of the image, which when rendered is represented by a second set of contiguous pixels;

associating, by the system, a spatial relationship between the first section and the second section;

analyzing, by the system, the image based on at least the first section, the second section, and the spatial relationship; and determining, by the processor system, one or more features of the image based on the analyzing;

the first section and second section being two sections of a set of sections, each section of the set of sections including at least a portion of the image, which when rendered is represented by contiguous pixels, and the associating of the spatial relationship includes associating a spatial relationship between the sections of the set of sections.

21. A system comprising:

a processor system having at least one processor and a memory system, the memory system storing one or more machine instructions, which when invoked cause the system to implement a method including at least, identifying, by the system, a first section of an image stored at least temporarily in the memory system, the first section of the image including at least a first portion of the image, which when rendered is represented by a first set of contiguous pixels;

identifying, by the system, a second section of the image, the second section including at least a second portion of the image, which when rendered is represented by a second set of contiguous pixels;

associating, by the system, a spatial relationship between the first section and the second section;

analyzing, by the system, the image based on at least the first section, the second section, and the spatial relationship; and determining, by the processor system, one or more features of the image based on the analyzing;

the analyzing being a first analysis, the method further comprising:

identifying, by the system, a third section of the image that is at least temporarily stored in the memory system, the third section of the image including at least a third portion of the image, which when rendered is represented by a third set of contiguous pixels;

identifying, by the system, a fourth section of the image, the fourth section of the image including at least a fourth portion of the image, which when rendered is represented by a fourth set of contiguous pixels;

associating, by the system, a spatial relationship between the third section and the fourth section;

analyzing, by the system, the image based on at least the third section, the fourth section, and the spatial relationship between the third section and the fourth section, therein performing a second analysis; and the determining, by the processor system, of the one or more features of the image being based on the first analysis and the second analysis.

22. The system of claim 21,
the first section being smaller than the third section and the first section being included in the third section; and
the second section being smaller than the fourth section and the second section being included in the fourth section.

23. The system of claim 21,
the spatial relationship between the first section and the second section being a distance between the first section and the second section, and
the spatial relationship between the third section and the fourth section being a distance between the third section and the fourth section;
the distance between the third section and the fourth section being smaller than the distance between the first section and the second section.

24. A system comprising:
a processor system having at least one processor and
a memory system, the memory system storing one or more machine instructions, which when invoked cause the system to implement a method including at least,
identifying, by the system, a first section of an image stored at least temporarily in the memory system, the first section of the image including at least a first portion of the image, which when rendered is represented by a first set of contiguous pixels;
identifying, by the system, a second section of the image, the second section including at least a second portion of the image, which when rendered is represented by a second set of contiguous pixels;
associating, by the system, a spatial relationship between the first section and the second section;
analyzing, by the system, the image based on at least the first section, the second section, and the spatial relationship; and
determining, by the processor system, one or more features of the image based on the analyzing;
the spatial relationship being a spatial hyphenation between the first section and second section in which the hyphenation includes at least inserting other content between the first section and the second section.

25. A system comprising:
a processor system having at least one processor and
a memory system, the memory system storing one or more machine instructions, which when invoked cause the system to implement a method including at least,
identifying, by the system, a first section of an image stored at least temporarily in the memory system, the first section of the image including at least a first portion of the image, which when rendered is represented by a first set of contiguous pixels;

identifying, by the system, a second section of the image, the second section including at least a second portion of the image, which when rendered is represented by a second set of contiguous pixels;

associating, by the system, a spatial relationship between the first section and the second section;

analyzing, by the system, the image based on at least the first section, the second section, and the spatial relationship; and determining, by the processor system, one or more features of the image based on the analyzing;

the image being an area of interest of a larger image, the method further comprising:

cropping the larger image prior to the identifying of the first section of the image and prior to the identifying of the second section of the image;

the cropping of the larger image resulting in a cropped image that includes the area of interest of the larger image, wherein the identifying the first section and the second section is performed based on the cropped image.

26. A system comprising;
a processor system having at least one processor and
a memory system, the memory system storing one or more machine instructions, which when invoked cause the system to implement a method including at least,
identifying, by the system, a first section of an image stored at le ast temporarily in the memory system;
identifying, by the system, a second section of the image;
associating, by the system, a spatial relationship between the first section and the second section;
analyzing, by the system, the image based on at least the first section, the second section, and the spatial relationship;
the first section and the second section being two sections of a current set of sections of an image stored in the memory system, each section of the current set of sections including at least a portion of the image that is not part of other sections of the current set of sections, the current set of sections spanning a current percentage of the image;
the associating of the spatial relationship of between the first section and the second section being part of associating, by the system, a current spatial relationship between the current set of sections; and
the analyzing of the image based on at least the first section, the second section, and the spatial relationship being part of analyzing the image based on the current set of sections and the current spatial relationship;
repeating multiple times, by the system, the identifying of the current set of sections, the associating of the spatial relationship between the current set of sections, and the analyzing the image based on the current set of sections and the spatial relationship, where, in different repetitions, the current set of sections is a new set of sections that is different than a prior set of sections, and the current set of sections spans a new percentage of the image that is different than a prior percentage of the image that was spanned by the prior set of sections; and
determining, by the processor system, one or more features of the image based on results of the analyzing of each of the current sets of sections and the current spatial relationship, where the repeating is performed in a predetermined sequence.

27. A method comprising;
identifying, by the system, a first section of an image stored at least temporarily in a memory system, the first section of the image including at least a first portion of the image, which when rendered is represented by a first set of contiguous pixels, the system including at least a processor system having at least one processor and the memory system;

identifying, by the system, a second section of the image, the second section including at least a second portion of the image, which when rendered is represented by a second set of contiguous pixels;

associating, by the system, a spatial relationship between the first section and the second section;

analyzing, by the system, the image based on at least the first section, the second section, and the spatial relationship; and determining, by the processor system, one or more features of the image based on the analyzing, wherein the first section of the image and the second section of the image do not have overlapping regions.

* * * * *